United States Patent
Liang et al.

(10) Patent No.: US 10,984,075 B1
(45) Date of Patent: Apr. 20, 2021

(54) HIGH DIMENSIONAL TO LOW DIMENSIONAL DATA TRANSFORMATION AND VISUALIZATION SYSTEM

(71) Applicant: SAS Institute Inc., Cary, NC (US)

(72) Inventors: Yu Liang, Cary, NC (US); Arin Chaudhuri, Raleigh, NC (US); Haoyu Wang, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/069,293

(22) Filed: Oct. 13, 2020

Related U.S. Application Data

(60) Provisional application No. 63/057,141, filed on Jul. 27, 2020, provisional application No. 63/047,111, filed on Jul. 1, 2020.

(51) Int. Cl.
  *G06F 17/16* (2006.01)
  *G06F 16/28* (2019.01)
  (Continued)

(52) U.S. Cl.
  CPC ............ *G06F 17/16* (2013.01); *G06F 16/283* (2019.01); *G06F 16/287* (2019.01);
  (Continued)

(58) Field of Classification Search
  None
  See application file for complete search history.

(56) References Cited

U.S. PATENT DOCUMENTS 5,835,901 A * 11/1998 Duvoisin .............. G06K 9/627
  706/19
6,035,057 A *  3/2000 Hoffman ................. G01S 7/12
  382/159
(Continued)

OTHER PUBLICATIONS

Wen Li, Ying Zhang, Yifang Sun, Wei Wang, Wenjie Zhang, Xuemin Lin "Approximate Nearest Neighbor Search on High Dimensional Data—Experiments, Analyses, and Improvement", Oct. 8, 2016 arXiv:1610.02455 (Year: 2016).*

(Continued)

*Primary Examiner* — Polina G Peach
(74) *Attorney, Agent, or Firm* — Bell & Manning, LLC

(57) ABSTRACT

A computer transforms high-dimensional data into low-dimensional data. A distance is computed between a selected observation vector and each observation vector of a plurality of observation vectors, a nearest neighbors are selected using the computed distances, and a first sigmoid function is applied to compute a distance similarity value between the selected observation vector and each of the selected nearest neighbors where each of the computed distance similarity values is added to a first matrix. The process is repeated with each observation vector of the plurality of observation vectors as the selected observation vector. An optimization method is executed with an initial matrix, the first matrix, and a gradient of a second sigmoid function that computes a second distance similarity value between the selected observation vector and each of the nearest neighbors to (Continued)

transform each observation vector of the plurality of observation vectors into the low-dimensional space.

30 Claims, 47 Drawing Sheets
(36 of 47 Drawing Sheet(s) Filed in Color)

(51) Int. Cl.
    *G06N 20/00*         (2019.01)
    *G06F 17/17*         (2006.01)
    *G06K 9/62*          (2006.01)

(52) U.S. Cl.
    CPC ......... *G06F 17/175* (2013.01); *G06K 9/6276* (2013.01); *G06N 20/00* (2019.01)

(56) References Cited

U.S. PATENT DOCUMENTS

| | | | |
|---|---|---|---|
| 7,010,167 B1* | 3/2006 | Ordowski | G06K 9/6267 345/644 |
| 7,043,514 B1* | 5/2006 | Achlioptas | G06K 9/6247 708/401 |
| 7,230,973 B2* | 6/2007 | Brunel | H04B 1/71057 375/130 |
| 9,665,405 B1* | 5/2017 | Goodnight | G06Q 10/0635 |
| 9,893,742 B1* | 2/2018 | Noma | H03M 7/40 |
| 10,148,680 B1* | 12/2018 | Segev | H04L 63/1425 |
| 10,504,005 B1* | 12/2019 | Walters | G06K 9/6267 |
| 10,824,603 B2* | 11/2020 | Sastry | G06F 16/211 |
| 2007/0118297 A1* | 5/2007 | Thayer | G16H 50/70 702/21 |
| 2010/0094611 A1* | 4/2010 | Sankaranarayanan | G01R 31/318357 703/22 |
| 2010/0274539 A1* | 10/2010 | Virkar | G06K 9/6254 703/2 |
| 2014/0108324 A1* | 4/2014 | Chen | G06N 20/00 706/52 |
| 2015/0160098 A1* | 6/2015 | Noda | G05B 23/024 702/35 |
| 2015/0248458 A1* | 9/2015 | Sakamoto | H04L 9/3236 707/719 |
| 2017/0091637 A1* | 3/2017 | Chae | G06N 5/003 |
| 2018/0089762 A1* | 3/2018 | Lopez de Prado | G06N 5/003 |
| 2018/0182412 A1* | 6/2018 | Kleijn | G10L 21/028 |
| 2018/0268015 A1* | 9/2018 | Sugaberry | G06N 5/003 |
| 2018/0285459 A1* | 10/2018 | Soni | G06N 5/02 |
| 2018/0341720 A1* | 11/2018 | Bhatia | G06N 5/003 |
| 2019/0251467 A1* | 8/2019 | Lokare | G06F 17/16 |
| 2020/0097997 A1* | 3/2020 | Li | G06K 9/6251 |
| 2020/0311542 A1* | 10/2020 | Wang | G06N 3/04 |
| 2020/0337650 A1* | 10/2020 | Calhoun | A61B 5/165 |

OTHER PUBLICATIONS

H Jegou et al: "Product Quantization for Nearest Neighbor Search", IEEE Transactions on Pattern Analysis and Machine Intelligence, vol. 33, No. 1, Jan. 1, 2011 (Jan. 1, 2011), pp. 117-128 (Year: 2011).*

Mikolov, T., Sutskever, I., Chen, K., Corrado, G. S., and Dean, J. (2013). "Distributed Representations of Words and Phrases and Their Compositionality." In Advances in Neural Information Processing Systems, 3111-3119. La Jolla, CA: Neural Information Processing Systems Foundation.

Tang, J., Liu, J., Zhang, M., and Mei, Q. (2016). "Visualizing Large-Scale and High-Dimensional Data." In Proceedings of the 25th International Conference on World Wide Web, 287-297. Geneva: International World Wide Web Conferences Steering Committee.

McInnes, L., Healy, J., and Melville, L. (2018). "UMAP: Uniform Manifold Approximation and Projection for Dimension Reduction." arXiv preprint, arXiv:1802.03426.

Ceriotti, M., Tribello, G. A., and Parrinello, M. (2011). "Simplifying the Representation of Complex Free Energy Landscapes Using Sketch-Map." Proceedings of the National Academy of Sciences 108:13023-13028.

Radu Horaud, "A Short Tutorial on Graph Laplacians, Laplacian Embedding and Spectral Clustering," 2009—csustan.csustan.edu, 41 pages.

* cited by examiner

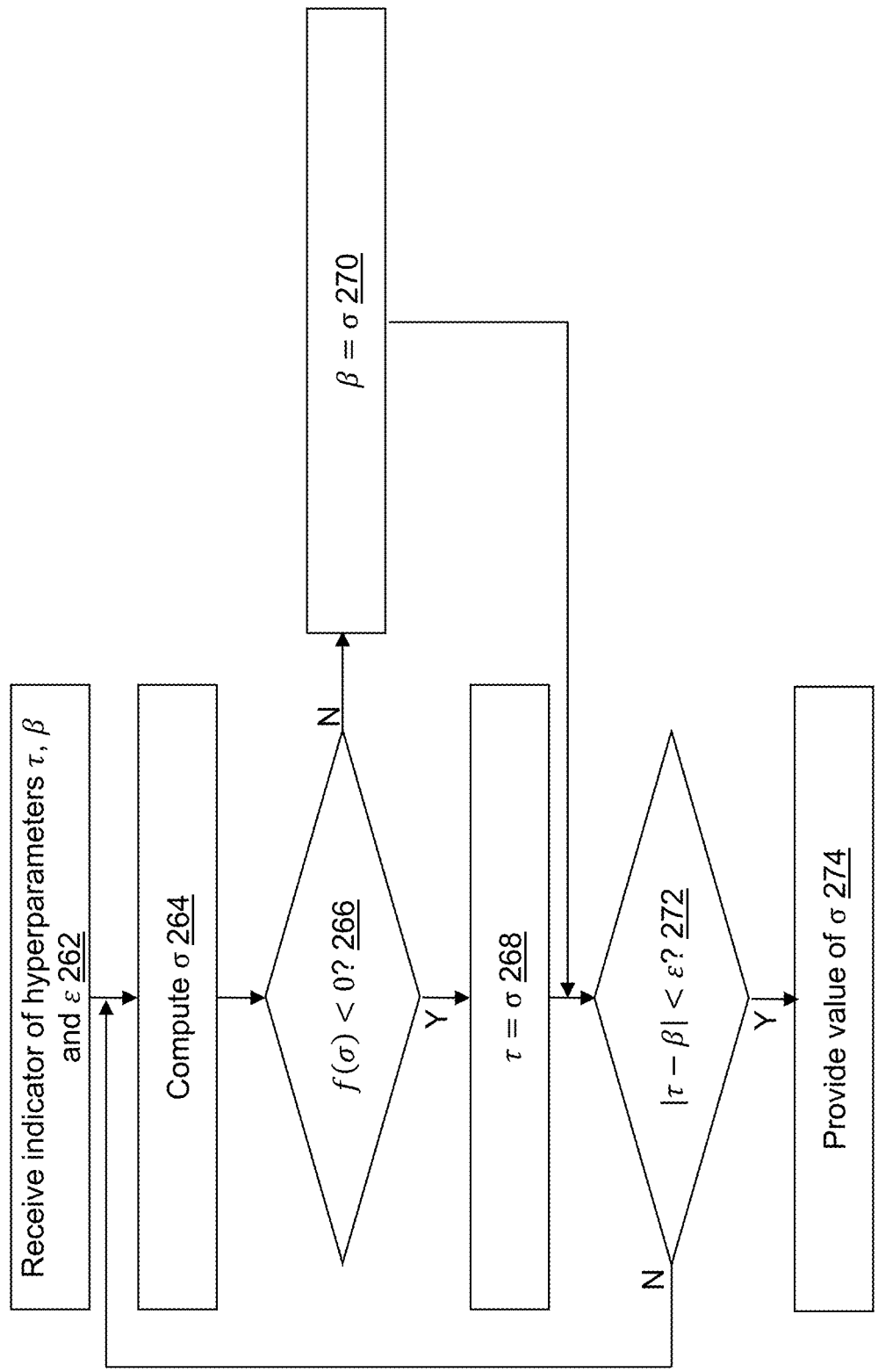

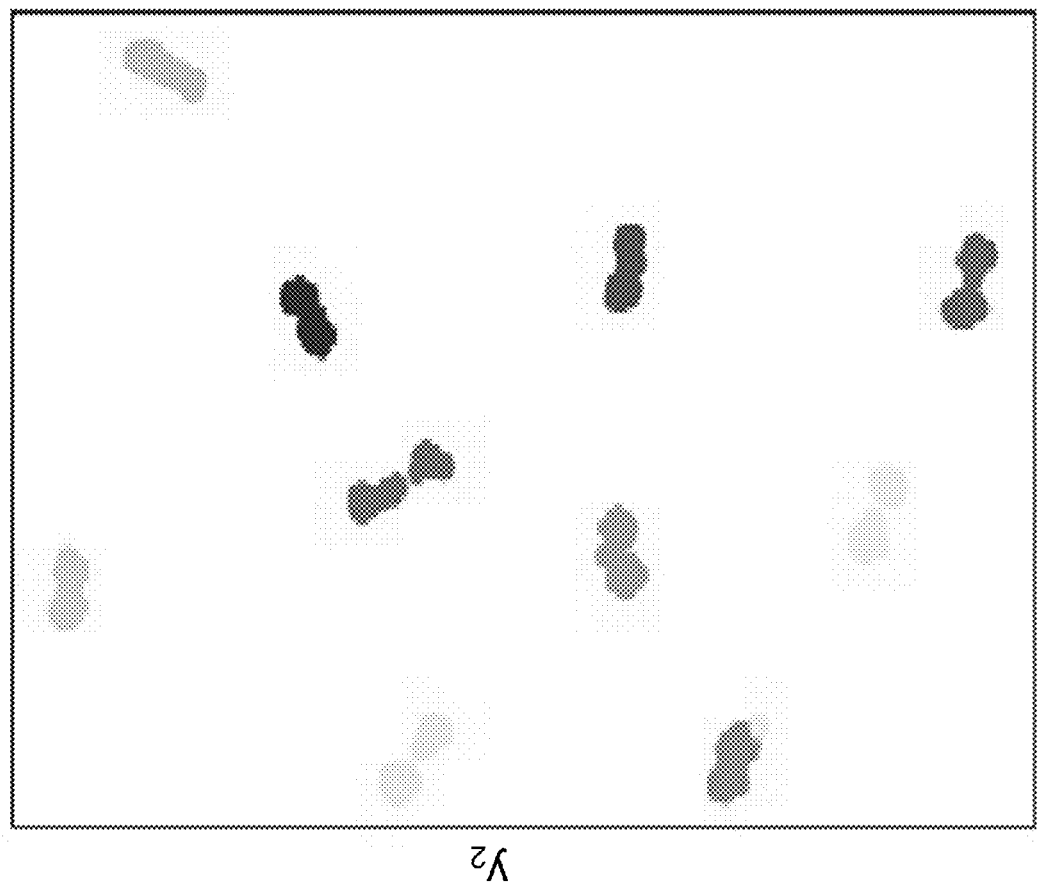
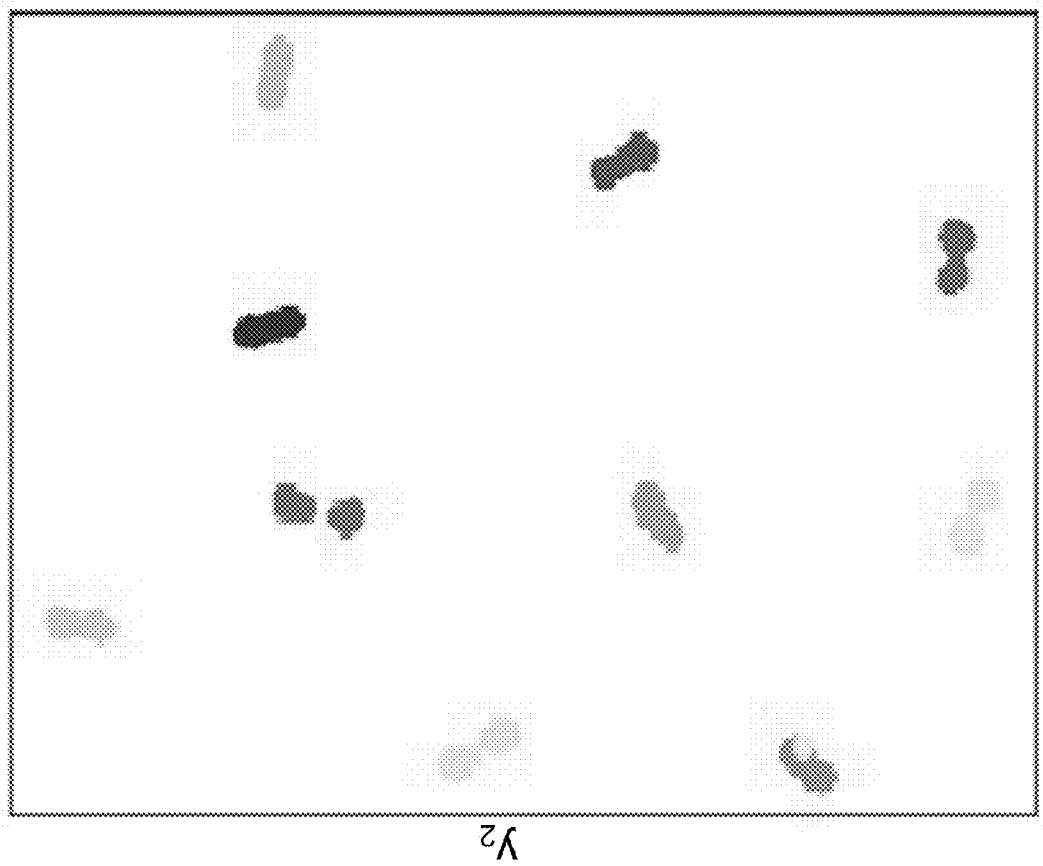

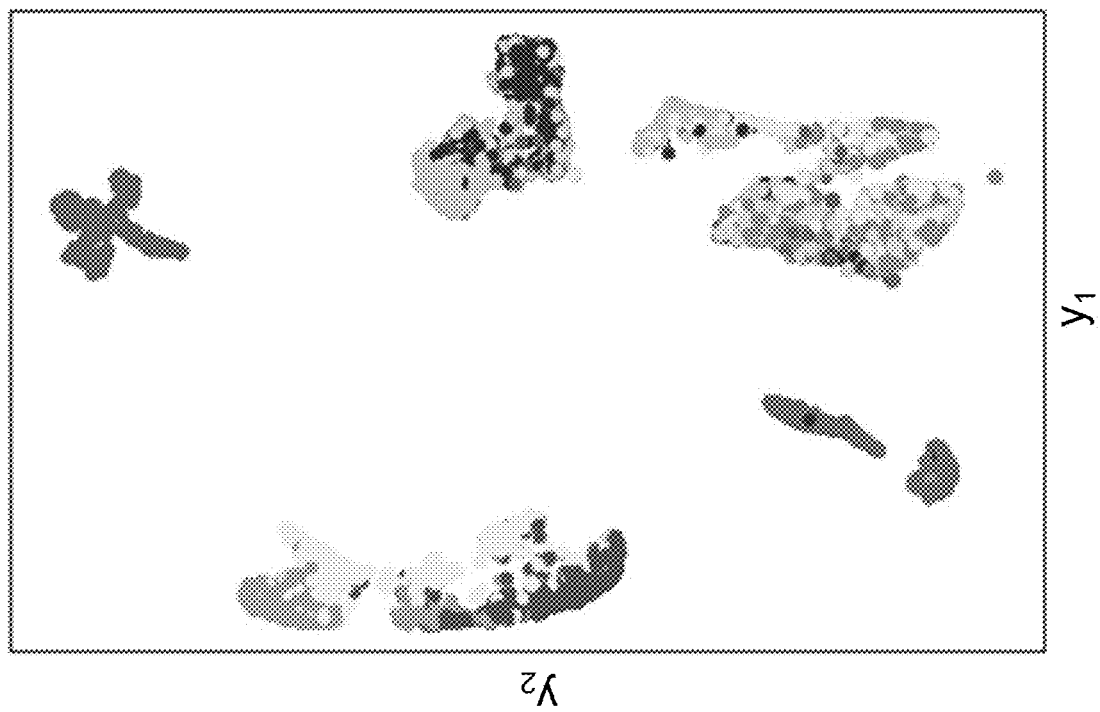
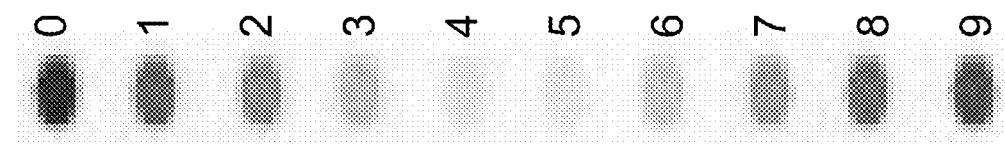
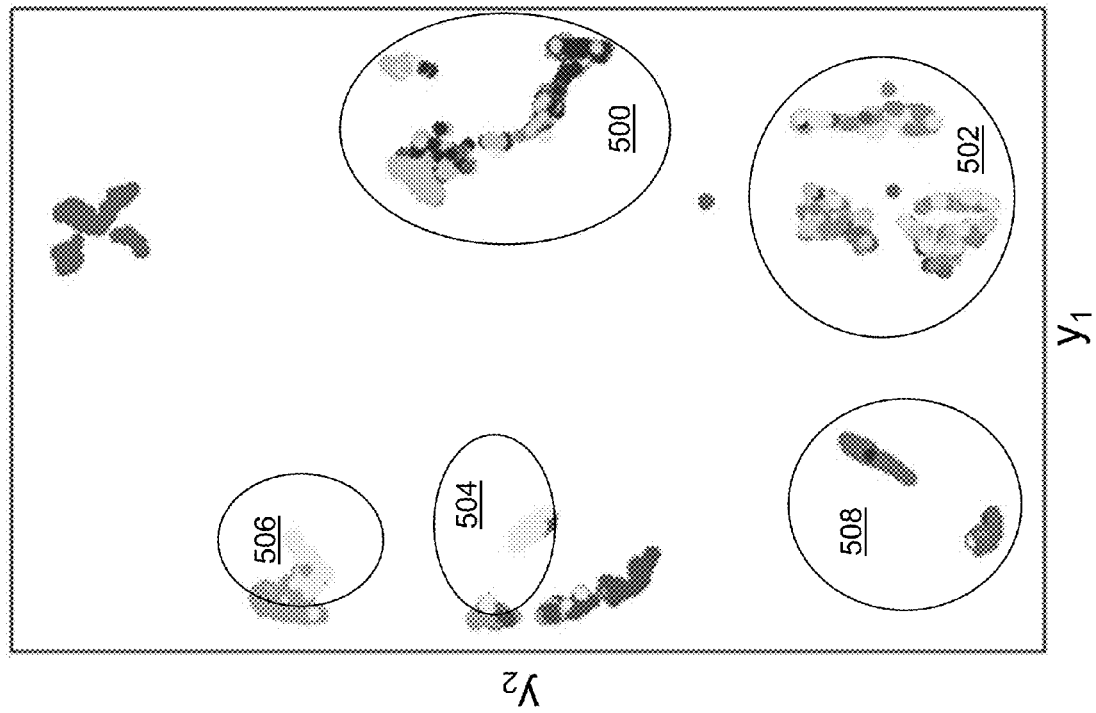
FIG. 5B
FIG. 5A

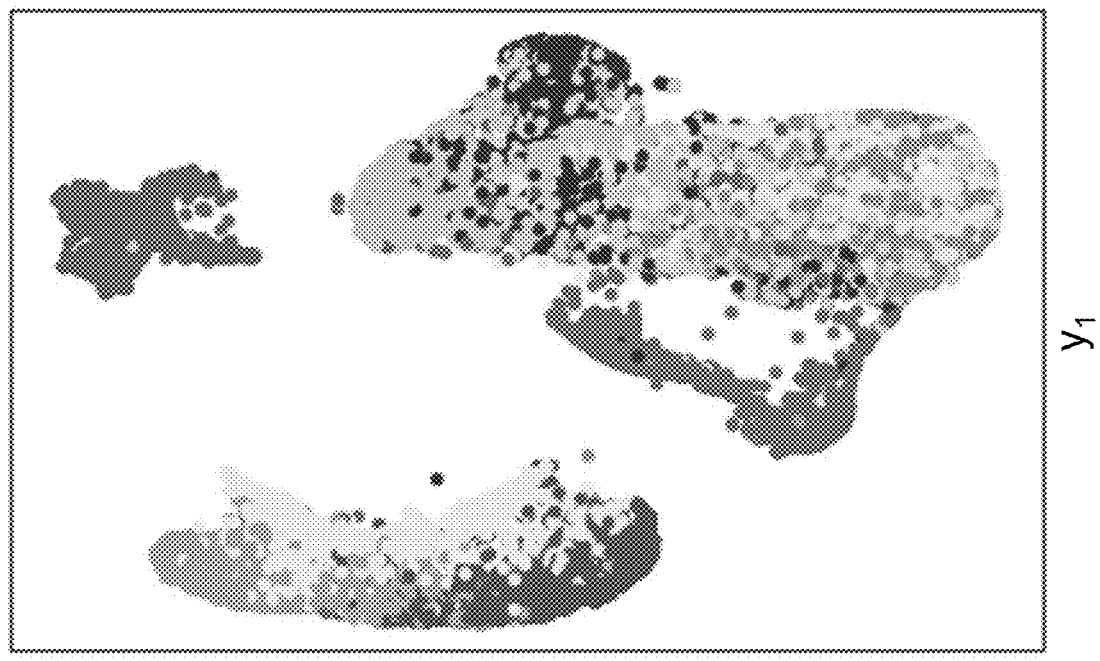
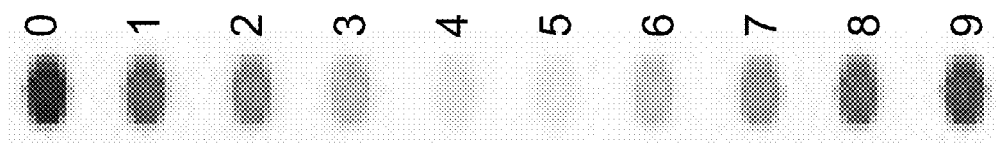
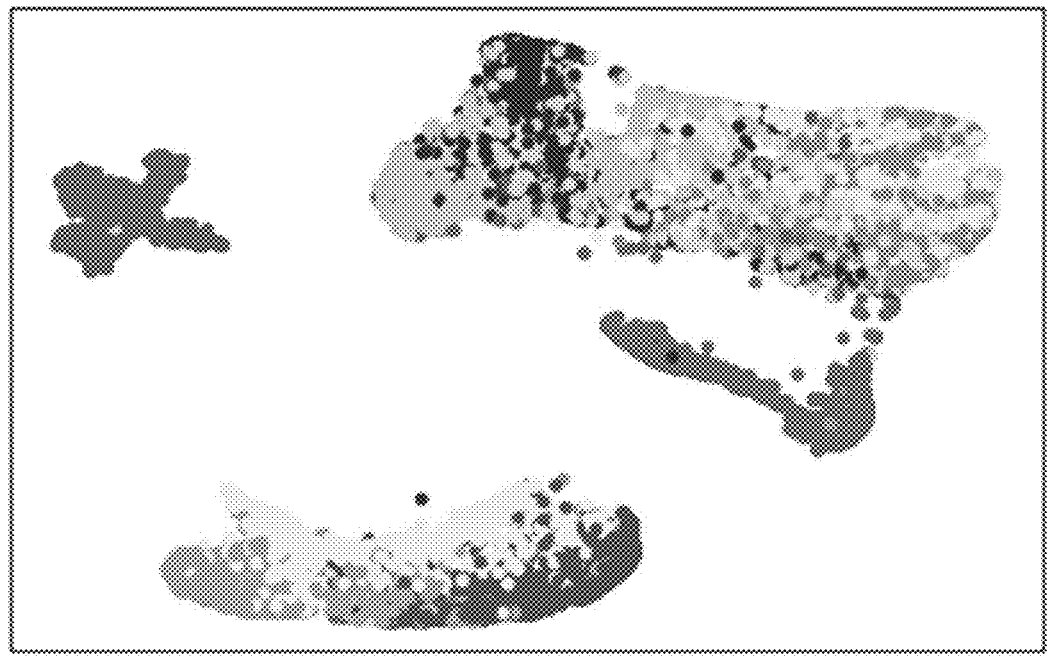
FIG. 5D
FIG. 5C

HIGH DIMENSIONAL TO LOW DIMENSIONAL DATA TRANSFORMATION AND VISUALIZATION SYSTEM

CROSS-REFERENCE TO RELATED APPLICATIONS

The present application claims the benefit of and priority under 35 U.S.C. § 119(e) to U.S. Provisional Patent Application No. 63/057,141 filed Jul. 27, 2020, the entire contents of which are hereby incorporated by reference. The present application also claims the benefit of and priority under 35 U.S.C. § 119(e) to U.S. Provisional Patent Application No. 63/047,111 filed Jul. 1, 2020, the entire contents of which are hereby incorporated by reference.

BACKGROUND

Dimension reduction and visualization of high-dimensional data have become important research topics in many scientific fields because of the rapid growth of data sets with large sample size and/or number of dimensions. Currently, there are linear methods that primarily focus on preserving the most significant structure or maximum variance in data, nonlinear methods that primarily focus on preserving the long or short distances in the high-dimensional space, and manifold learning methods that primarily focus on preserving the intrinsic structure of the high-dimensional data. Linear and non-linear methods generally perform well in preserving the global structure of data, but can fail to preserve the local structure. Many of the manifold learning methods suffer from the "crowding problem" while preserving a local distance of high-dimensional data in low-dimensional space. This means that to describe small distances in high-dimensional space faithfully, the points with moderate or large distances between them in high-dimensional space are placed too far away from each other in low-dimensional space. Therefore, in the visualization, the points with small or moderate distances between them crash together.

SUMMARY

In an example embodiment, a computer-readable medium is provided having stored thereon computer-readable instructions that when executed by a computing device, cause the computing device to transform high-dimensional data into low-dimensional data. (A) An observation vector is selected from a plurality of observation vectors. Each observation vector of the plurality of observation vectors includes a value for each variable of a plurality of variables. The plurality of variables define a high-dimensional space. (B) A distance is computed between the selected observation vector and each observation vector of the plurality of observation vectors. (C) A plurality of nearest neighbors to the selected observation vector are selected using the computed distances. A number of the plurality of nearest neighbors is a predefined number. Each nearest neighbor of the plurality of nearest neighbors is one of the plurality of observation vectors that are closest to the selected observation vector. (D) A first sigmoid function is applied to compute a distance similarity value between the selected observation vector and each of the selected plurality of nearest neighbors based on the value of each variable of the plurality of variables of the selected observation vector and on the value of each variable of the plurality of variables of each of the plurality of nearest neighbors. (A) through (D) are repeated with each observation vector of the plurality of observation vectors selected as the observation vector in (A). Each of the computed distance similarity values computed in (D) are added to a first matrix. An initial matrix is computed from the plurality of observation vectors. The initial matrix represents a transformation of each observation vector of the plurality of observation vectors into a low-dimensional space defined to include a predefined number of dimensions. The predefined number of dimensions is less than a number of the plurality of variables. An optimization method is executed with the computed initial matrix, the first matrix, and a gradient of a second sigmoid function that computes a second distance similarity value between the selected observation vector and each of the plurality of nearest neighbors in the low-dimensional space. The optimization method determines an optimized matrix that represents a transformation of each observation vector of the plurality of observation vectors into the low-dimensional space. The optimized matrix is output.

In another example embodiment, a computing device is provided. The computing device includes, but is not limited to, a processor and a computer-readable medium operably coupled to the processor. The computer-readable medium has instructions stored thereon that, when executed by the processor, cause the computing device to transform high-dimensional data into low-dimensional data.

In yet another example embodiment, a method of transforming high-dimensional data into low-dimensional data is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIGS. 2A through 2C depict a flow diagram illustrating examples of operations performed by a transformation application of the transformation device of FIG. 1 in accordance with an illustrative embodiment.

FIGS. 3A through 3D provide comparative clustering results using the transformation application with different values of a hyperparameter b value for a first dataset in accordance with an illustrative embodiment.

FIGS. 5A through 5D provide comparative clustering results using the transformation application with different values of the hyperparameter b value for a second dataset in accordance with an illustrative embodiment.

DETAILED DESCRIPTION

Figure 1:
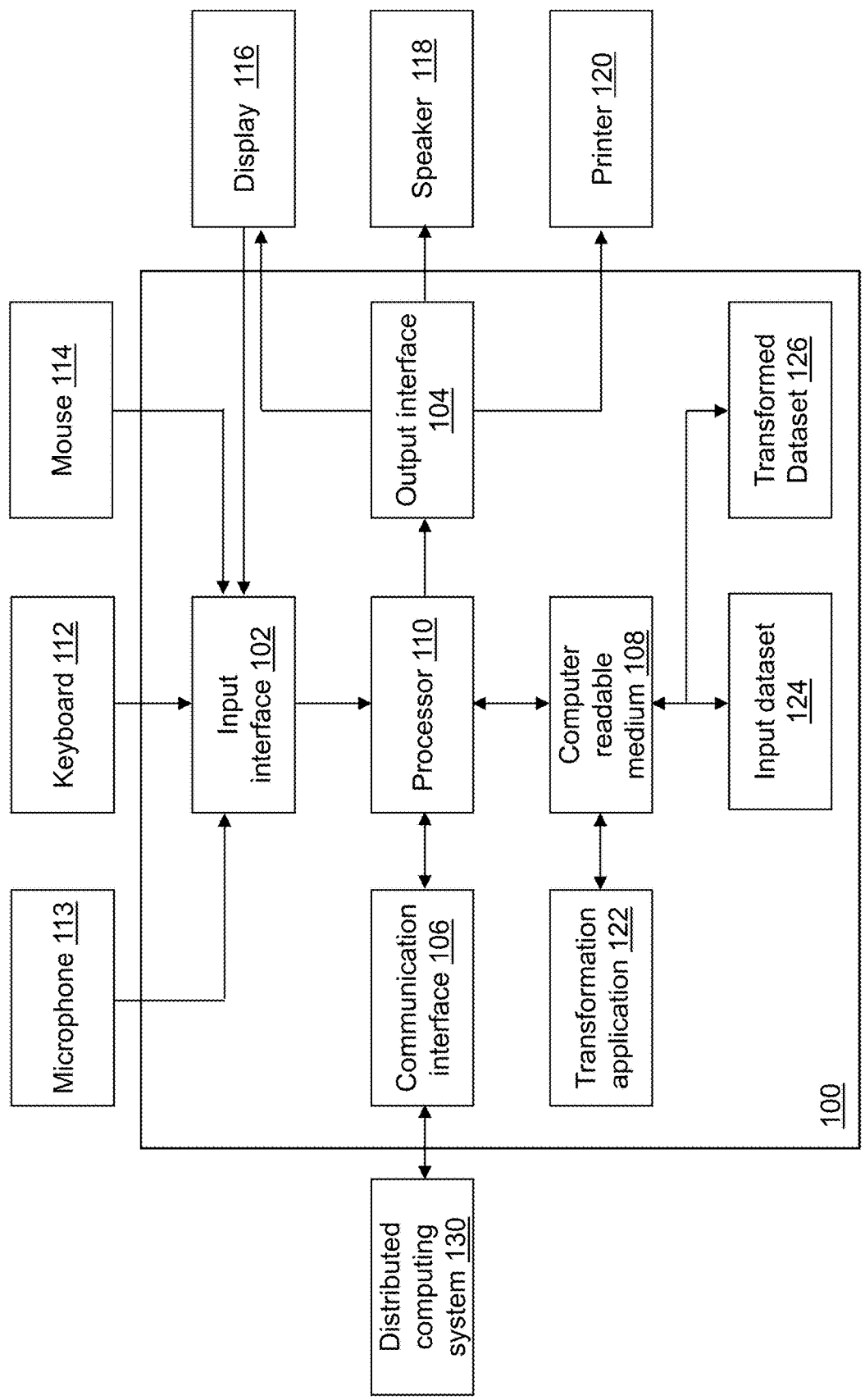
FIG. 1 depicts a block diagram of a transformation device in accordance with an illustrative embodiment.

Referring to FIG. 1, a block diagram of a transformation device 100 is shown in accordance with an illustrative embodiment. Transformation device 100 may include an input interface 102, an output interface 104, a communication interface 106, a non-transitory computer-readable medium 108, a processor 110, a transformation application 122, input dataset 124, and a transformed dataset 126. Fewer, different, and/or additional components may be incorporated into transformation device 100. Transformation application 122 uses a hyperparameter b value that can be adjusted to reveal a finer cluster structure of data stored in input dataset 124 or to assist in visualizing the data stored in input dataset 124 by increasing a continuity of neighbors. As a result, transformation application 122 provides improved visibility of the intrinsic structure of the data that may not be visible using existing dimension reduction and high-dimensional data visualization techniques.

Input interface 102 provides an interface for receiving information from the user or another device for entry into transformation device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into transformation device 100 or to make selections presented in a user interface displayed on display 116.

The same interface may support both input interface 102 and output interface 104. For example, display 116 comprising a touch screen provides a mechanism for user input and for presentation of output to the user. Transformation device 100 may have one or more input interfaces that use the same or a different input interface technology. The input interface technology further may be accessible by transformation device 100 through communication interface 106.

Output interface 104 provides an interface for outputting information for review by a user of transformation device 100 and/or for use by another application or device. For example, output interface 104 may interface with various output technologies including, but not limited to, display 116, a speaker 118, a printer 120, etc. Transformation device 100 may have one or more output interfaces that use the same or a different output interface technology. The output interface technology further may be accessible by transformation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Transformation device 100 may have one or more communication interfaces that use the same or a different communication interface technology. For example, transformation device 100 may support communication using an Ethernet port, a Bluetooth antenna, a telephone jack, a USB port, etc. Data and/or messages may be transferred between transformation device 100 and another computing device of a distributed computing system 130 using communication interface 106.

Computer-readable medium 108 is a non-transitory electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Transformation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Transformation device 100 also may have one or more drives that support the loading of a memory media such as a CD, DVD, an external hard drive, etc. One or more external hard drives further may be connected to transformation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Transformation device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Transformation application 122 performs operations associated with defining transformed dataset 126 from data stored in input dataset 124. Transformed dataset 126 includes a low-dimensional representation of observation vectors included in input dataset 124. For example, the low dimensional representation may be a transformation of the observation vectors included in input dataset 124 from high-dimensional data to two or three dimensions that can be graphically presented to understand how the observations included in input dataset 124 may be related. Such a visualization is not possible when directly using the observation vectors included in input dataset 124. The transformed observation vectors stored in transformed dataset 126 further may be clustered to present a visualization of the groupings of observation vectors included in input dataset 124 that may be used to classify or otherwise label the observation vectors included in input dataset 124. The classification or label may define a characteristic value associated with each observation vector included in input dataset 124. Some or all of the operations described herein may be embodied in transformation application 122. The operations may be implemented using hardware, firmware, software, or any combination of these methods.

Referring to the example embodiment of FIG. 1, transformation application 122 is implemented in software (comprised of computer-readable and/or computer-executable instructions) stored in computer-readable medium 108 and accessible by processor 110 for execution of the instructions that embody the operations of transformation application 122. Transformation application 122 may be written using one or more programming languages, assembly languages, scripting languages, etc. Transformation application 122 may be integrated with other analytic tools. As an example, transformation application 122 may be part of an integrated data analytics software application and/or software architecture such as that offered by SAS Institute Inc. of Cary, N.C., USA. Merely for illustration, transformation application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Transformation application 122 may be implemented as a Web application. For example, transformation application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. The plurality of variables defines a vector $x_i$ for each observation vector i=1, 2, . . . , N, where N is a number of the observation vectors included in input dataset 124. Each vector $x_i = \{x_1, x_2, \ldots, x_{N_V}\}$ includes a variable value for each variable, where $N_V$ is a number of the plurality of variables. Input dataset 124 may include additional variables that are not included in the plurality of variables. One or more variables of the plurality of variables may describe a characteristic of a physical object. For example, if input dataset 124 includes data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing or streamed to transformation device 100 as it is generated. Input dataset 124 may include data captured as a function of time for one or more physical objects. The data stored in input dataset 124 may be captured at different time points periodically, intermittently, when an event occurs, etc. Input dataset 124 may include data captured at a high data rate such as 200 or more observation vectors per second for one or more physical objects. One or more columns of input dataset 124 may include a time and/or date value. Input dataset 124 may include data captured under normal and/or abnormal operating conditions of the physical object.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input dataset 124 may be stored on computer-readable medium 108 or on one or more computer-readable media of distributed computing system 130 and accessed by transformation device 100 using communication interface 106, input interface 102, and/or output interface 104. Input dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input dataset 124 may be stored using various data structures as known to those skilled in the art including one or more files of a file system, a relational database, one or more tables of a system of tables, a structured query language database, etc. on transformation device 100 or on distributed computing system 130. Transformation device 100 may coordinate access to input dataset 124 that is distributed across distributed computing system 130 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art.

The SAS® LASR™ Analytic Server may be used as an analytic platform to enable multiple users to concurrently access data stored in input dataset 124. The SAS Viya open, cloud-ready, in-memory architecture also may be used as an analytic platform to enable multiple users to concurrently access data stored in input dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
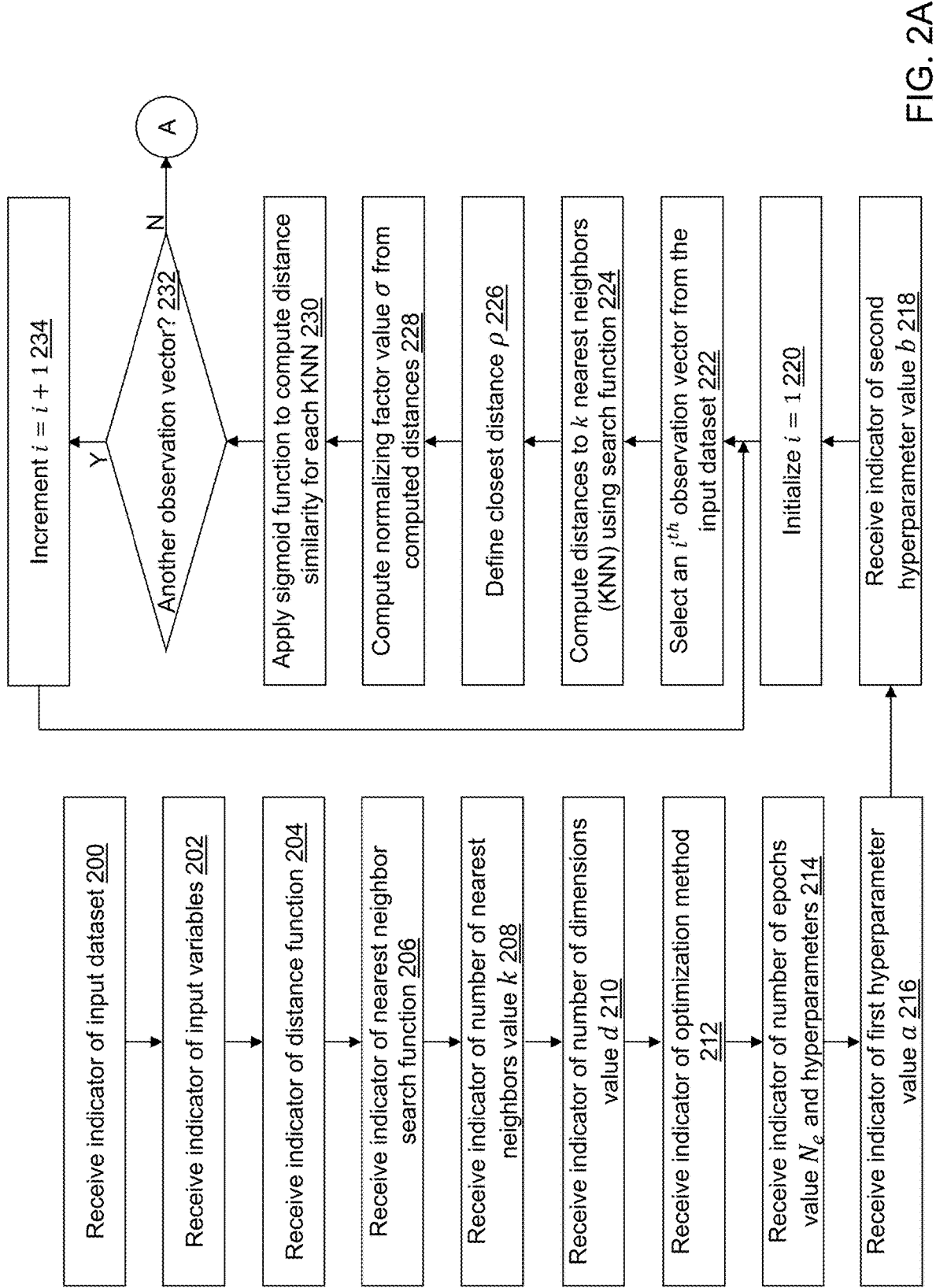
Figure 2B:
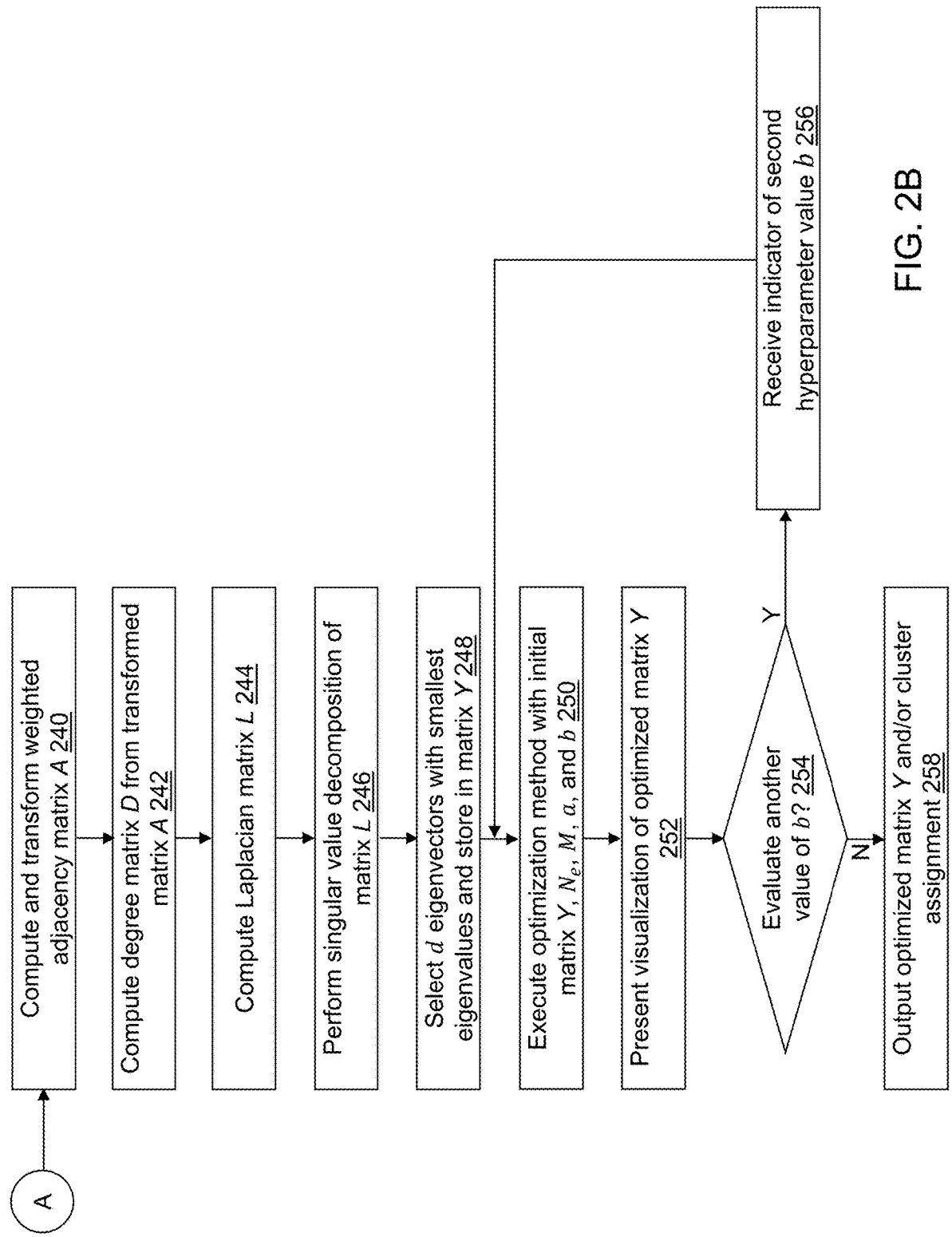
Figure 3A:
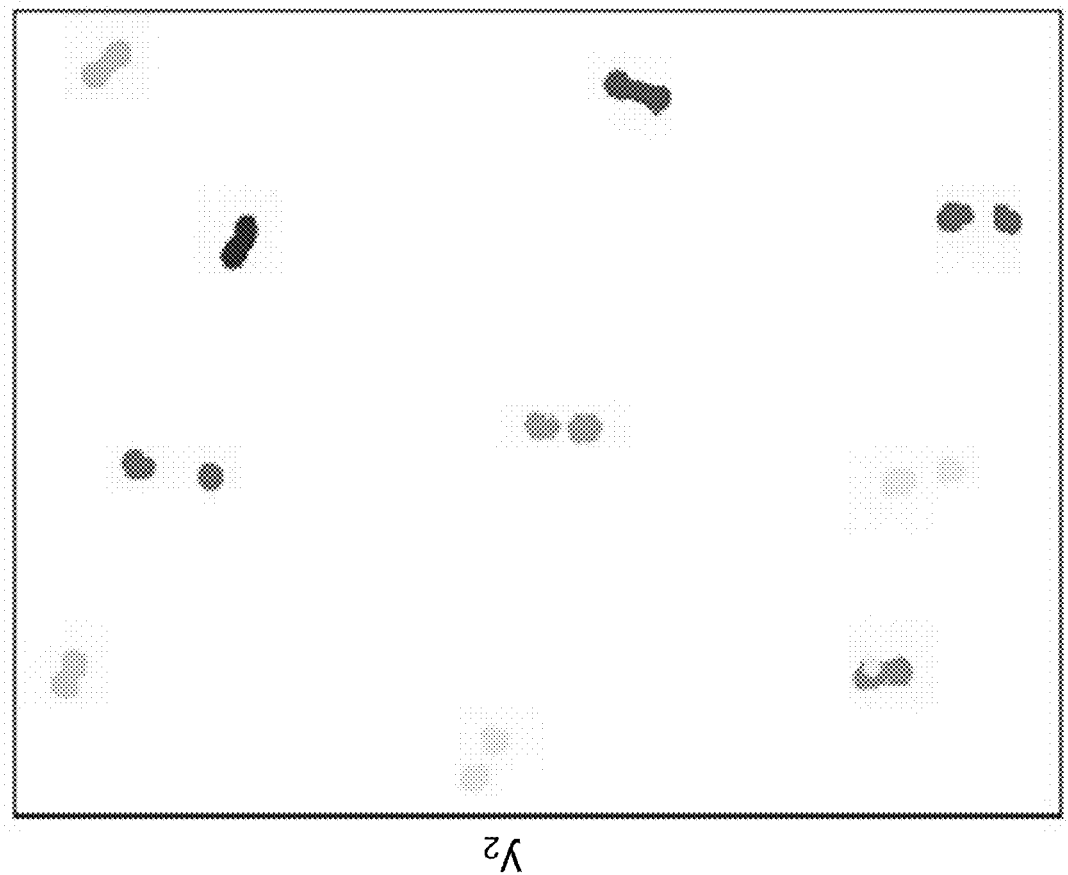
Figure 3B:
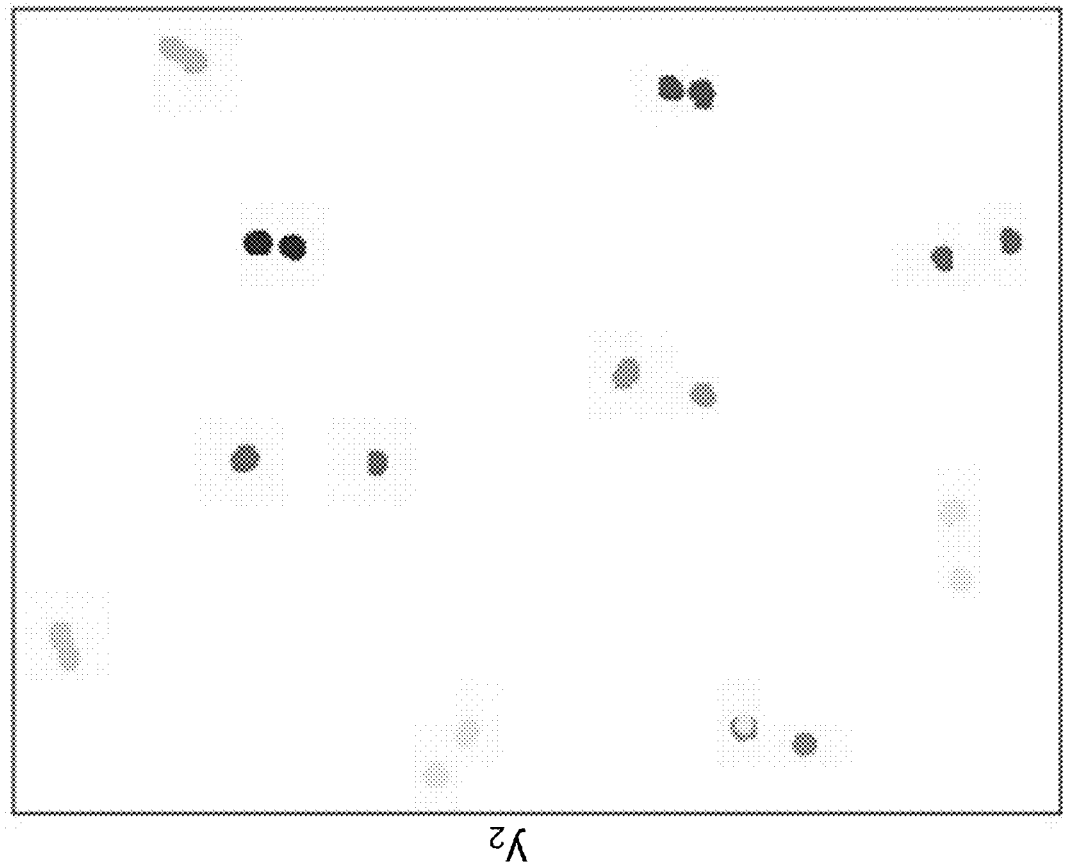

Referring to FIGS. 2A to 2C, example operations associated with transformation application 122 are described. Additional, fewer, or different operations may be performed depending on the embodiment of transformation application 122. The order of presentation of the operations of FIGS. 2A to 2C is not intended to be limiting. Some of the operations may not be performed in some embodiments. Although some of the operational flows are presented in sequence, the various operations may be performed in various repetitions and/or in other orders than those that are illustrated. For example, a user may execute transformation application 122, which causes presentation of a first user interface window, which may include a plurality of menus and selectors such as drop-down menus, buttons, text boxes, hyperlinks, etc. associated with transformation application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by transformation application 122. The operations of transformation application 122 further may be performed in parallel using a plurality of threads and/or a plurality of worker computing devices.

Referring to FIG. 2A, in an operation 200, a first indicator may be received that indicates input dataset 124. For example, the first indicator indicates a location and a name of input dataset 124. As an example, the first indicator may be received by transformation application 122 after selection from a user interface window or after entry by a user into a user interface window. In an alternative embodiment, input dataset 124 may not be selectable. For example, a most recently created dataset may be used automatically.

In an operation 202, a second indicator may be received that indicates the plurality of variables or features to include when transforming the observation vectors included in input dataset 124. For example, the second indicator may indicate a plurality of column numbers or a plurality of column names. As another option, all of the columns may be used by default. Each observation vector $x_j$, $i= \ldots, N_V$ read from input dataset 124 may include a value for each variable of the plurality of variables to define $N_V$ dimensions or features. Input dataset 124 includes a set of observation vectors $X=[x_{j,i}]$, $i=1, 2, \ldots, N_V$, $j=1, 2, \ldots, N$. When a value for a variable of the plurality of variables is missing, the observation vector may not be included in the number of observation vectors N, a value may be computed for the missing variable.

In an operation 204, a third indicator of a distance function may be received. For example, the third indicator indicates a name of a distance function. The third indicator may be received by transformation application 122 after selection from a user interface window or after entry by a user into a user interface window. A default value for the distance function may further be stored, for example, in computer-readable medium 108. As an example, a distance function may be selected from "Euclidean", "Kullback-Leibler", "Manhattan", "Minkowski", "Cosine", "ChebysheV", "Hamming", etc. As an example, a default distance function may be "Euclidean". Of course, the distance function may be labeled or selected in a variety of different manners by the user as understood by a person of skill in the art. In an alternative embodiment, the distance function may not be selectable, and a single distance function is implemented by transformation application 122.

In an operation 206, a fourth indicator of a nearest neighbor search function may be received. For example, the fourth indicator indicates a name of a nearest neighbor search function. The fourth indicator may be received by transformation application 122 after selection from a user interface window or after entry by a user into a user interface window. A default value for the nearest neighbor search function may further be stored, for example, in computer-readable medium 108. As an example, a nearest neighbor search function may be selected from "K Nearest Neighbor", K-D Tree", "Nearest Neighbor Descent", etc. As an example, a default nearest neighbor search function may be "K Nearest Neighbor". Of course, the nearest neighbor search function may be labeled or selected in a variety of different manners by the user as understood by a person of skill in the art. In an alternative embodiment, the nearest neighbor search function may not be selectable, and a single nearest neighbor search function is implemented by transformation application 122.

In an operation 208, a fifth indicator of a number of nearest neighbors value k may be received in addition to any other hyperparameters used by the nearest neighbor search function indicated in operation 206. In an alternative embodiment, the fifth indicator may not be received. For example, a default value(s) may be stored, for example, in computer-readable medium 108 and used automatically. In another alternative embodiment, the number of nearest neighbors value k may not be selectable. Instead, a fixed, predefined value may be used. For illustration, a default value for the number of nearest neighbors value k may be k=10 though other values may be used. The number of nearest neighbors value k indicates a number of observation vectors from input dataset 124 to identify as nearest neighbor relative to each observation vector to define a graph of the observation vectors included in input dataset 124.

In an operation 210, a sixth indicator of a number of dimensions value d may be received. In an alternative embodiment, the sixth indicator may not be received. For example, a default value may be stored, for example, in computer-readable medium 108 and used automatically. In another alternative embodiment, the value of the number of dimensions value d may not be selectable. Instead, a fixed, predefined value may be used. For illustration, a default value for the number of dimensions value d may be d=2 though other values may be used. The number of dimensions value d indicates a number of dimensions to include in the low-dimensional transformation of the observation vectors included in input dataset 124. Typically, the number of dimensions value d may be d=2 or d=3 to allow a graphical presentation of the observation vectors included in input dataset 124 in the low-dimensional space though other values may be used.

In an operation 212, a seventh indicator of an optimization method used to determine the low-dimensional space may be received. For example, the seventh indicator indicates a name of an optimization method. The seventh indicator may be received by transformation application 122 after selection from a user interface window or after entry by a user into a user interface window. A default value for the optimization method may further be stored, for example, in computer-readable medium 108. As an example, an optimization method may be selected from "SGD", "SGD with Negative Sampling", etc. SGD indicates stochastic gradient descent. SGD with negative sampling, for example, is described in a paper by Tomas Mikolov et al. titled *Distributed Representations of Words and Phrases and their Compositionality* published Oct. 16, 2013 In Advances in neural information processing systems, pp. 3111-3119, 2013. As an example, a default optimization method may be "SGD with Negative Sampling". Of course, the optimization method may be labeled or selected in a variety of different manners by the user as understood by a person of skill in the art. In an alternative embodiment, the optimization method may not be selectable, and a single optimization method is implemented by transformation application 122.

In an operation 214, an eighth indicator of a number of epochs value $N_e$ may be received in addition to any other hyperparameters used by the optimization method indicated in operation 212. For example, when SGD with negative sampling is selected in operation 212, a number of negative samples value M may also be received as part of the eighth indicator. As another example, some optimization methods may include a hyperparameter $\alpha_k$ that is a step-size or a learning rate value. In an alternative embodiment, the eighth indicator may not be received. For example, a default value(s) may be stored, for example, in computer-readable medium 108 and used automatically. In another alternative embodiment, the number of epochs value $N_e$ or other hyperparameters used by the optimization method may not be selectable. Instead, a fixed, predefined value(s) may be used. For illustration, a default value for the number of epochs value $N_e$ may be $N_e$=500 though other values may be used. The number of $N_e$ indicates a number of iterations of the optimization method before processing is stopped. For illustration, a default value for the number of negative samples value M may be M=5 though other values may be used. For illustration, a default value for the step-size $\alpha_k$ may be $\alpha_k$=1 though other values may be used. The number of negative samples value M and the step-size value $\alpha_k$ may be initial values that can change as the process executes.

In an operation 216, a ninth indicator of a first hyperparameter $\alpha$ may be received. In an alternative embodiment, the ninth indicator may not be received. For example, a default value may be stored, for example, in computer-readable medium 108 and used automatically. In another alternative embodiment, the value of the first hyperparameter $\alpha$ may not be selectable. Instead, a fixed, predefined value may be used. For illustration, a default value for the first hyperparameter $\alpha$ may be $\alpha$=1 and a may further be in the range [1,1.5] though other values may be used.

In an operation 218, a tenth indicator of a second hyperparameter b may be received. In an alternative embodiment, the tenth indicator may not be received. For example, a default value may be stored, for example, in computer-readable medium 108 and used automatically. In another alternative embodiment, the value of the second hyperparameter b may not be selectable. Instead, a fixed, predefined value may be used. For illustration, a default value for the second hyperparameter b may be b=1 though other values may be used.

In an operation 220, an observation index i is initialized, for example, as i=1.

In an operation 222, an $i^{th}$ observation vector is selected from input dataset 124.

In an operation 224, distances to the k nearest neighbors of the selected $i^{th}$ observation vector are computed using the nearest neighbors search function indicated in operation 208 with the distance function indicated in operation 204.

In an operation 226, a closest distance ρ is selected from the computed distances to the k nearest neighbors of the selected $i^{th}$ observation vector.

In an operation 228, a binary search is used to compute a value for a normalizing factor σ for the selected $i^{th}$ observation vector. For example, the operations of FIG. 2C may be used to compute the value for normalizing factor σ.

Referring to FIG. 2C, in an operation 262, an eleventh indicator of a first bound value τ, a second bound value β, and a tolerance value ε may be received for the binary search. In an alternative embodiment, the eleventh indicator may not be received. For example, a default value(s) may be stored, for example, in computer-readable medium 108 and used automatically. In another alternative embodiment, the value of any of the first bound value τ, the second bound value β, and the tolerance value ε may not be selectable. Instead, a fixed, predefined value(s) may be used. For illustration, a default value for the first bound value τ=0.00001, the second bound value β=1000000, and the tolerance value ε=e$^{-5}$ though other values may be used.

In an operation 264, a value for a is computed, for example, using σ=(τ+β)/2.

In an operation 266, a determination is made concerning whether f(σ)<0, where $$f(\sigma) = \sum_{j=1}^{k} \frac{1}{1 + \frac{\max(0, dis_j - \rho)}{\sigma}} - \log_2^k,$$

where $dis_j$ is the distance computed between the $j^{th}$ nearest neighbor and the selected $i^{th}$ observation vector using the distance function indicated in operation 204. When f(σ)<0, processing continues in an operation 268. When f(σ)≥0, processing continues in an operation 270.

In operation 268, τ=σ, and processing continues in an operation 272.

In operation 270, β=σ, and processing continues in operation 272.

In operation 272, a determination is made concerning whether |τ−β|<ε. When |τ−β|<ε, processing continues in an operation 274. When |τ−β|≥ε, processing continues in operation 264.

In operation 274, the computation of a is complete and less than the tolerance value E.

Referring again to FIG. 2A, in an operation 230, a sigmoid function is applied to compute a distance similarity between each nearest neighbor of the selected $i^{th}$ observation vector as $$\delta_j = \frac{1}{1 + \frac{\max(0, dis_j - \rho)}{\sigma}}, j = 1, \ldots, k,$$

where $\delta_j$ is the distance similarity computed between the $j^{th}$ nearest neighbor and the selected $i^{th}$ observation vector. The computed distance similarity $\delta_j$ may be stored in association with the selected $i^{th}$ observation vector. An indicator of the observation vector associated with each nearest neighbor may further be stored. For example, the computed distance similarity $\delta_j$ between each nearest neighbor of the selected $i^{th}$ observation vector may be stored as a local fuzzy simplicial set in a manner similar to that described in a paper by Leland McInnes et al. titled UMAP: Uniform Manifold Approximation and Projection for Dimension Reduction published Dec. 6, 2018 at arXiv:1802.03426v2 [stat.ML] (the UMAP paper) though using a generalized sigmoid function $$\frac{1}{1 + \frac{\max(0, dis_j - \rho)}{\sigma}}$$

instead of $$\exp\frac{\max(0, dis_j - \rho)}{\sigma},$$

where the fuzzy simplicial set may be defined as $$fsset(x_i) = \bigcup_{x_j \in KNN(x_i)} \left( [x_i, x_j], \frac{1}{1 + \frac{\max(0, dis_j - \rho)}{\sigma}} \right).$$

In an operation 232, a determination is made concerning whether there is another observation vector included in input dataset 124 to process, for example based on i<N. When i<N, processing continues in an operation 234. When i≥N, processing continues in an operation 240 shown referring to FIG. 2B.

In operation 234, the observation index i is incremented, for example, using i=i+1, and processing continues in operation 222.

Referring to FIG. 2B, in operation 240, a weighted adjacency matrix A is computed. For example, a 1-skeleton of a top-rep is expressed as the weighted adjacency matrix A is used as described in the UMAP paper, where the top-rep is defined as $\bigcup_{x \in X} fsset(x_i)$, where X is the set of observation vectors included in input dataset 124, and $$A = \begin{bmatrix} w_{11} & \cdots & w_{1N} \\ \vdots & \ddots & \vdots \\ w_{N1} & \cdots & w_{NN} \end{bmatrix}.$$

The weighted adjacency matrix A is a N×N matrix. If $x_j$ is within the KNN of $x_i$, $$w_{ij} = \frac{1}{1 + \frac{\max(0, dis_j - \rho)}{\sigma}},$$

otherwise, $w_{ij}$=0. After calculating the weighted adjacency matrix A, a transformation is applied to matrix A, which may be B=A+A$^T$−A°A$^T$ or B=A+A$^T$, where T indicates a transpose, and ° indicates a Hadamard product.

In an operation 242, a degree matrix D is computed from B=

$$\begin{bmatrix} w_{11} & \cdots & w_{1N} \\ \vdots & \ddots & \vdots \\ w_{N1} & \cdots & w_{NN} \end{bmatrix},$$

for example, as described in the UMAP paper using D=

$$\begin{bmatrix} d_1 & & \\ & \ddots & \\ & & d_N \end{bmatrix},$$

where $d_j = \Sigma_{i=1}^N w_{ij}$, $j=1, 2, \ldots, N$, if $i=j$ and $d_j=0$ if $i \neq j$.

In an operation 244, a normalized graph Laplacian matrix L is computed, for example, as described in the UMAP paper as $$L = D^{-\frac{1}{2}}(D-B)D^{-\frac{1}{2}}.$$

In an operation 246, a singular value decomposition of the normalized graph Laplacian matrix L is performed to define eigenvectors with associated eigenvalues. For example, the singular value decomposition is defined based on $L = V \Sigma V^T$.

In an operation 248, d eigenvectors having the smallest eigenvalues are selected from the singular value decomposition V and stored in a matrix Y. Matrix Y includes $y_i$, $i=1, 2, \ldots, N$, where each $y_i$ is a d-dimensional representation of the $i^{th}$ observation vector included in input dataset 124. For example, matrix Y is an N×d dimensioned matrix.

In an operation 250, the optimization method indicated in operation 212 with the hyperparameters indicated in operation 212 and operation 214 is executed with the values of the first hyperparameter $\alpha$ and the second hyperparameter b. For example, using SGD, SGD updates have the form $$Y_{k+1} = Y_k + \alpha_k g(Y_k)$$

where $Y_k$ denotes a current iterate, $a_k$ the step-size or learning rate value, and $g(Y_k)$ a gradient vector.

The optimization method is computing an optimized solution for matrix Y that includes the d-dimensional transformation of each observation vector included in input dataset 124. The loss function to be optimized is $$Loss = -\left( \sum_{(x_i, x_j) \in E} P_{ij} \log Q(i,j) + \sum_{(x_i, x_j) \notin E} \log(1 - Q(i,j)) \right)$$

where E is a collection of points $(x_i, x_1)$ for which either $x_i$ is one of the k nearest neighbors of $x_j$ or $x_j$ is one of the k nearest neighbors of $$x_i, P_{ij} = P_{j|i} + P_{i|j} - P_{i|j} \odot P_{j|i},$$

$$P_{j|i} = \begin{cases} \delta_j, & \text{if } x_j \text{ is one of the } k \text{ nearest neighbors of } x_i \\ 0, & \text{otherwise} \end{cases},$$

$$P_{i|j} = \begin{cases} \delta_i, & \text{if } x_i \text{ is one of the } k \text{ nearest neighbors of } x_j \\ 0, & \text{otherwise} \end{cases},$$

⊙ indicates component wise multiplication, and $$Q(i,j) = \frac{1}{\left[ 1 + \left( 2^{\frac{1}{b}} - 1 \right) \|y_i - y_j\|_2^a \right]^b}.$$

The definition of Q(i,j) is based on assuming that a membership strength of $y_i$ and $y_j$ can be modeled using a generalized sigmoid function, which can be expressed as $$Q(i,j) = \frac{1}{\left[ 1 + \left( 2^{\frac{u}{v}} - 1 \right) \left( \frac{\|y_i - y_j\|_2}{s} \right)^u \right]^{\frac{v}{u}}}$$

Letting $\alpha = u$ and $b = v/u$, $$Q(i,j) = \frac{1}{\left[ 1 + \left( 2^{\frac{1}{b}} - 1 \right) \frac{\|y_i - y_j\|_2^a}{s^a} \right]^b}$$

When b=1, $$Q(i,j) = \frac{1}{1 + \frac{\|y_i - y_j\|_2^a}{s^a}}$$

that is equivalent to $\alpha = 2b_U$ and $s^{-\alpha} = \alpha_U$, according to the UMAP paper where $\alpha_U$ and $b_U$ are the hyperparameters a and b described in section 3.2 of the UMAP paper.

A simplified version of Q(i,j) can be defined by rescaling by s that results in $$Q(i,j) = \frac{1}{\left[ 1 + \left( 2^{\frac{1}{b}} - 1 \right) \|y_i - y_j\|_2^a \right]^b}.$$

Using the negative sampling strategy with SGD as described in the UMAP paper, the loss function can be written as $$Loss = -\left( \sum_{(x_i, x_j) \in E} P_{ij} \log Q(i,j) + \sum_{l=1}^M \log(1 - Q(i,l)) \right)$$

where l indicates an $l^{th}$ negative sample for the $i^{th}$ observation vector. The gradient of the loss function can be computed using $$\frac{\partial L}{\partial y_i} = -\left( \sum_{(i,j) \in E} P_{ij} \frac{\partial Q(i,j)/\partial y_i}{\partial y_i} - \sum_{l=1}^M \frac{\partial Q(i,l)/\partial y_i}{1 - Q(i,l)} \right)$$

$$\partial Q(i,j) / \partial y_i =$$
$$-ab(1 + (a^{1/b} - 1)\|y_i - y_j\|_2^a)^{-b-1} \left(2^{\frac{1}{b}} - 1\right) \|y_i - y_j\|_2^{a-2}(y_i - y_j).$$

In an operation 252, a visualization of the optimized matrix Y is provided, for example, on display 116. Illustrative graphs that may be presented as part of the visualization are shown in FIGS. 3A to 3D, 5A to 5D, 8A to 8D, 10A to 10D, and 12A to 12D discussed further below where the data was further clustered.

In operation 254, a determination is made concerning whether to evaluate another value of b based on the visualization results. When another value of b is to be evaluated, processing continues in an operation 256. When another value of b is not to be evaluated, processing continues in an operation 258.

In operation 256, the tenth indicator of the second hyperparameter b may be received to define a new value for b, and processing continues in operation 250 to compute a new optimized matrix Y.

In operation 258, the optimized matrix Y is output, for example, to transformed dataset 126. A cluster assignment may further be output in association with a respective observation vector when clustering is performed of the optimized matrix Y.

Figure 14:
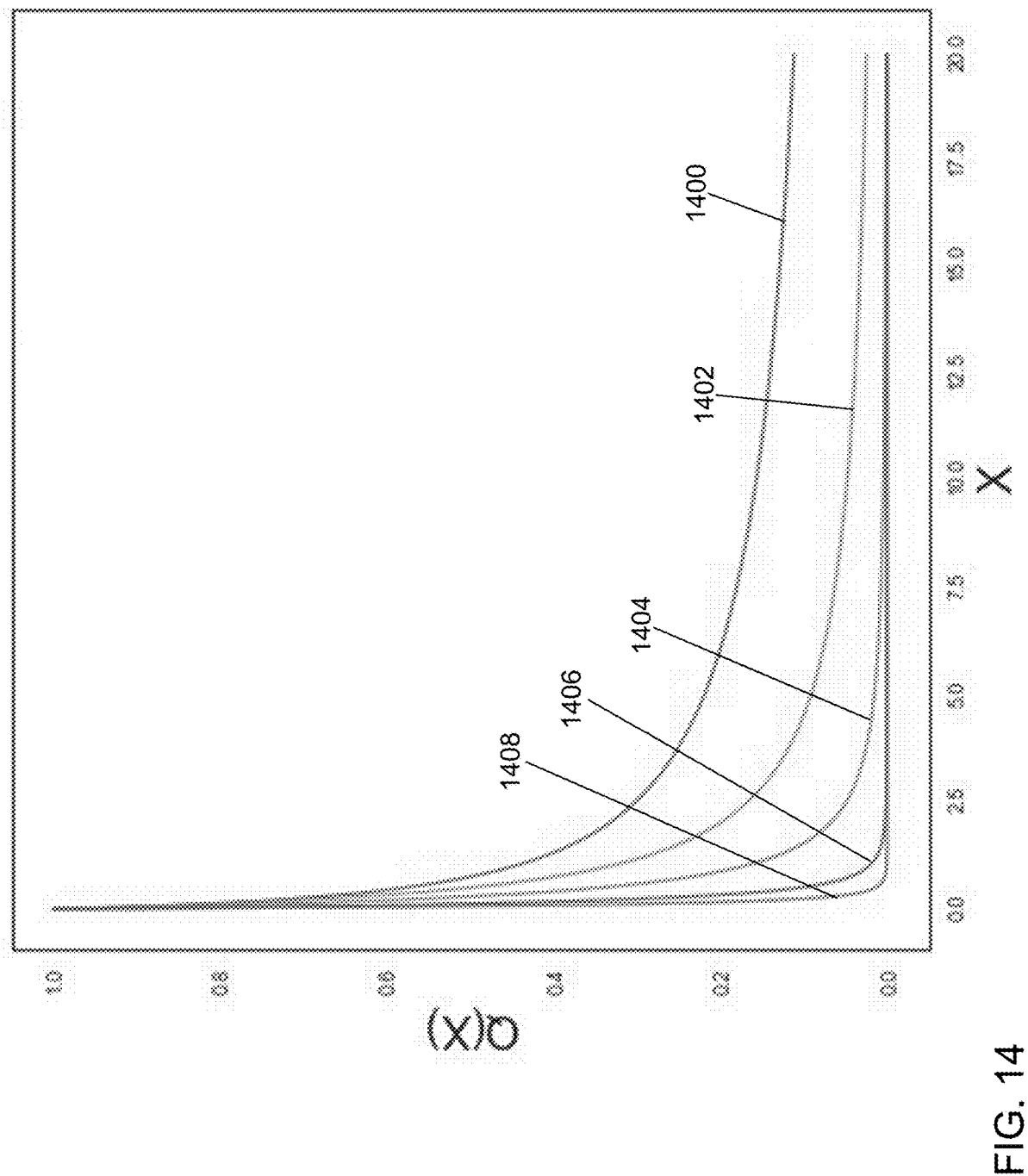
FIG. 14 presents a graph illustrating an effect of various values of a hyperparameter on a distance similarity in low-dimensional in accordance with an illustrative embodiment.

The value of the first hyperparameter $\alpha$ is less important than the value of the second hyperparameter b, and setting $\alpha=1$ generally provides satisfactory results. Because the second hyperparameter b controls a rate of the curve approaching 0 and 1, adjusting the value of the second hyperparameter b can affect the embeddings in low-dimensional space and, as a result, the data visualization. Referring to FIG. 14, a behavior of $$Q(i, j) = \frac{1}{\left[1 + \left(2^{\frac{1}{b}} - 1\right)\|y_i - y_j\|_2^\alpha\right]^b}$$

with varying values of the second hyperparameter b is shown in accordance with an illustrative embodiment. A first curve 1400 shows a curve shape with b=0.5; a second curve 1402 shows a curve shape with b=1; a third curve 1404 shows a curve shape with b=2; a fourth curve 1406 shows a curve shape with b=5; and a fifth first curve 1408 shows a curve shape with b=10. The smaller the value of the second hyperparameter b, the more heavy-tailed the curve is. The heavy-tail property of the curve can greatly alleviate the crowding problem when embedding high-dimensional data in a low-dimensional space and thus, provides the capability of revealing a finer structure of the data included in input dataset 124.

A performance of transformation application 122 was evaluated. The performance of transformation application 122 was compared to the UMAP method described in the UMAP paper on an image classification task using a first dataset. The first dataset was randomly generated to include 1,000 observations defined by 20 dimensions. The observations were evenly distributed among 10 clusters with each cluster including 100 observations. Within each cluster, the first 50 observations were randomly sampled from a Gaussian distribution with mean $\mu_i=5e_i+2.3e_{10+i}$ and the other 50 observations were randomly sampled from a Gaussian distribution with mean $\mu_i=5e_i-2.3e_{10+i}$, where $e_i$ is an $i^{th}$ basis vector and i=1, 2, . . . , 10. The first dataset should be separable into 10 distinct clusters. Within each big cluster, the first dataset should be classified into two subclusters or at least have a "dumbbell" shape due to the different mean values. All of the observations had covariance $I_{20}$. For each of four executions, k=10, $\alpha=1$, and b=0.5, 1, 2, 10, respectively. The UMAP method was also executed four times using k=10 and min_dist=0.001, 0.01, 0.1, 1, respectively. Initial values of the embedding were set to be the two eigenvectors with minimum eigenvalues of the normalized Laplacian, and the SGD with negative sampling algorithm was performed using 500 epochs. A Euclidean distance function was used.

Referring to FIGS. 3A through 3D, comparative clustering results are shown using transformation application 124 with b=0.5, 1, 2, 10, respectively, with the first dataset in accordance with an illustrative embodiment. Referring to FIGS. 3A through 3D, the big clusters were well separated from each other for all of the four values b=0.5, 1, 2, 10. In addition, when b=0.5 and 1, a majority of the big clusters were separated into two isolated subclusters. For the rest of the big clusters, the dumbbell shape was clearly visible as well. With the increasing values of b, the two subclusters within each cluster got closer and closer and eventually merged into one cluster. However, even with b=10, the dumbbell shape within each big cluster remained clearly visible.

Figure 4B:
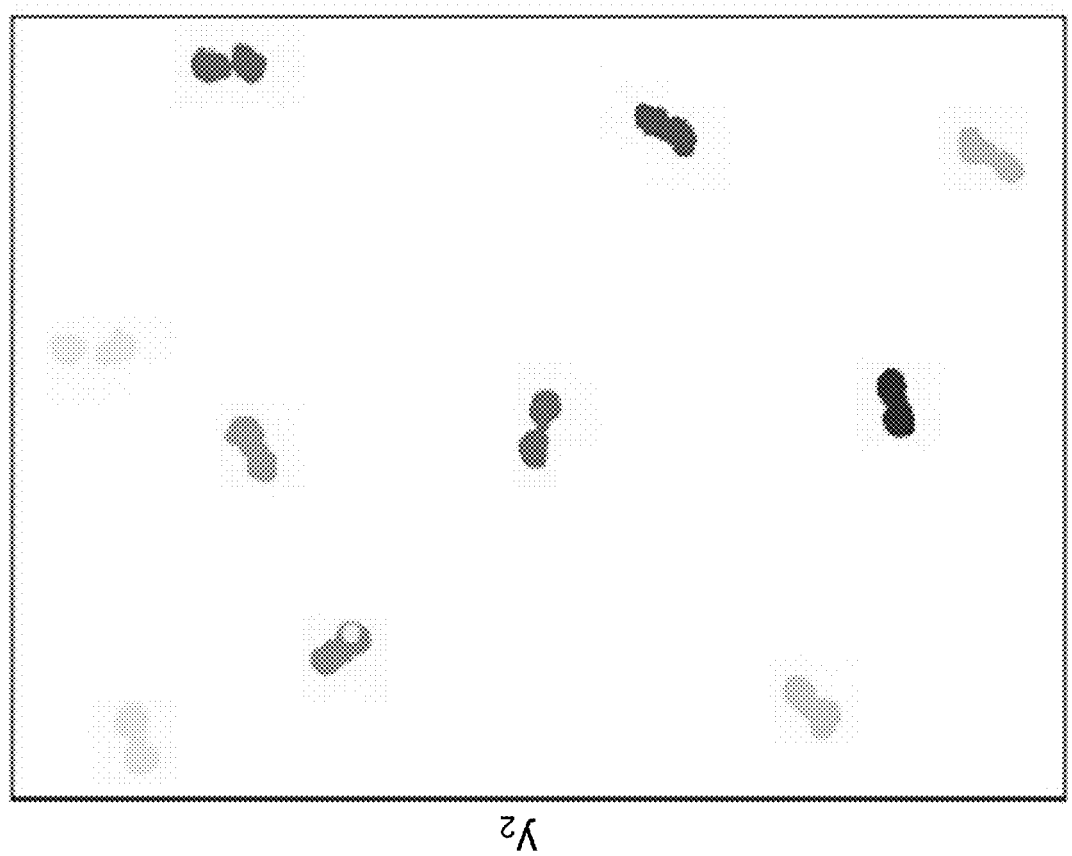
FIGS. 4A through 4D provide comparative clustering results using an existing clustering application with different values of a minimum distance hyperparameter value for the first dataset in accordance with an illustrative embodiment.
Figure 4A:
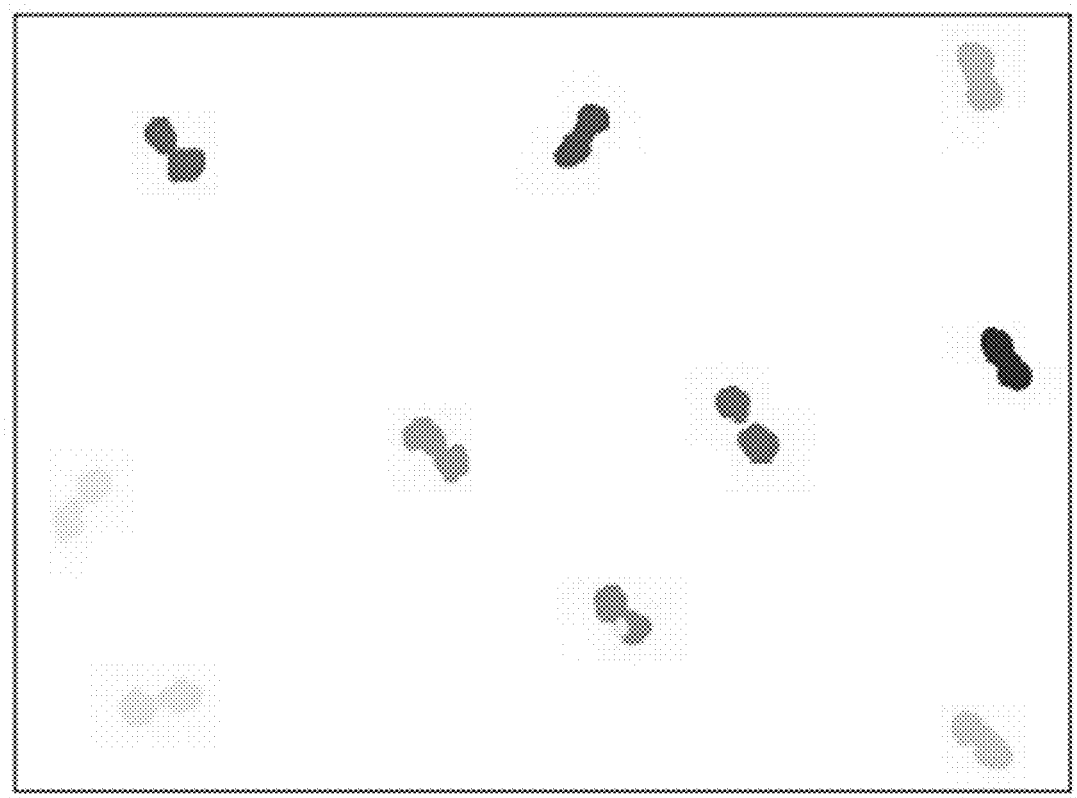
Figure 4D:
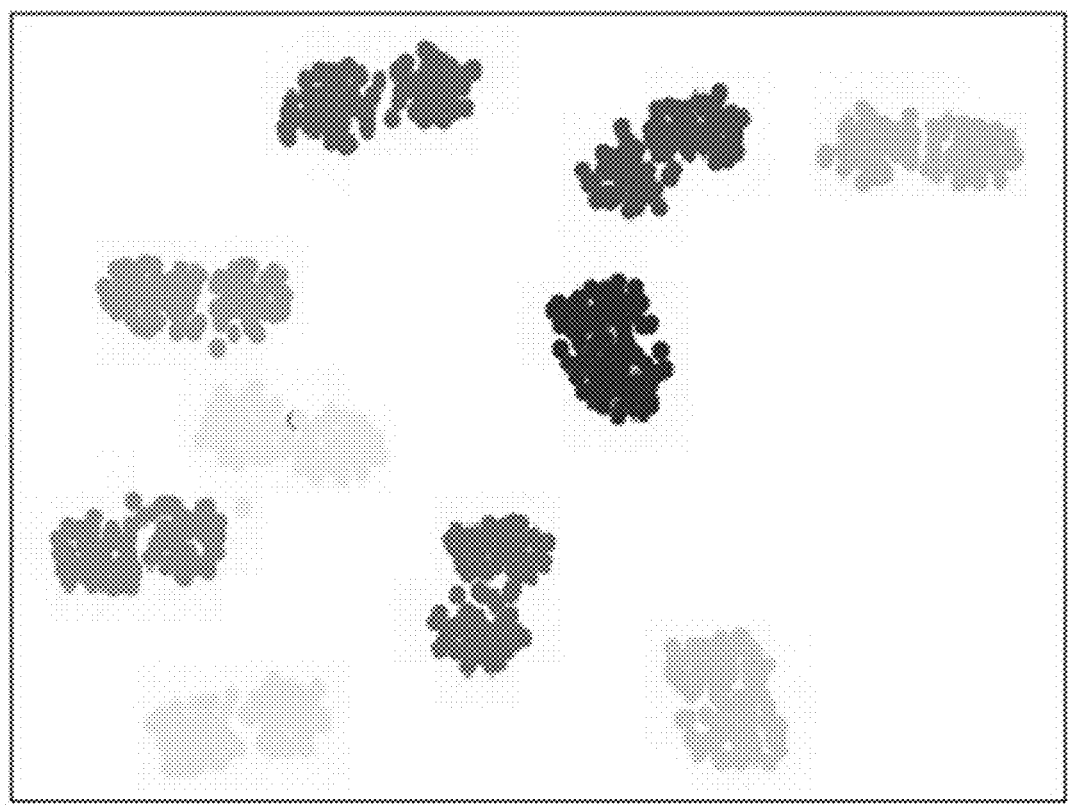
Figure 4C:
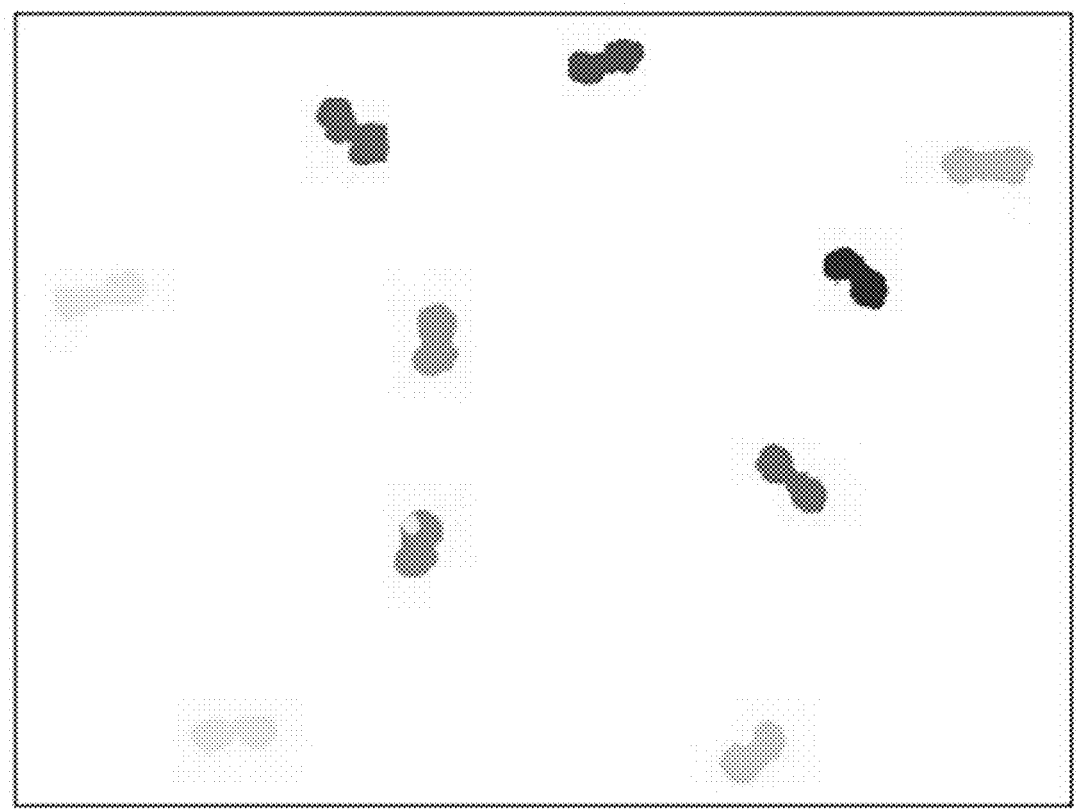
Figure 6A:
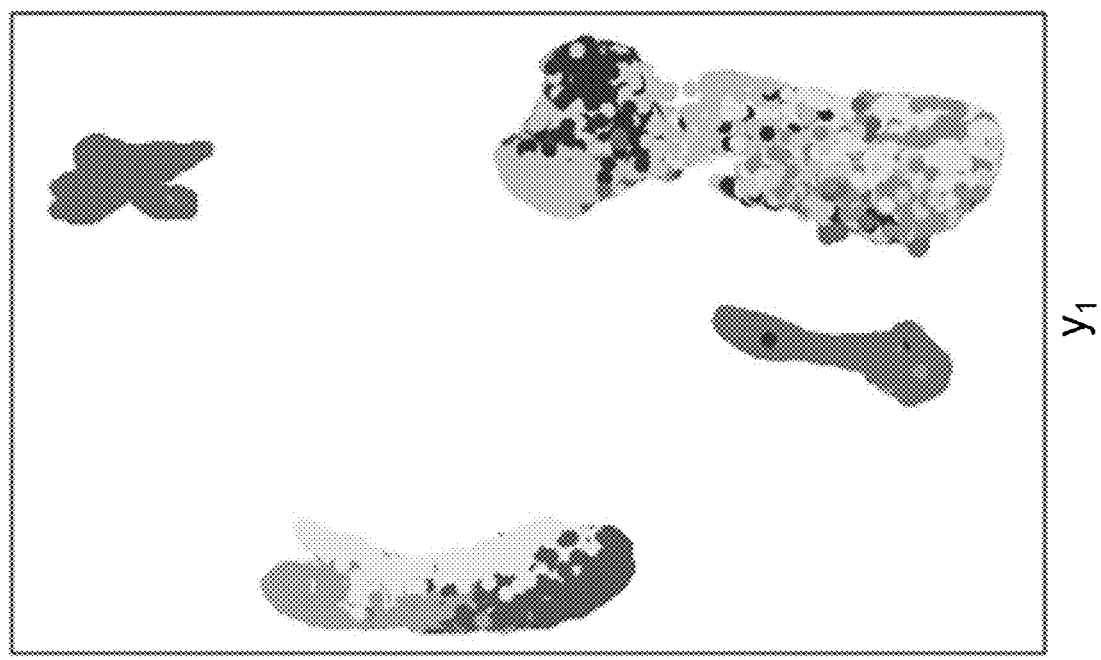
FIGS. 6A through 6D provide comparative clustering results using an existing clustering application with different values of the minimum distance hyperparameter value for the second dataset in accordance with an illustrative embodiment.
Figure 6B:
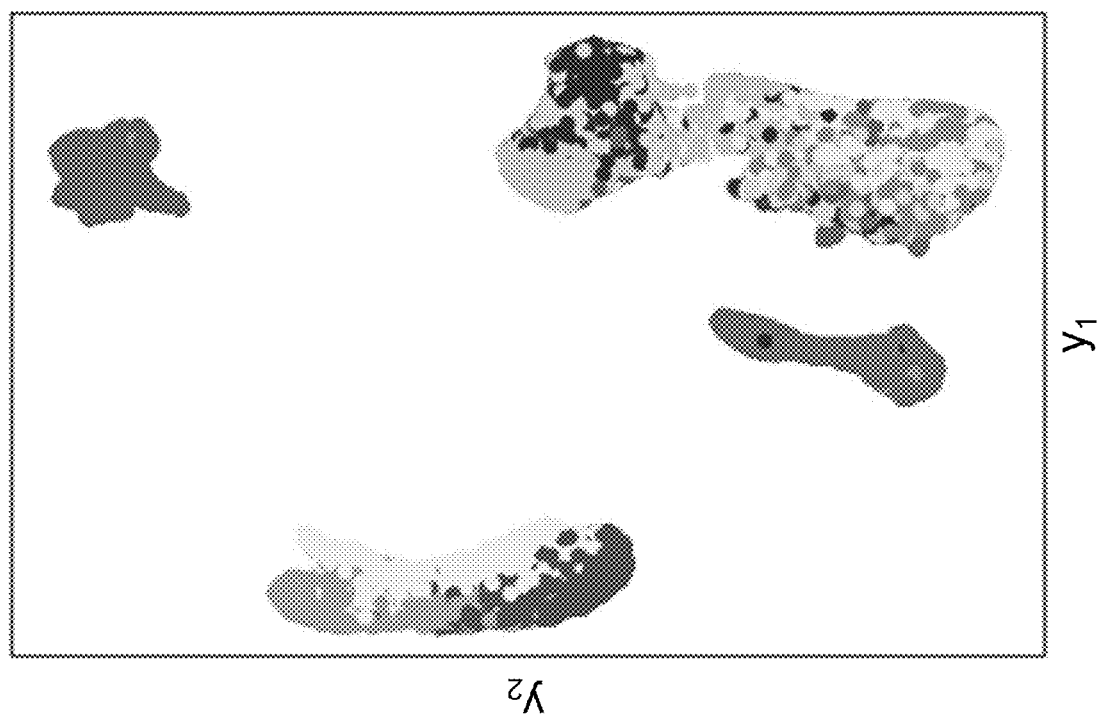
Figure 6D:
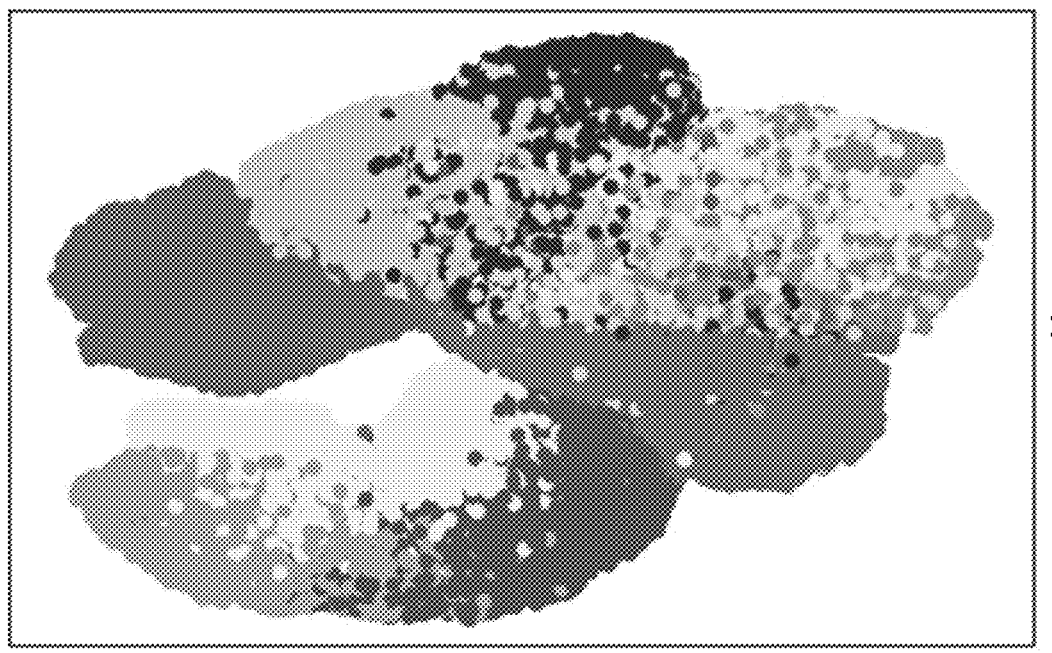
Figure 6C:
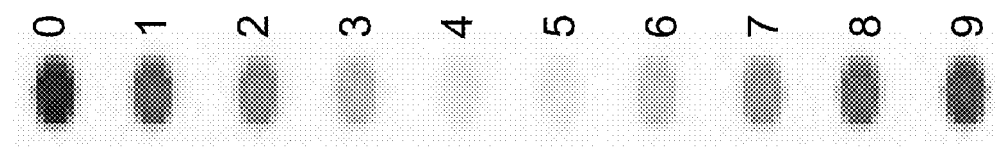
Figure 6C:
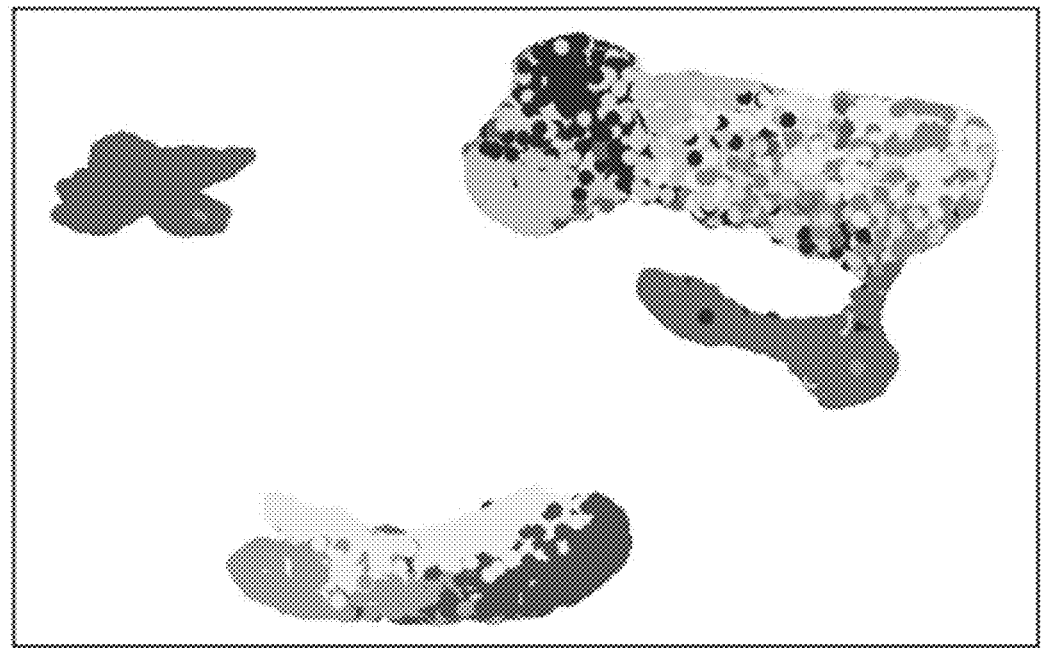

Referring to FIGS. 4A through 4D, comparative clustering results are shown using the UMAP method with min_dist=0.001, 0.01, 0.1, 1, respectively, and with the first dataset in accordance with an illustrative embodiment. Referring to FIG. 4A, even with min_dist=0.001, the subclusters within each big cluster are not well separated though the dumbbell shape is visible for some of the clusters. With increasing values of min_dist, the distances between different clusters decrease, and the dumbbell shape is lost within several clusters. There is further not much difference between FIGS. 4A and 4B.

The performance of transformation application 122 was compared to the UMAP method using four different real datasets. For each of the four real datasets, k=10, $\alpha=1$, and b=1, 2, 5, 10, respectively. The UMAP method was also executed four times using k=10 and min_dist=0.001, 0.01, 0.1, 1, respectively. Initial values of the embedding were set to be the two eigenvectors with minimum eigenvalues of the normalized Laplacian, and the SGD with negative sampling algorithm was performed using 500 epochs. A Euclidean distance function was used.

The performance of transformation application 122 was compared to the UMAP method on an image classification task using a second dataset known as the FASHION-MNIST dataset described in H. Xiao et al., *Fashion-MNIST: A Novel Image Dataset for Benchmarking Machine Learning Algorithms*, arXiv preprint, arXiv:1708.07747 (2017). The second dataset included 70,000 images of 10 classes of fashion items (clothing, footwear, and bags). Because the images were gray-scale images the feature dimension was 784 based on the 28×28 pixels size of each image.

Referring to FIGS. 5A through 5D, comparative clustering results are shown using transformation application 124 with b=1, 2, 5, 10, respectively, and with the second dataset in accordance with an illustrative embodiment. The legend indicates 0—t-short/top, 1—trouser, 2—pullover, 3—dress, 4—coat, 5—sandal, 6—shirt, 7—sneaker, 8—bag, and 9—ankle boot. Referring to FIGS. 5A through 5D, trousers (red) and bags (blue) always had the greatest distance from each other. In addition, shoes, bags, trousers, and other clothes (T-shirts, dresses, pullovers, shirts, and coats) were well separated when b=1 and 2. When b=5 and 10, bags and other clothes get much closer to each other and there are no longer distinct clusters. When b=1 and 2, a few subclusters were visible that were invisible when b=5 and 10. For example, a majority of the T-shirts (dark red) and dresses (orange) indicated by a first circle 500 were separated from coats (yellow), pullovers (vermilion), and shirts (light green)

indicated by a second circle 502. A majority of the sneakers (green), ankle boots (purple), and sandals (lemon) were separated as well. In addition, sandals approximately indicated by a third circle 504 and a fourth circle 506 were separated into two subclusters. A first subcluster approximately indicated by third circle 504 was close to sneakers, a second subcluster approximately indicated by fourth circle 506 was close to ankle boots. In addition, bags approximately indicated by a fifth circle 508 were separated into two subclusters.

Figure 7A:
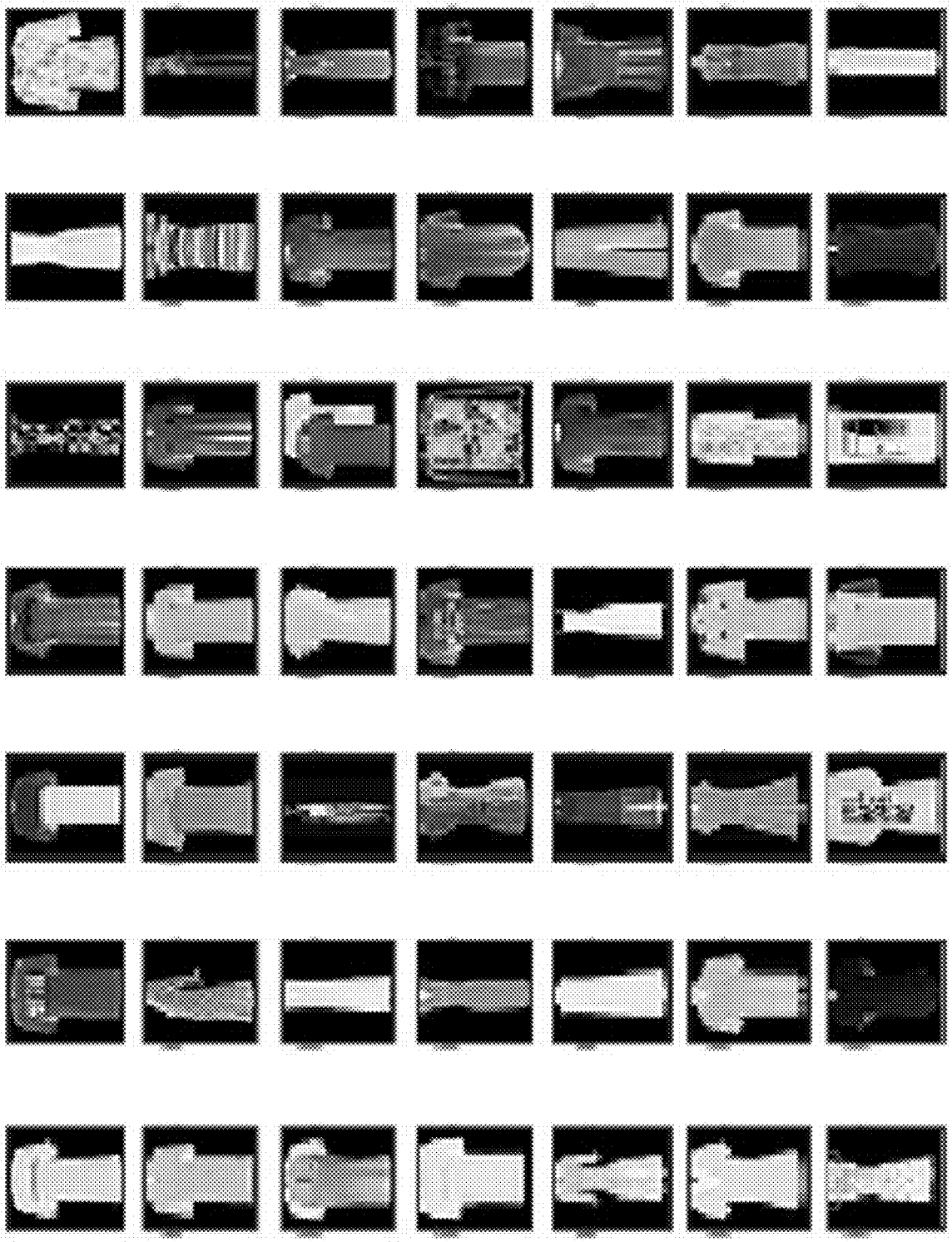
FIGS. 7A through 7F provide illustrative observations included in different clusters depicted in FIG. 5A in accordance with an illustrative embodiment.
Figure 7B:
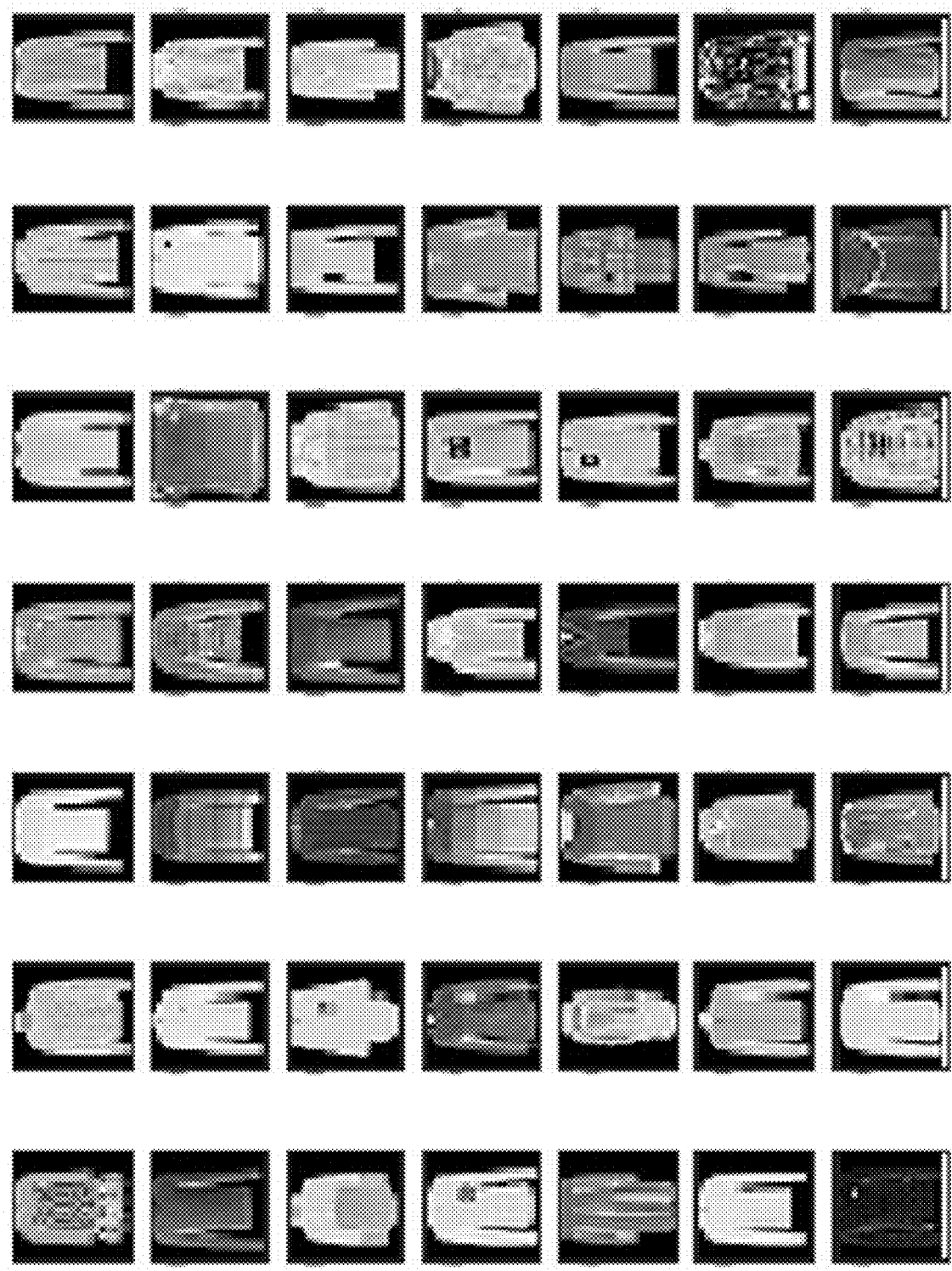
Figure 7C:
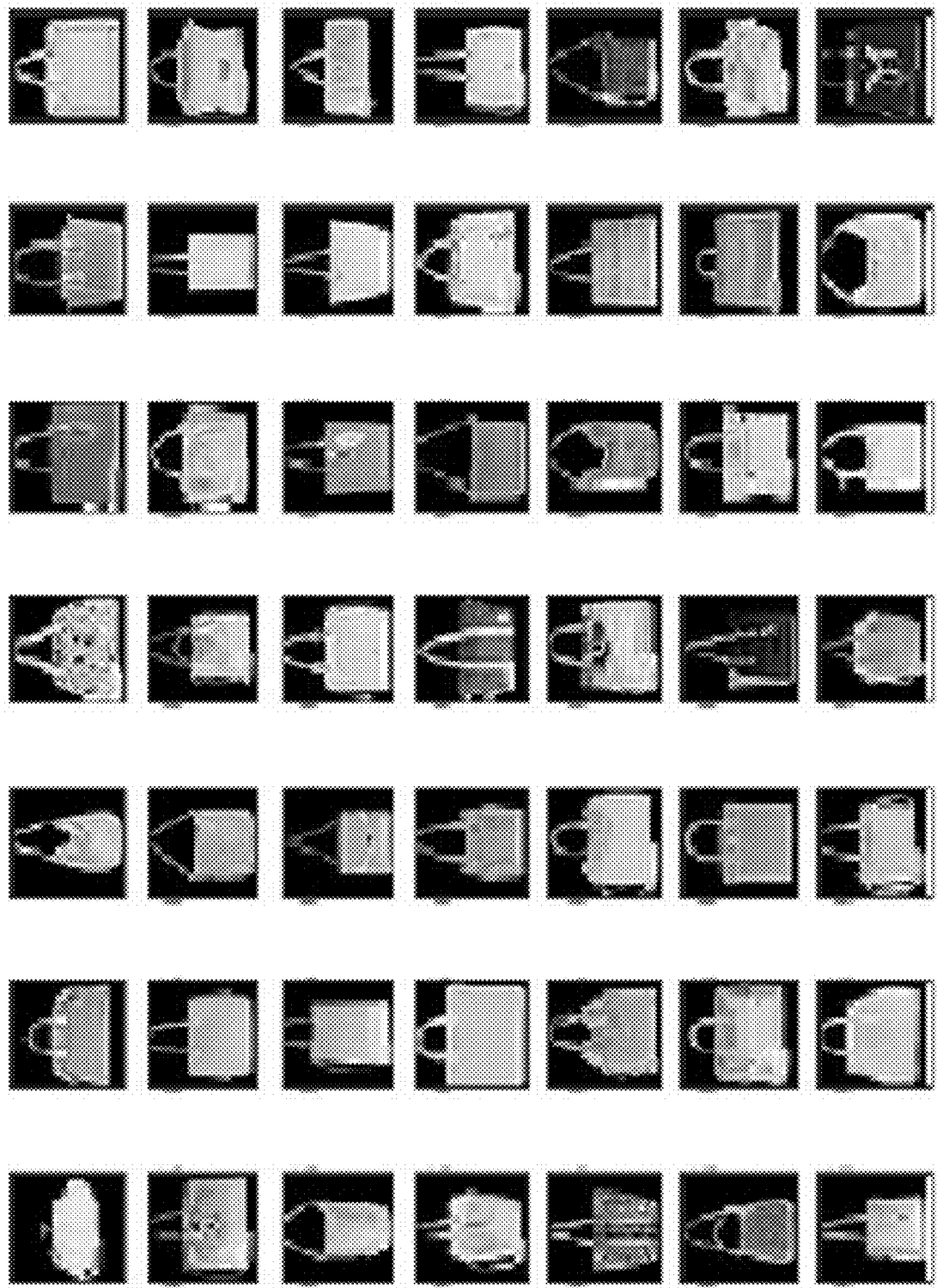
Figure 7D:
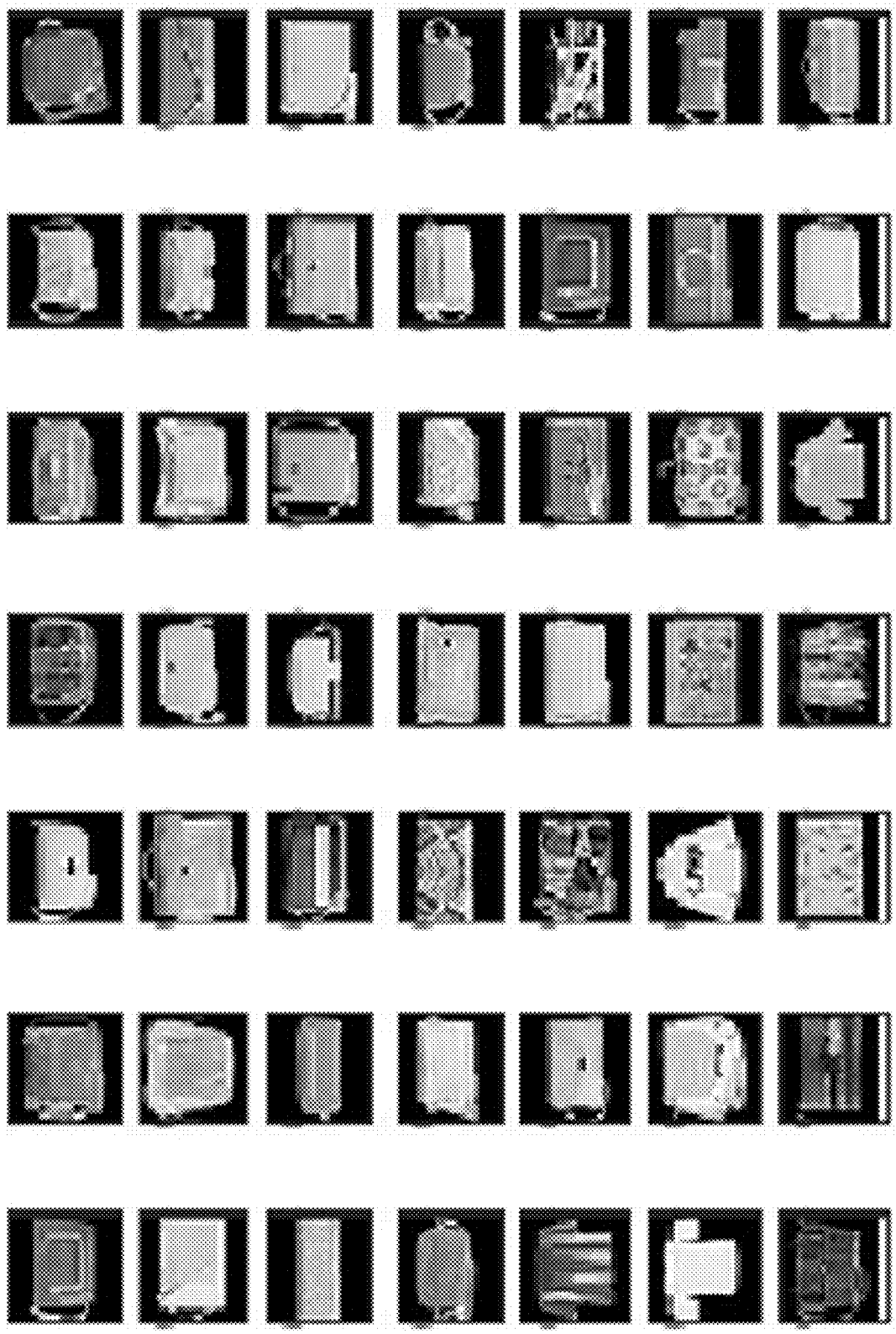
Figure 7E:
Figure 7F:

To verify whether the subclusters were meaningful, 100 images were randomly sampled from each of the subclusters, and the images were compared. The comparison results are summarized in FIGS. 7A through 7F. Referring to FIGS. 7A and 7B, the separation of T-shirts and dresses from other clothing is due to long or short sleeves. Referring to FIGS. 7C and 7D, the separation of bags into two subclusters is due to one subcluster that includes a majority of the bags having handles showing at the top of the image, and another subcluster that either includes bags without a handle or where the handle is not showing at the top of the image. Referring to FIGS. 7E and 7F, the images of sandals also show that the majority of the sandals in one subcluster have middle or high heels; whereas, the sandals in the other subcluster were relatively flat. These image comparisons clearly show that the subclusters revealed by b=1 and 2 define meaningful subclusters that provide additional insight into the second dataset.

Referring to FIGS. 6A through 6D, comparative clustering results are shown using the UMAP method with min_dist=0.001, 0.01, 0.1, 1, respectively, and with the second dataset in accordance with an illustrative embodiment.

The performance of transformation application 122 was compared to the UMAP method on an image classification task using a third dataset known as the MNIST dataset described in Y. Lecun and C. Cortes, *The MNIST Database of Handwritten Digit Images for Machine Learning Research*, IEEE Signal Processing Magazine 29:141-142 (2012). The third dataset included 70,000 images of the handwritten digits 0-9. Because the images were gray-scale images the feature dimension was 784 based on the 28×28 pixels size of each image. The legend indicates the handwritten digit.

Figure 8A:
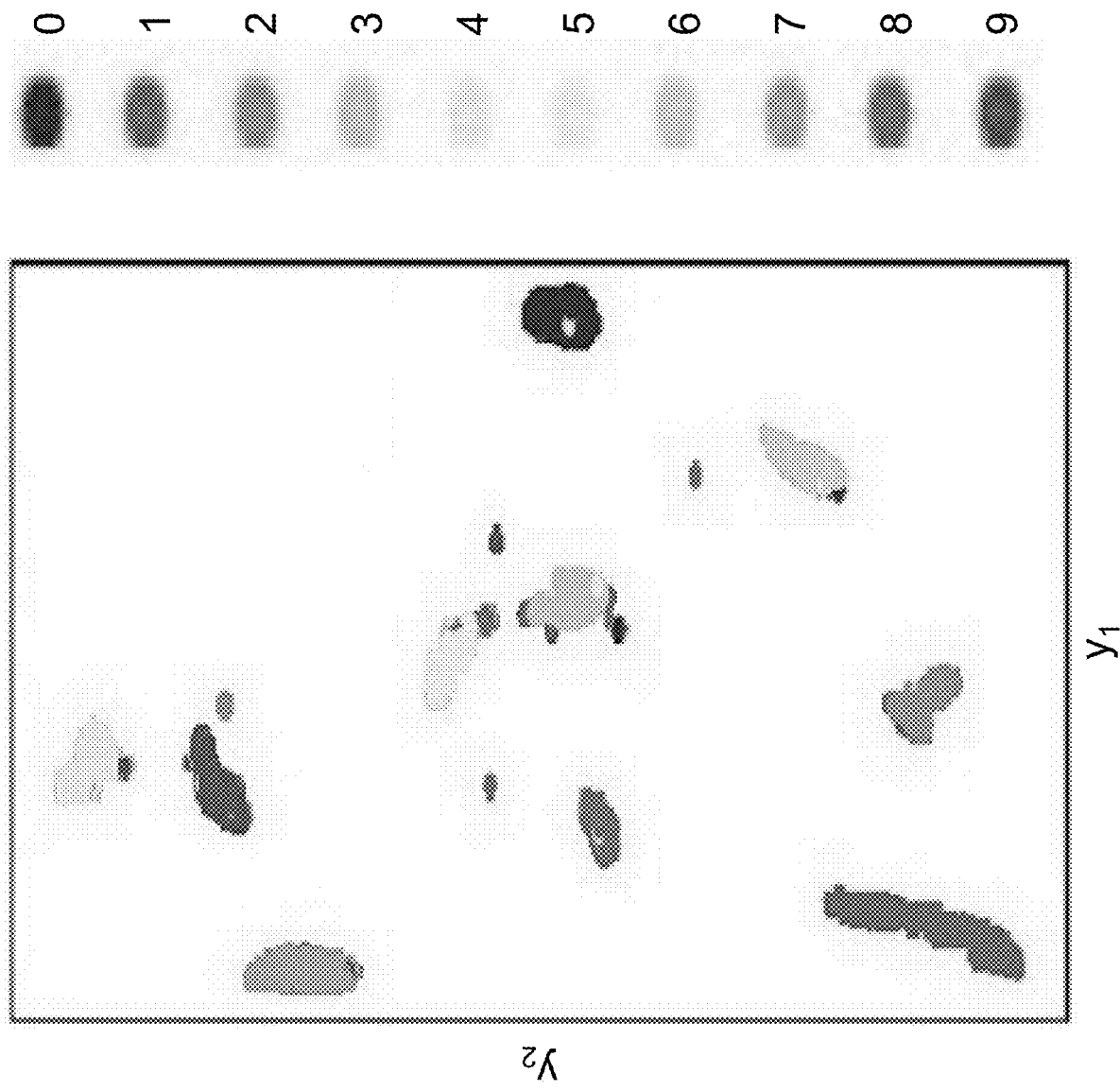
FIGS. 8A through 8D provide comparative clustering results using the transformation application with different values of the hyperparameter b value for a third dataset in accordance with an illustrative embodiment.
Figure 8B:
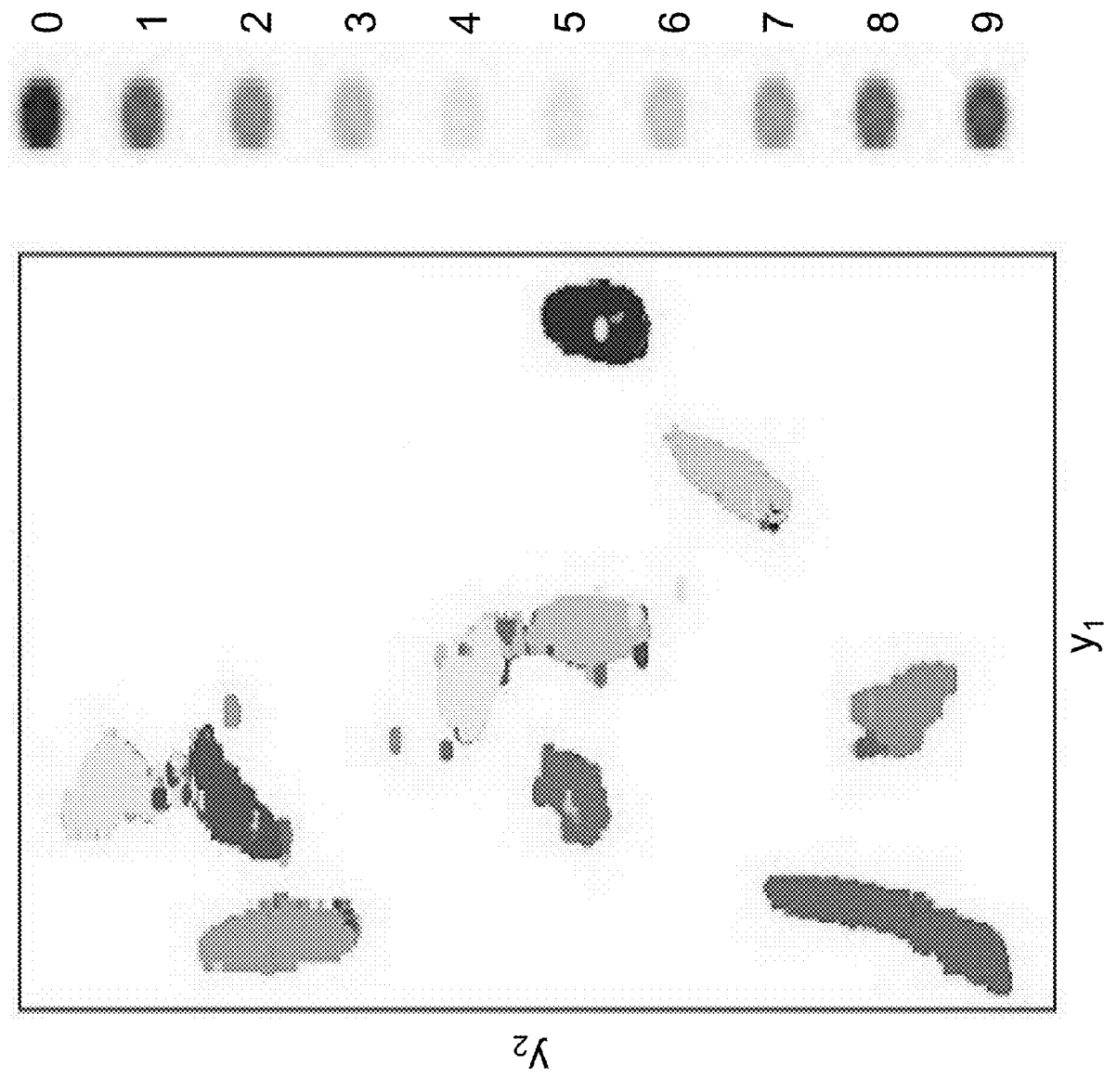
Figure 8C:
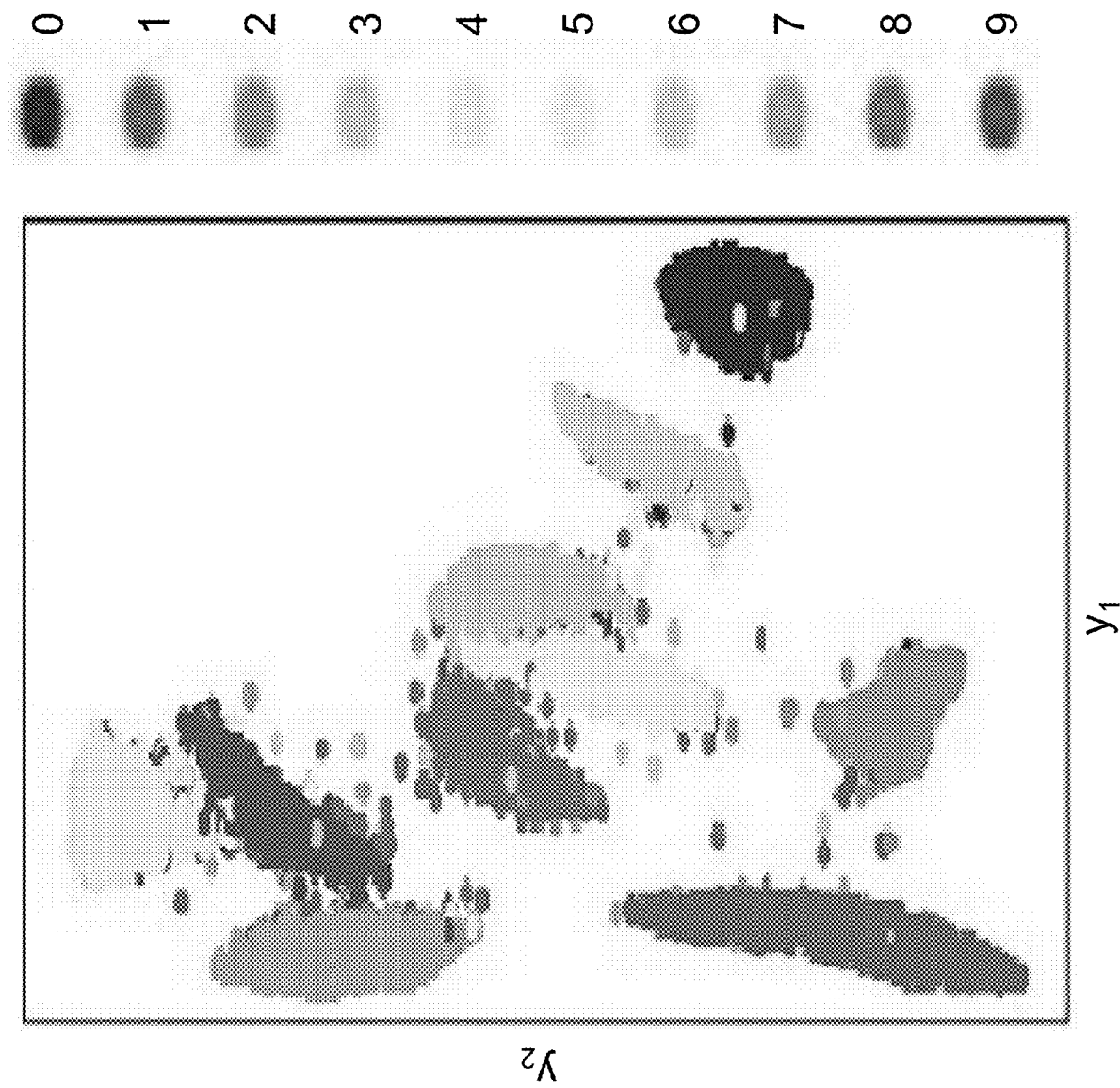
Figure 8D:
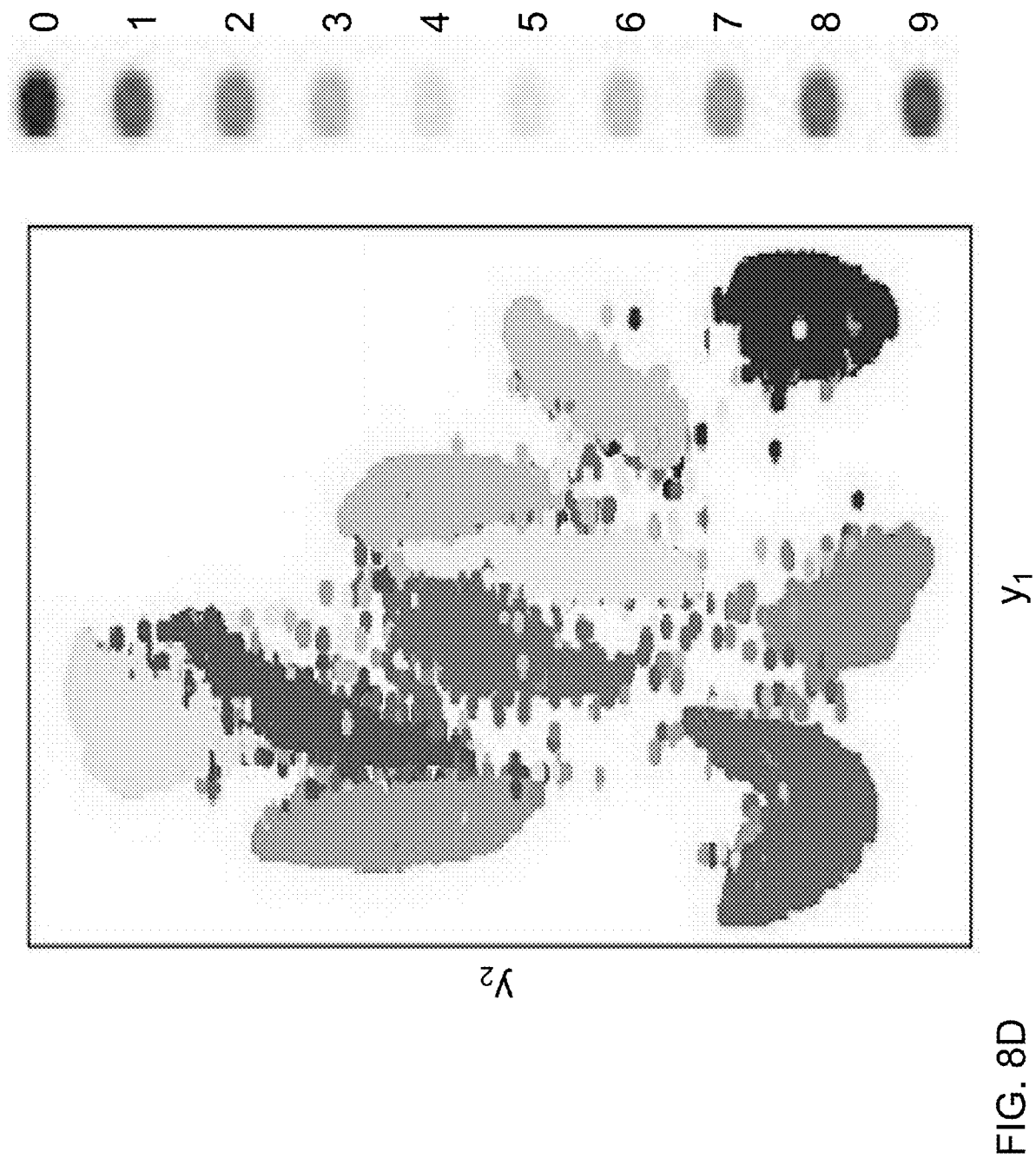
Figure 9A:
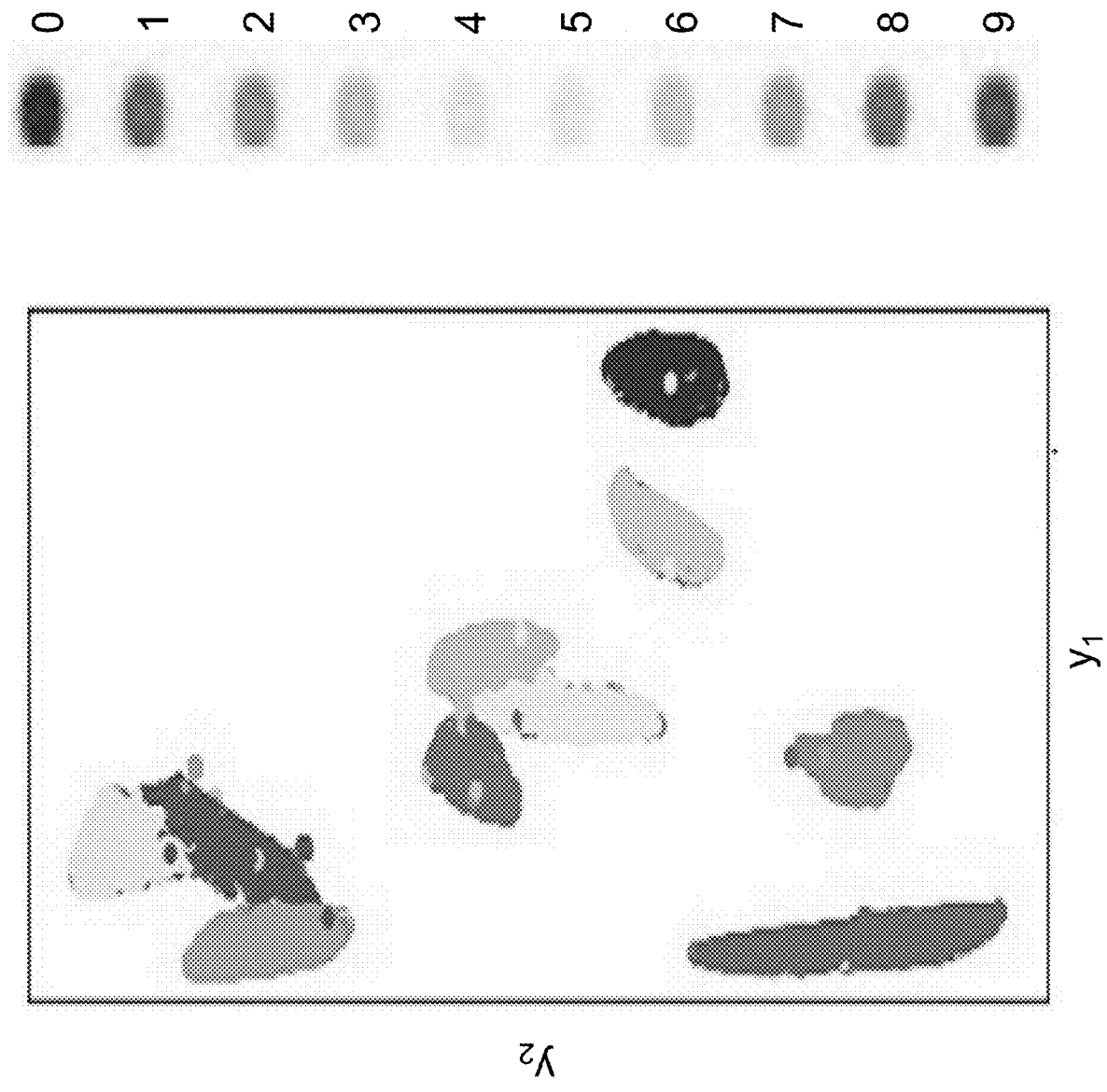
FIGS. 9A through 9D provide comparative clustering results using an existing clustering application with different values of the minimum distance hyperparameter value for the third dataset in accordance with an illustrative embodiment.
Figure 9B:
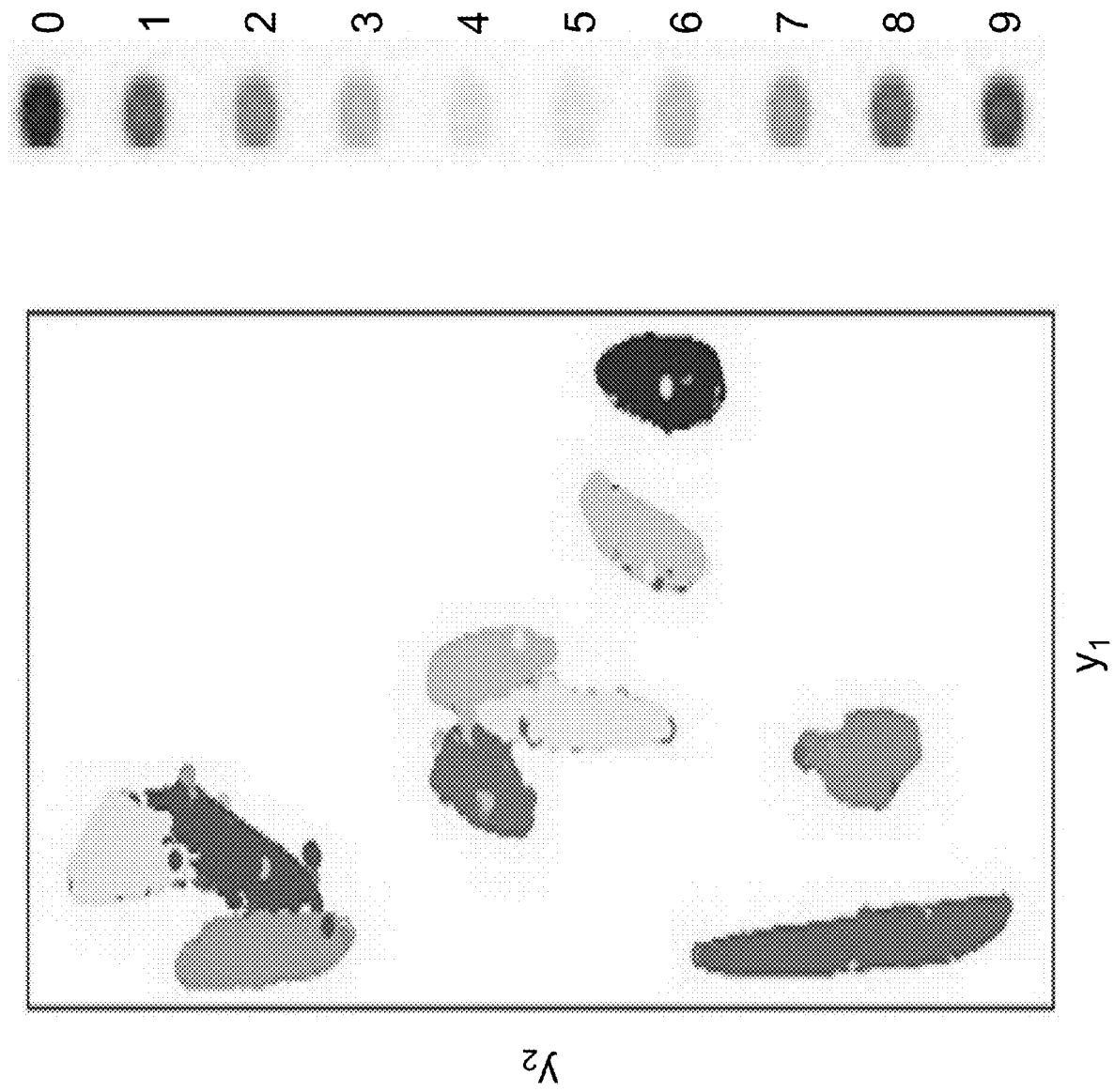
Figure 9C:
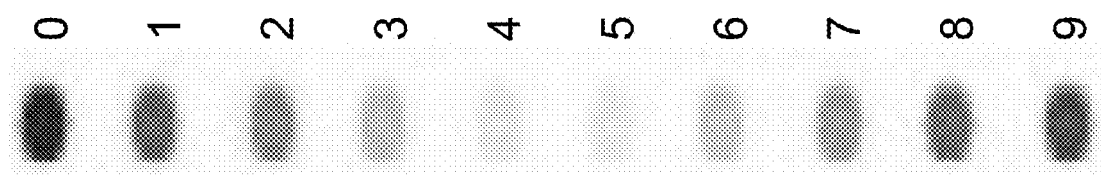
Figure 9C:
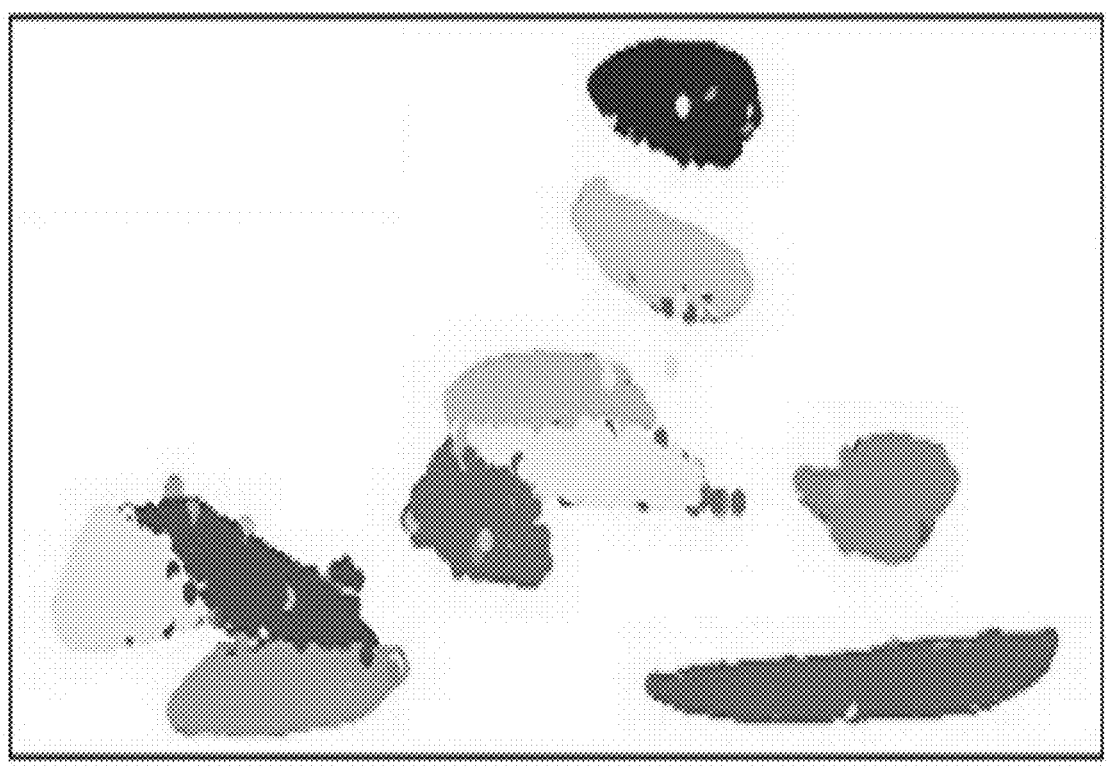
Figure 9D:
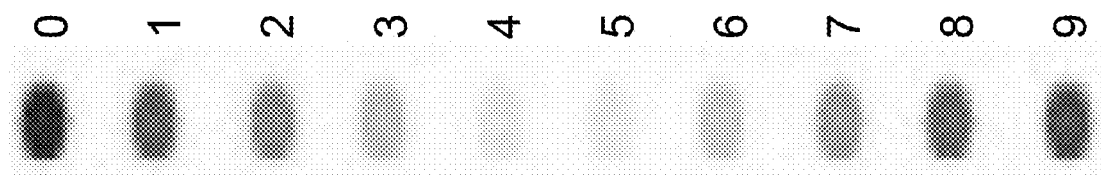
Figure 9D:
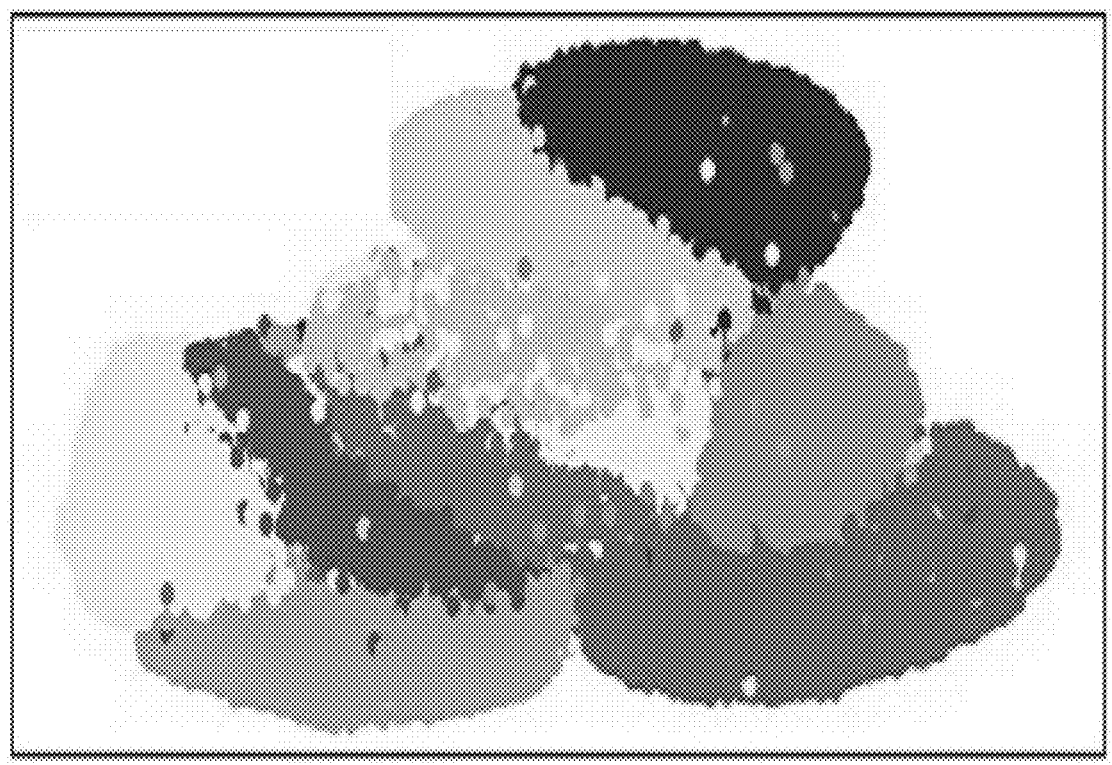

Referring to FIGS. 8A through 8D, comparative clustering results are shown using transformation application 124 with b=1, 2, 5, 10, respectively, with the third dataset in accordance with an illustrative embodiment. Referring to FIG. 8A, the clusters have the largest separation. For example, all the digits were separated into distinct clusters. With increasing values of b, the distances between different digits became smaller and smaller. Some digits, such as 4, 7, and 9, and 3, 5, and 8, eventually joined together into clusters. Based on the embeddings and using k-means clustering to perform classification, the smallest error of 4.4% resulted when b=1 and 2.

Referring to FIGS. 9A through 9D, comparative clustering results are shown using the UMAP method with min_dist=0.001, 0.01, 0.1, 1, respectively, with the third dataset in accordance with an illustrative embodiment.

The performance of transformation application 122 was compared to the UMAP method on an image classification task using a fourth dataset known as the Turbofan dataset described in A. Saxena and K. Goebel, *Turbofan Engine Degradation Simulation data set*, NASA Ames Prognostics Data Repository, NASA Ames Research Center, Moffett Field, Calif. (2008). The fourth dataset describes engine degradation data simulated under different combinations of operational conditions. The fourth dataset included 21 sensor measurements for 260 engines under six operational conditions recorded until the engine failed. All of the engines were assumed to operate normally at the beginning of the data collection. The fourth dataset included 53,759 observations.

Referring to FIGS. 10A through 10D, comparative clustering results are shown using transformation application 124 with b=1, 2, 5, 10, respectively, with the fourth dataset in accordance with an illustrative embodiment. A flight condition indicator was removed from the fourth dataset. Using the readings from only the 21 sensors, the fourth dataset was clustered or classified into six operational categories with high accuracy. For each cluster, readings taken close to a fault point were approximately on an edge of the embedding (blue color). The colors show the relative life cycle of the engine when each reading is recorded. Each reading is one observation in the fourth dataset.

Figure 10A:
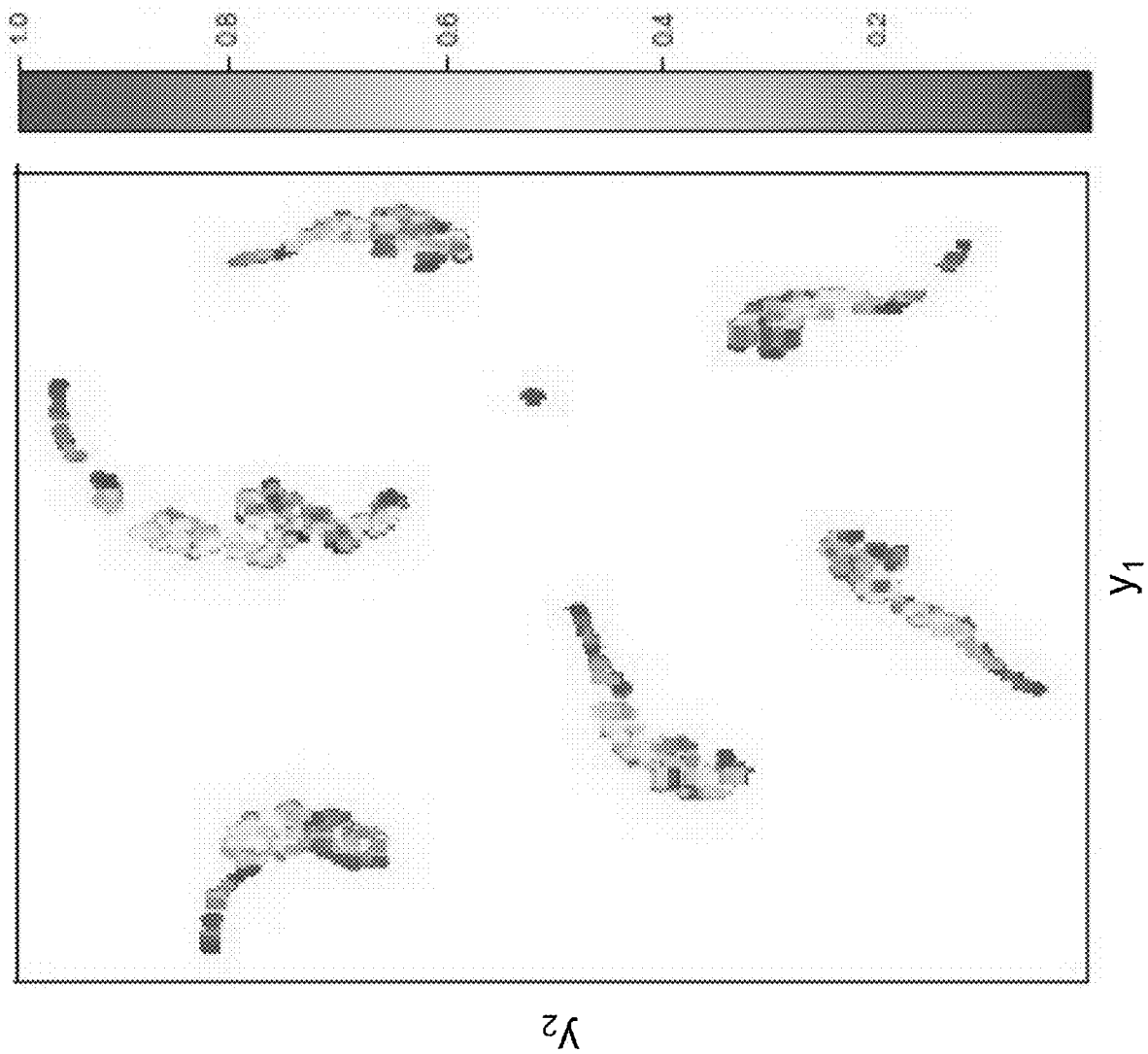
FIGS. 10A through 10D provide comparative clustering results using the transformation application with different values of the hyperparameter b value for a fourth dataset in accordance with an illustrative embodiment.
Figure 10B:
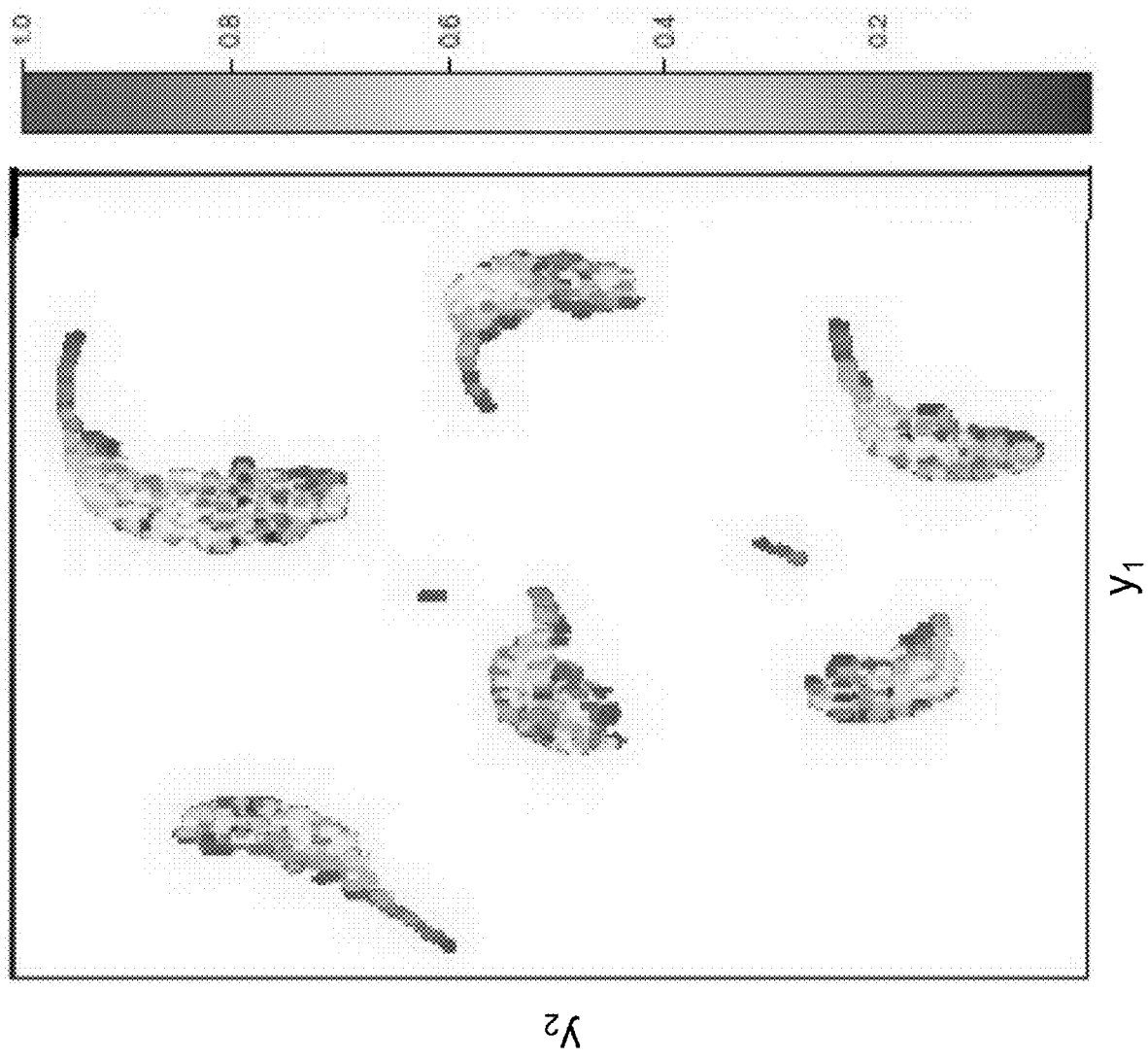
Figure 10C:
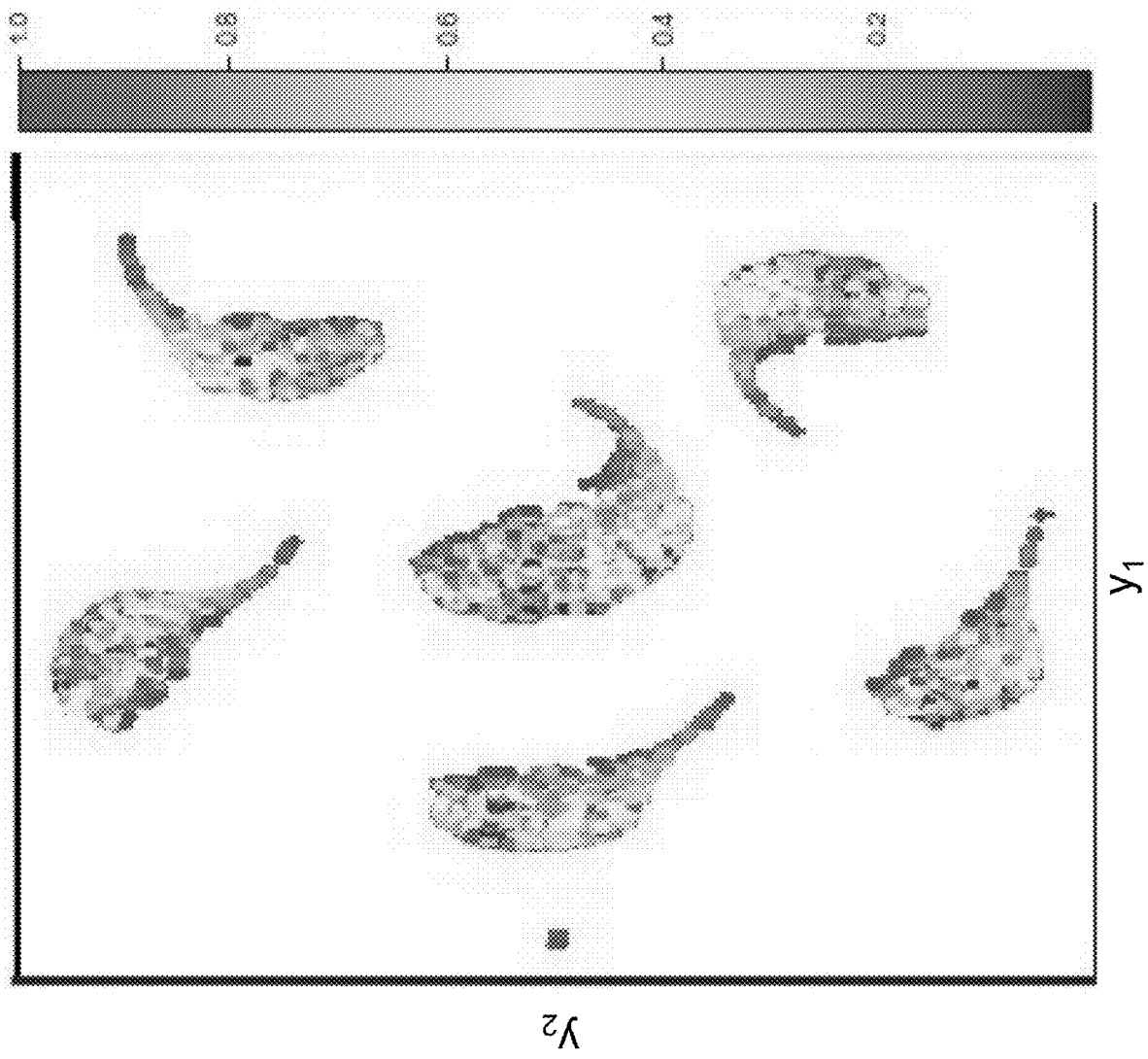
Figure 10D:
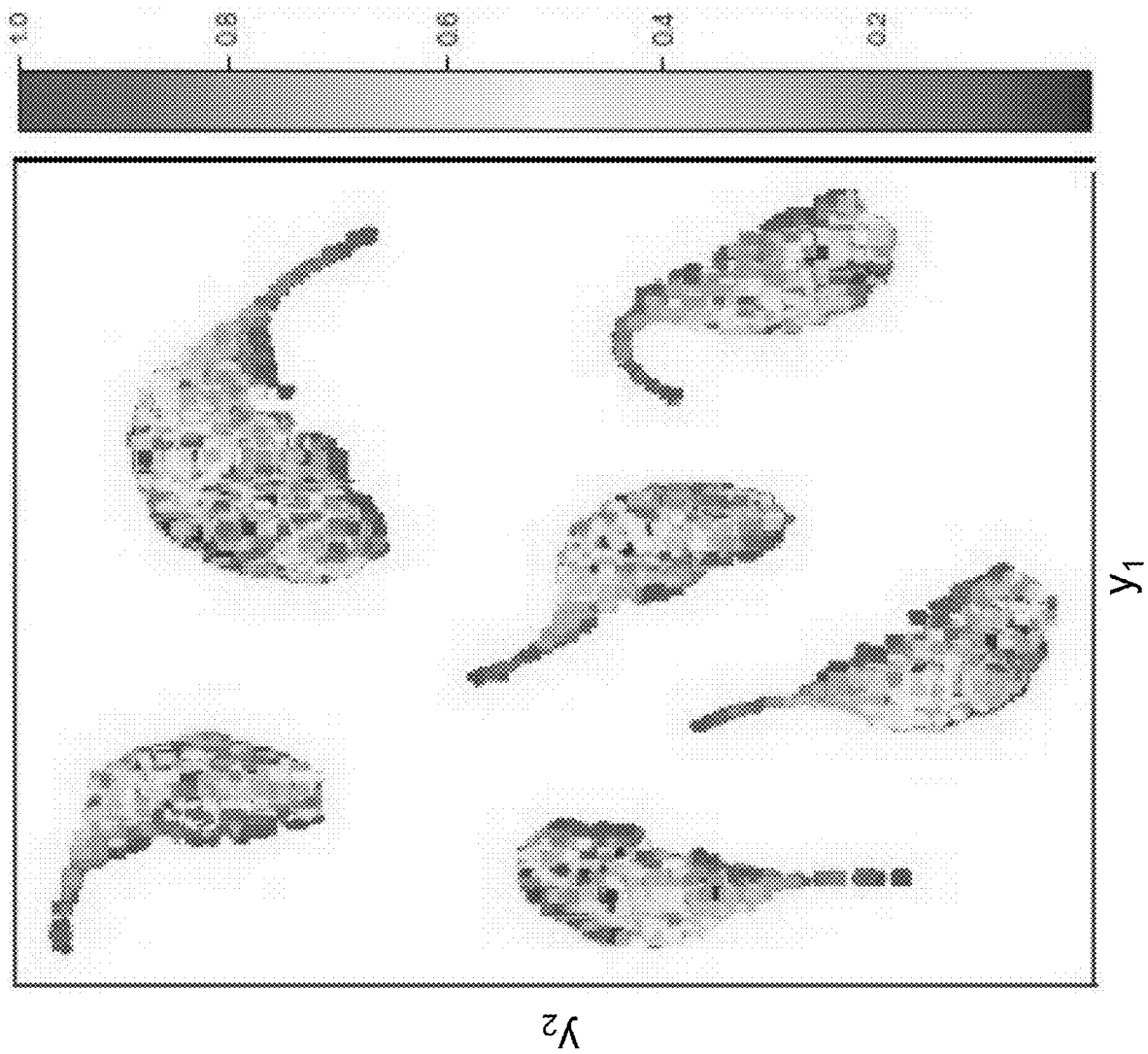
Figure 10E:
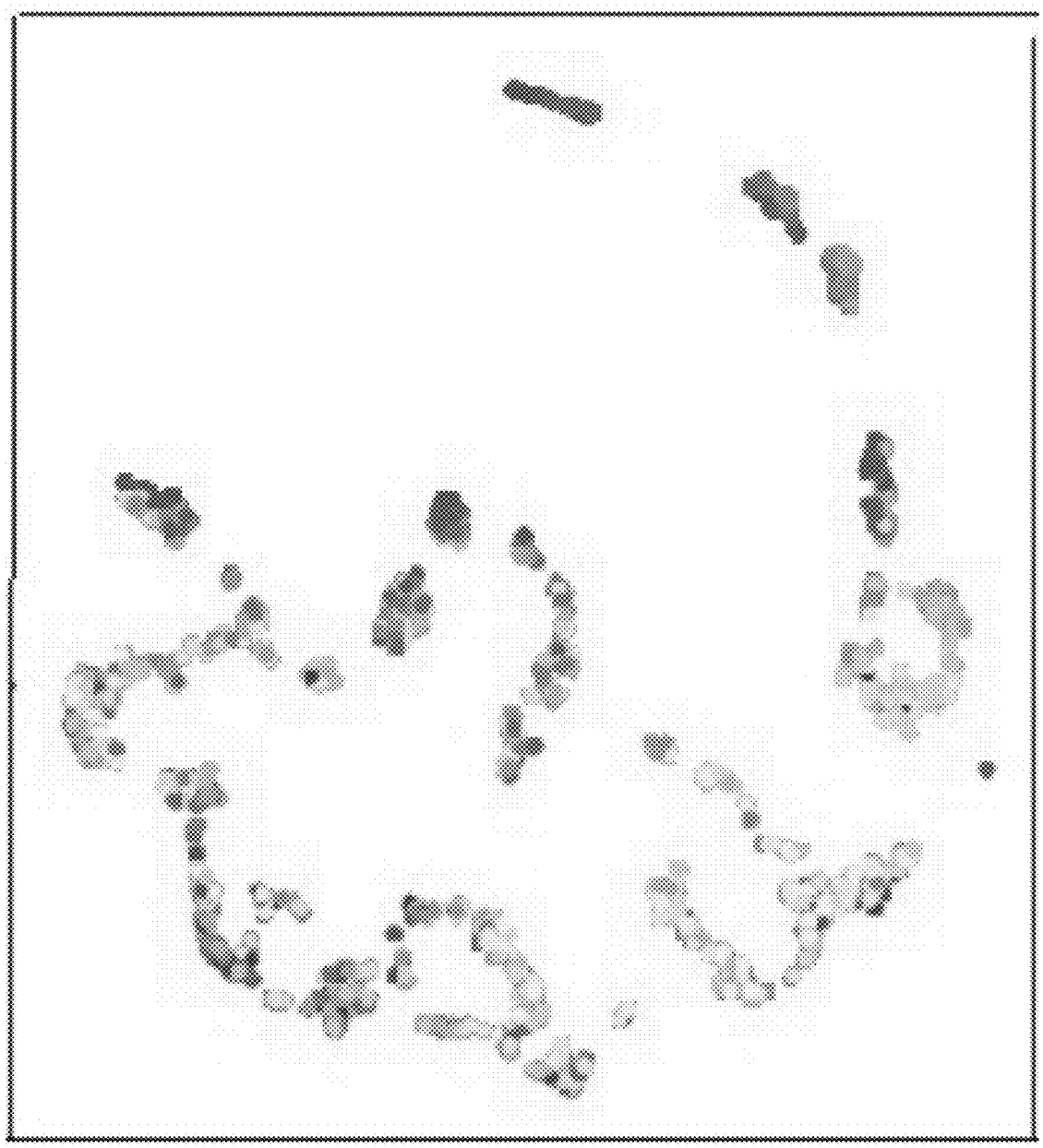
FIGS. 10E through 10H provide comparative clustering results using the transformation application with different values of the hyperparameter b value for a modified fourth dataset in accordance with an illustrative embodiment.
Figure 10F:
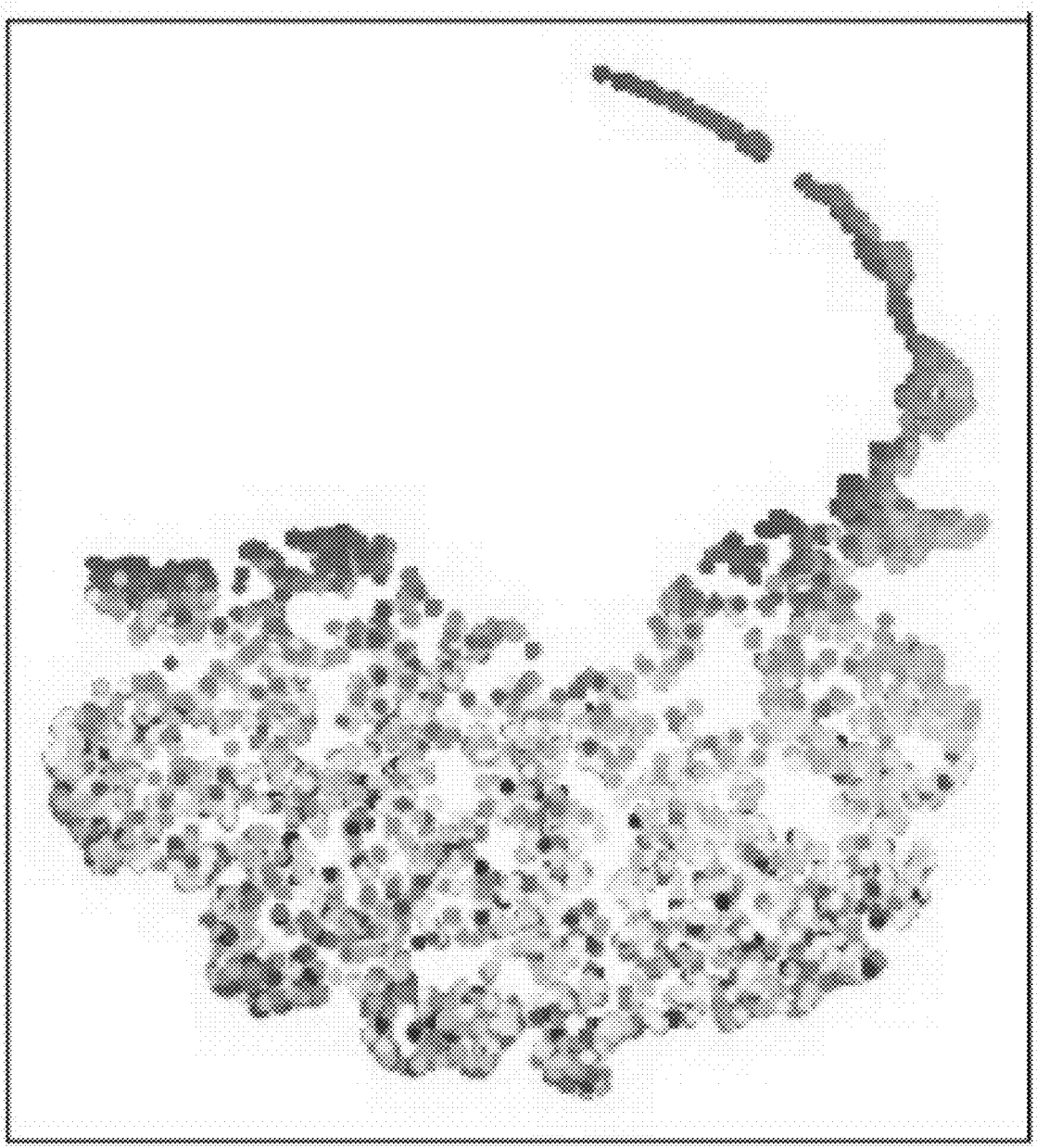
Figure 10G:
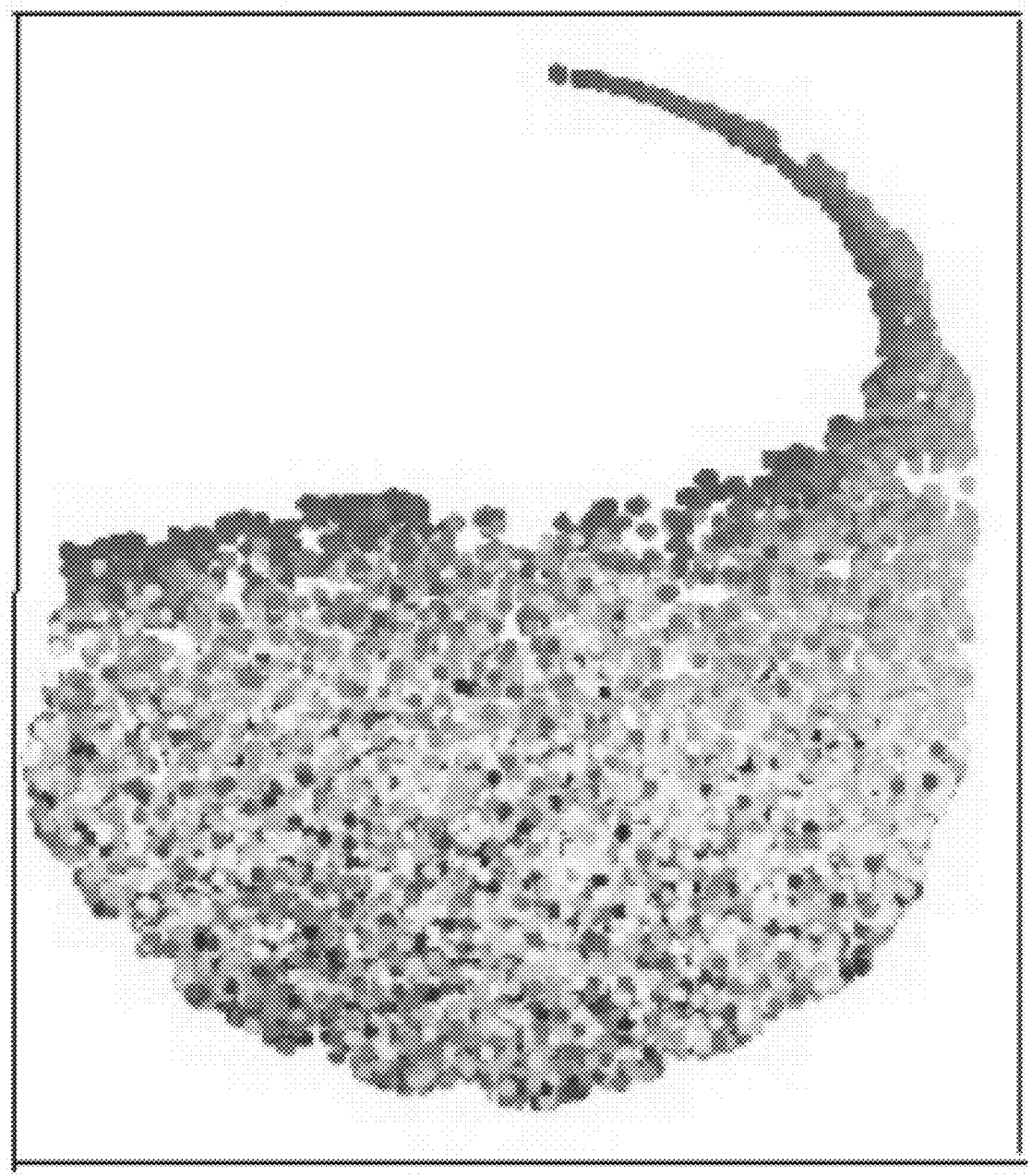
Figure 10H:
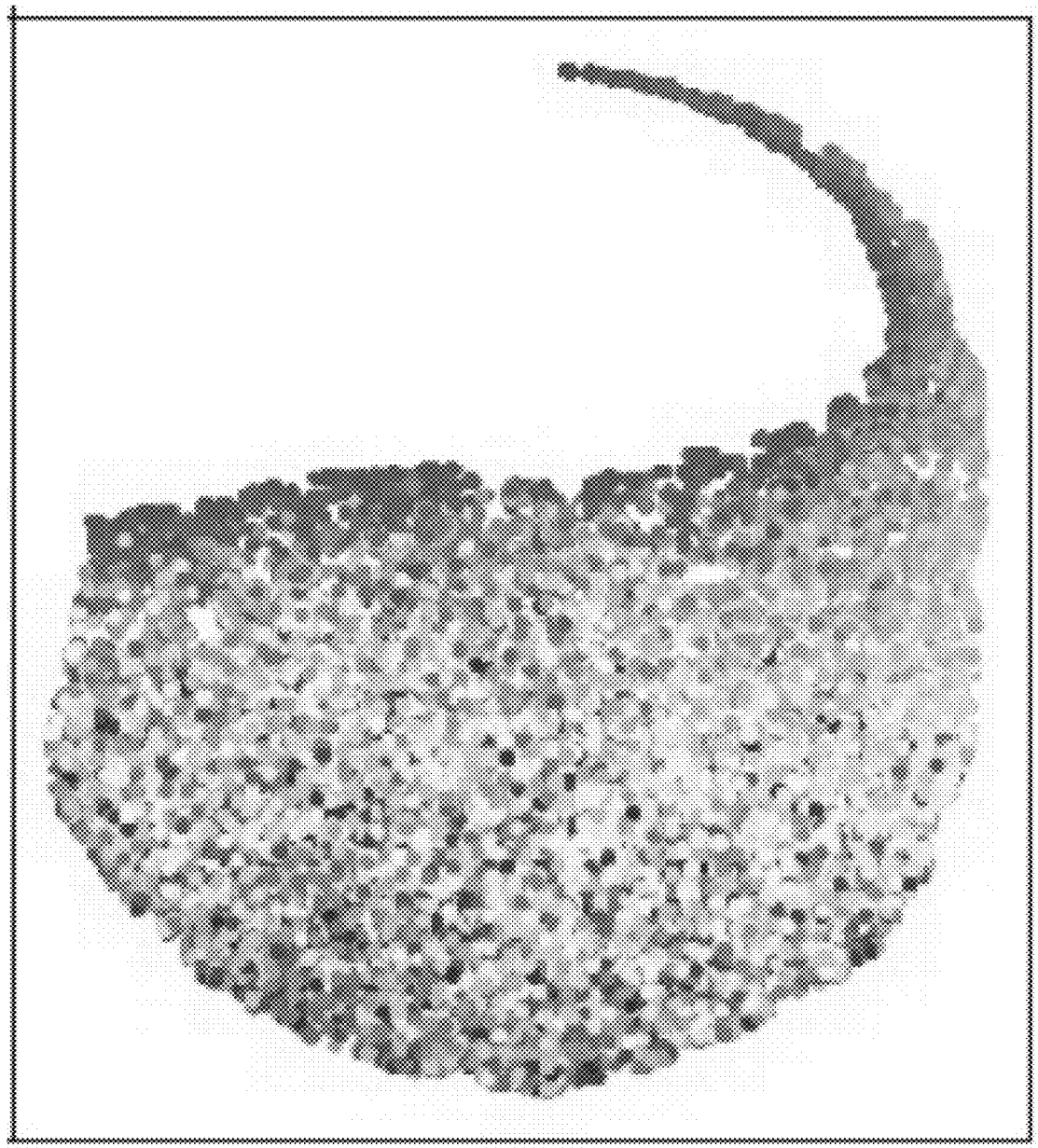
Figure 11A:
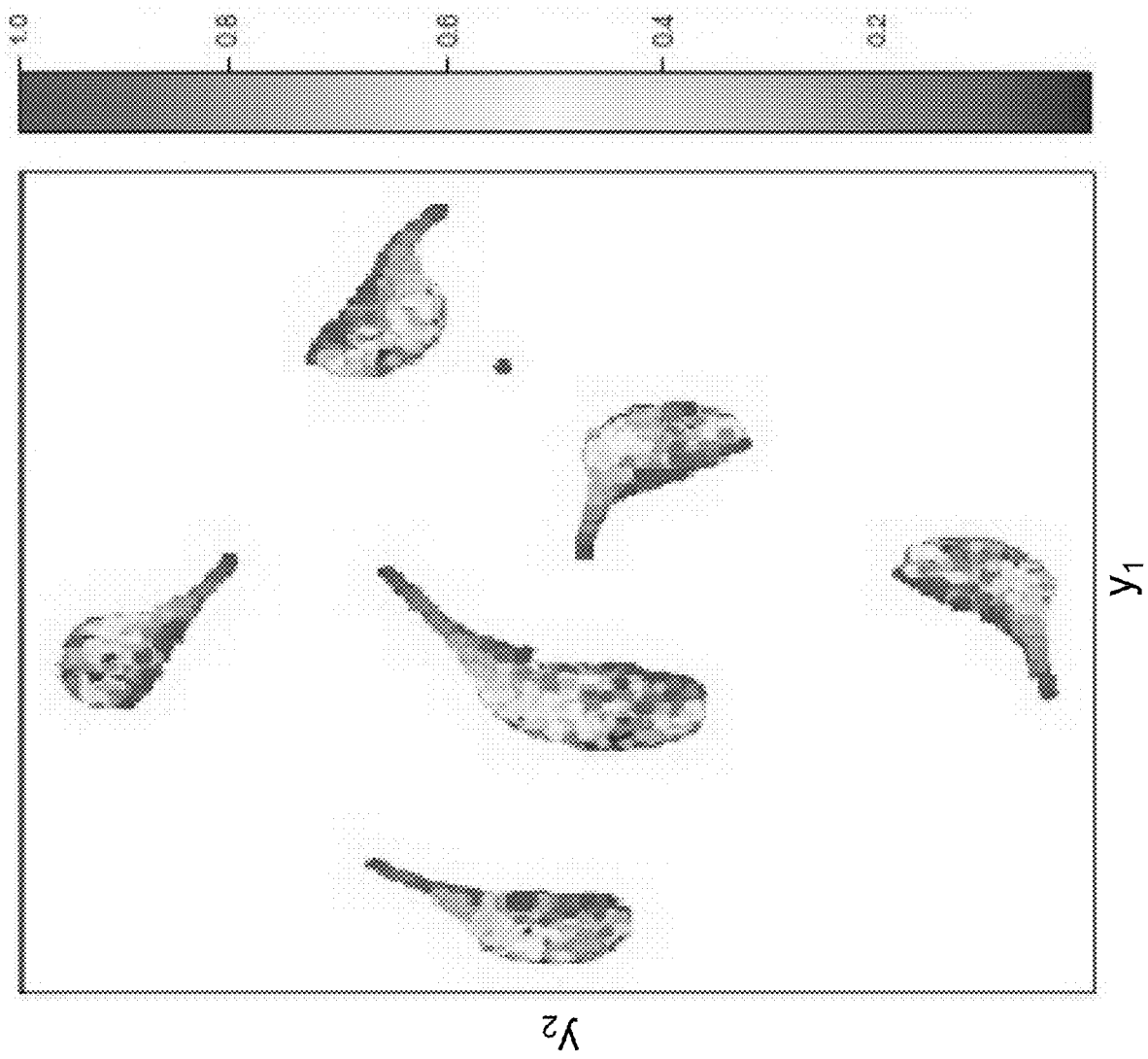
FIGS. 11A through 11D provide comparative clustering results using an existing clustering application with different values of the minimum distance hyperparameter value for the fourth dataset in accordance with an illustrative embodiment.
Figure 11B:
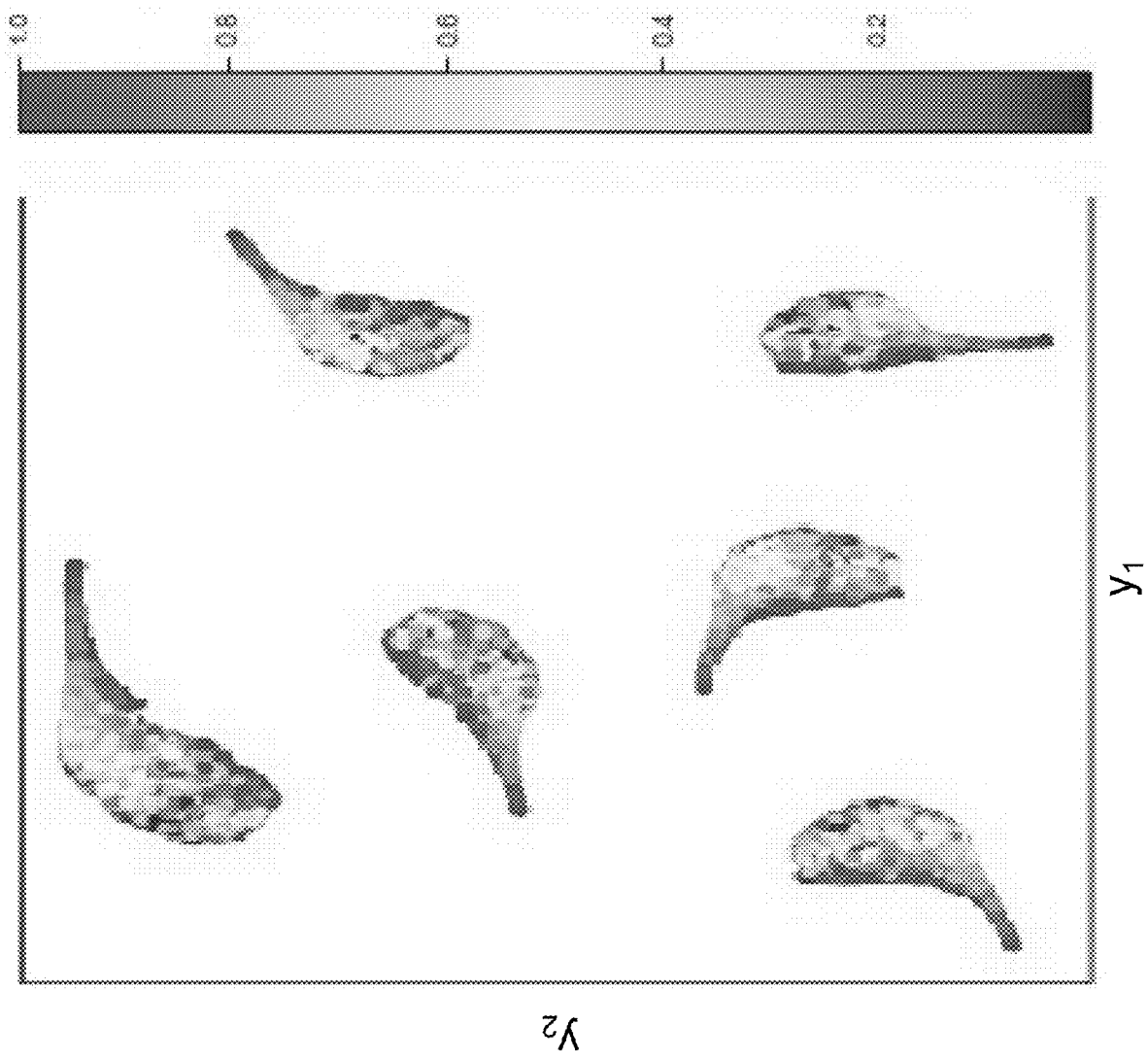
Figure 11C:
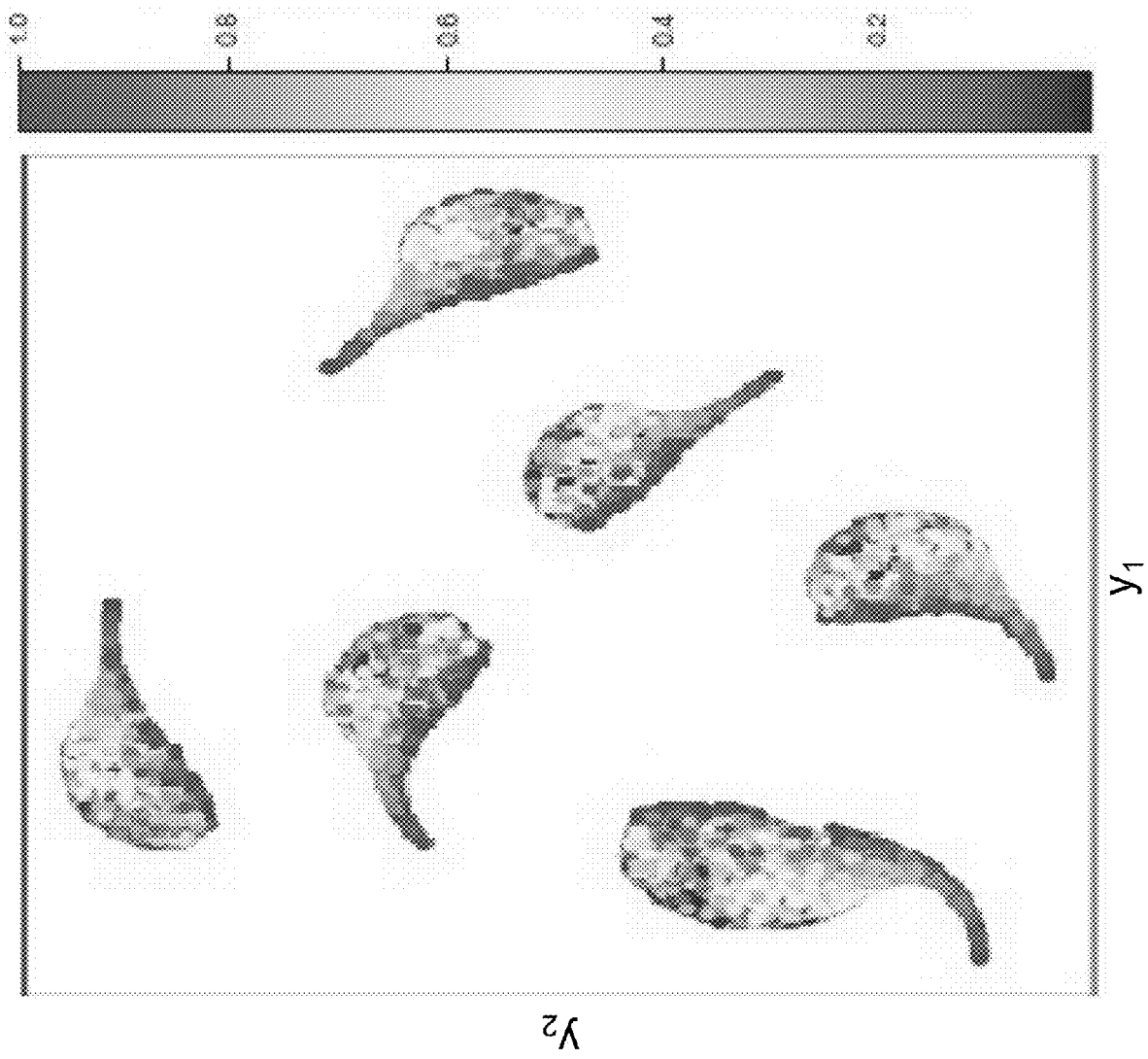
Figure 11D:
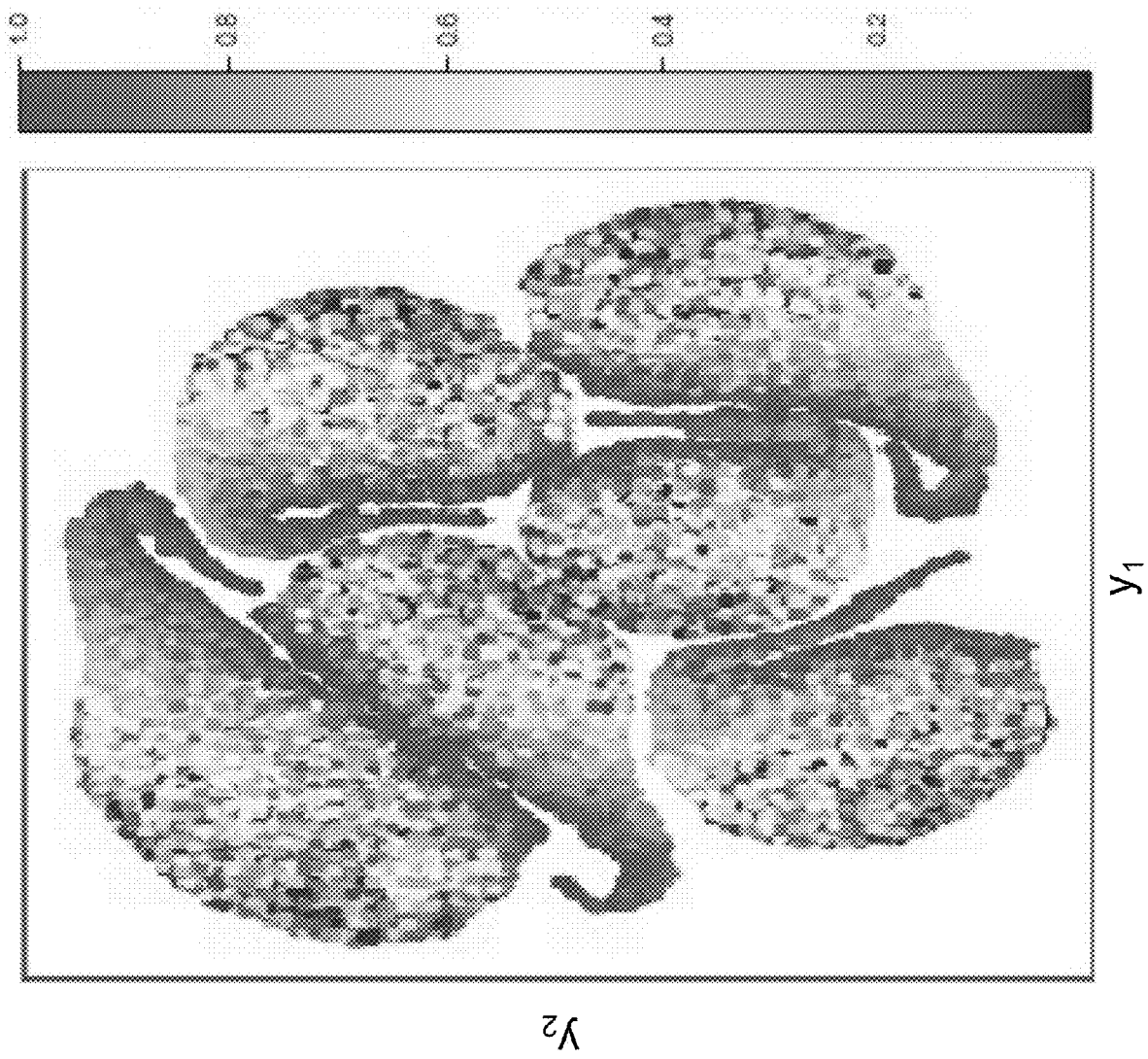
Figure 12A:
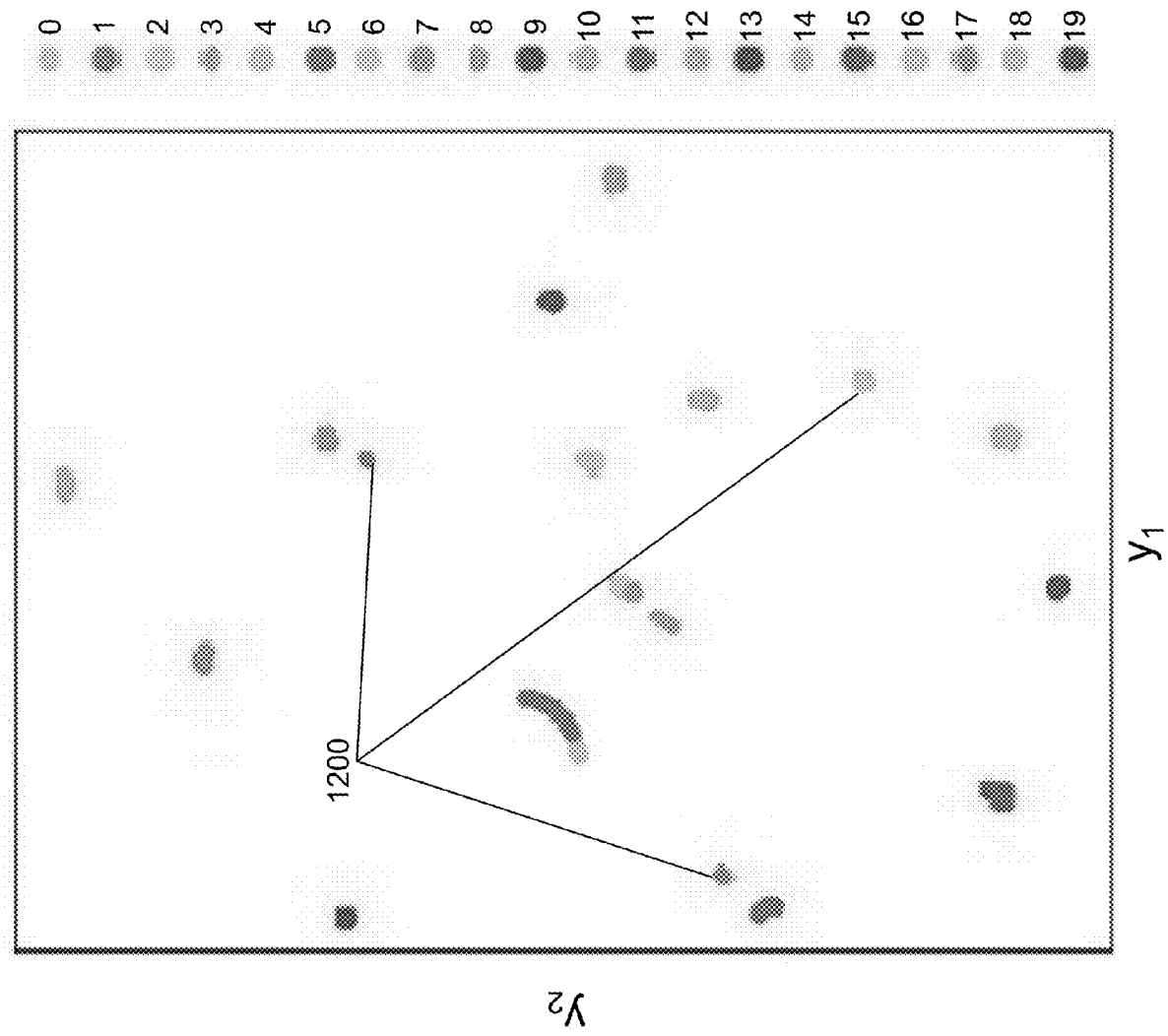
FIGS. 12A through 12D provide comparative clustering results using the transformation application with different values of the hyperparameter b value for a fifth dataset in accordance with an illustrative embodiment.
Figure 12B:
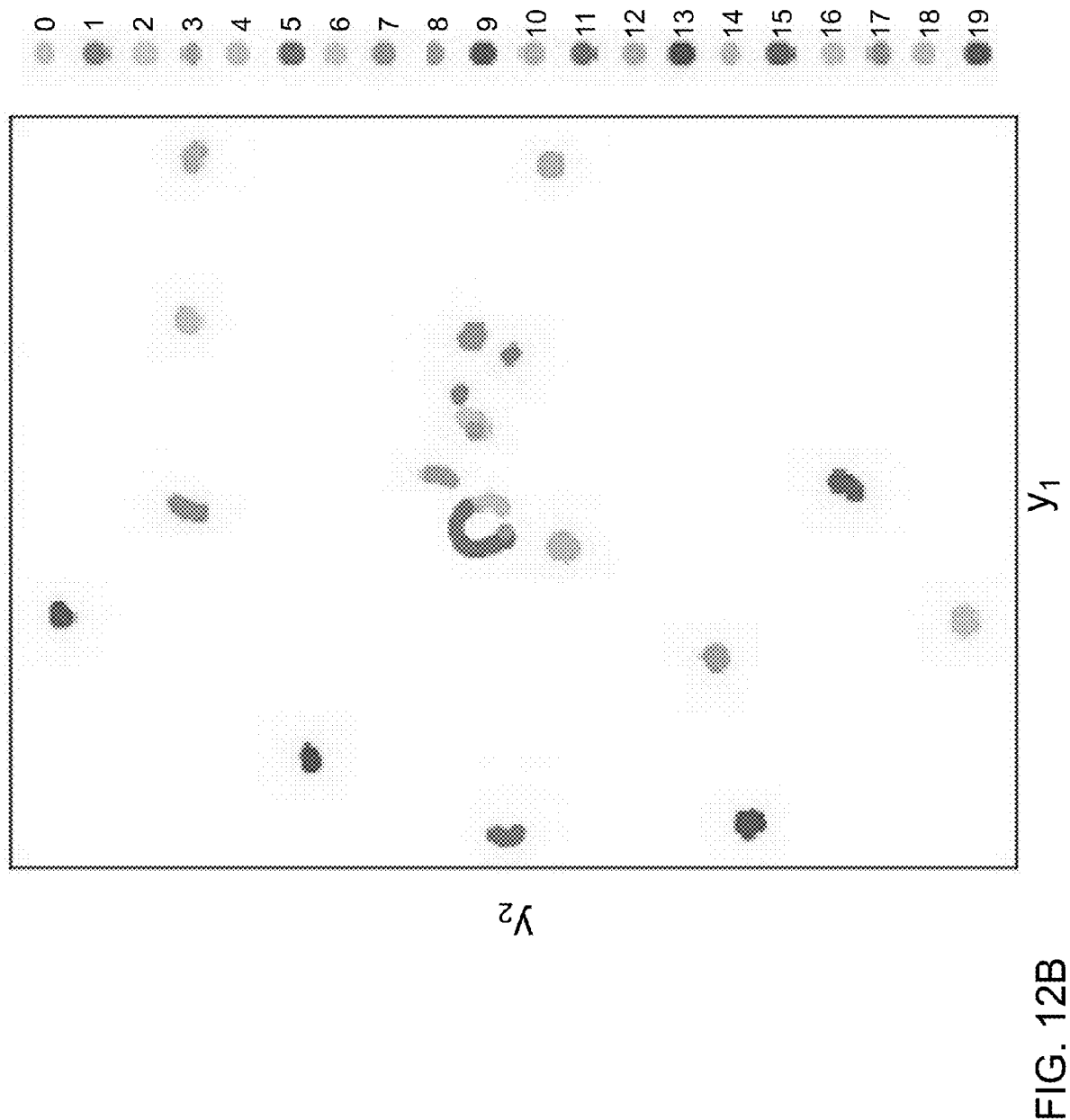
Figure 12C:
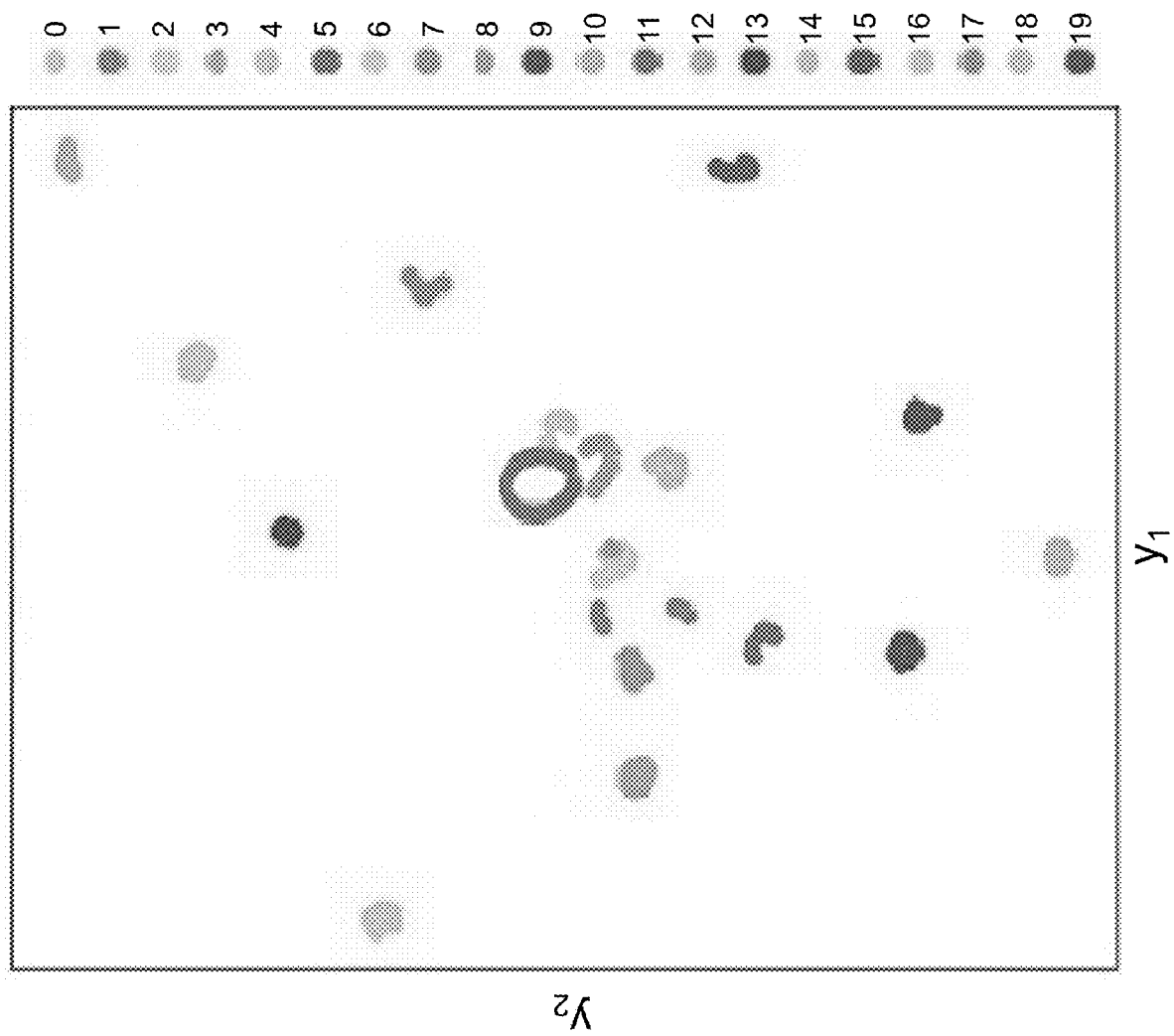
Figure 12D:
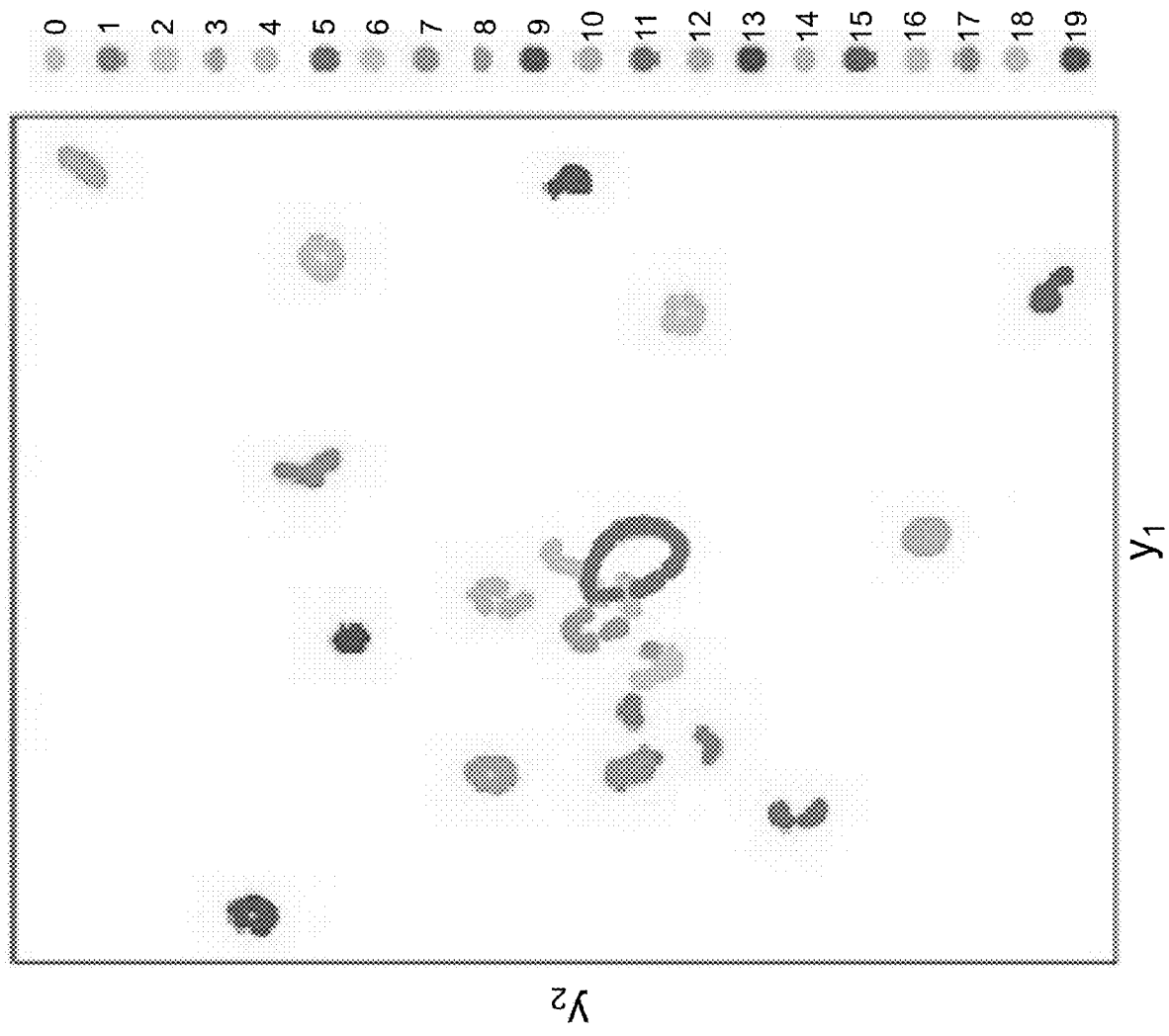
Figure 13A:
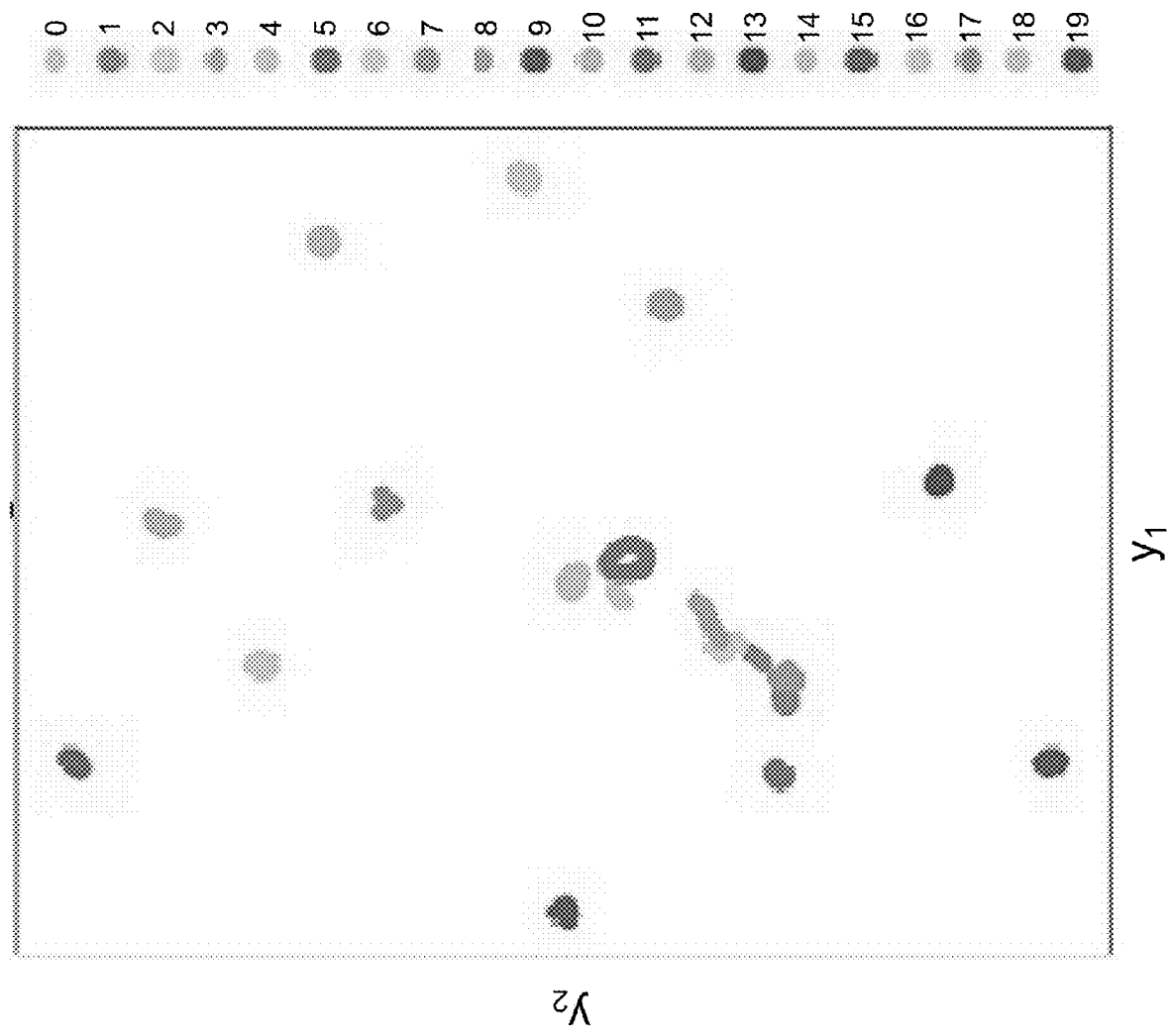
FIGS. 13A through 13D provide comparative clustering results using an existing clustering application with different values of the minimum distance hyperparameter value for the fifth dataset in accordance with an illustrative embodiment.
Figure 13B:
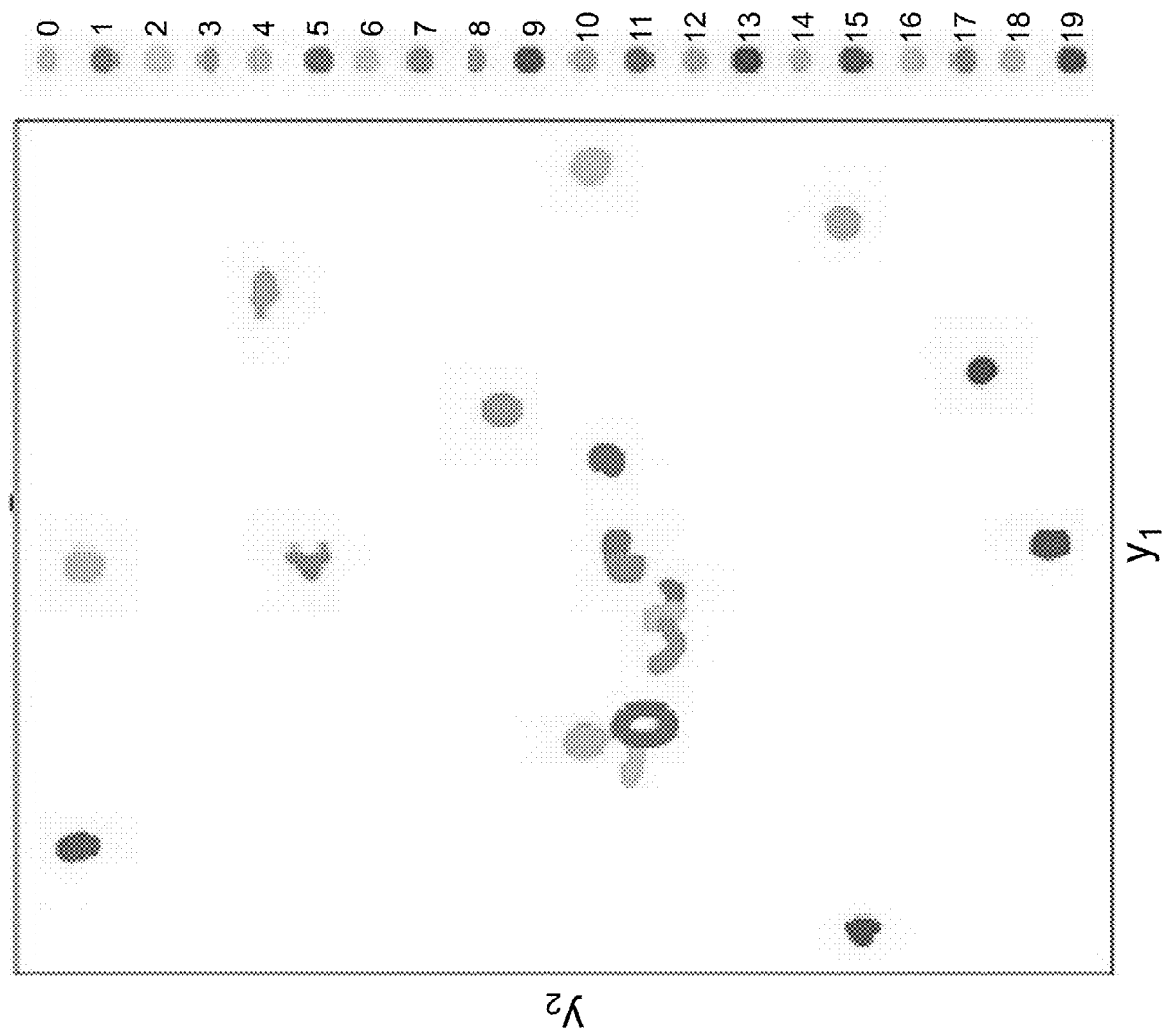
Figure 13C:
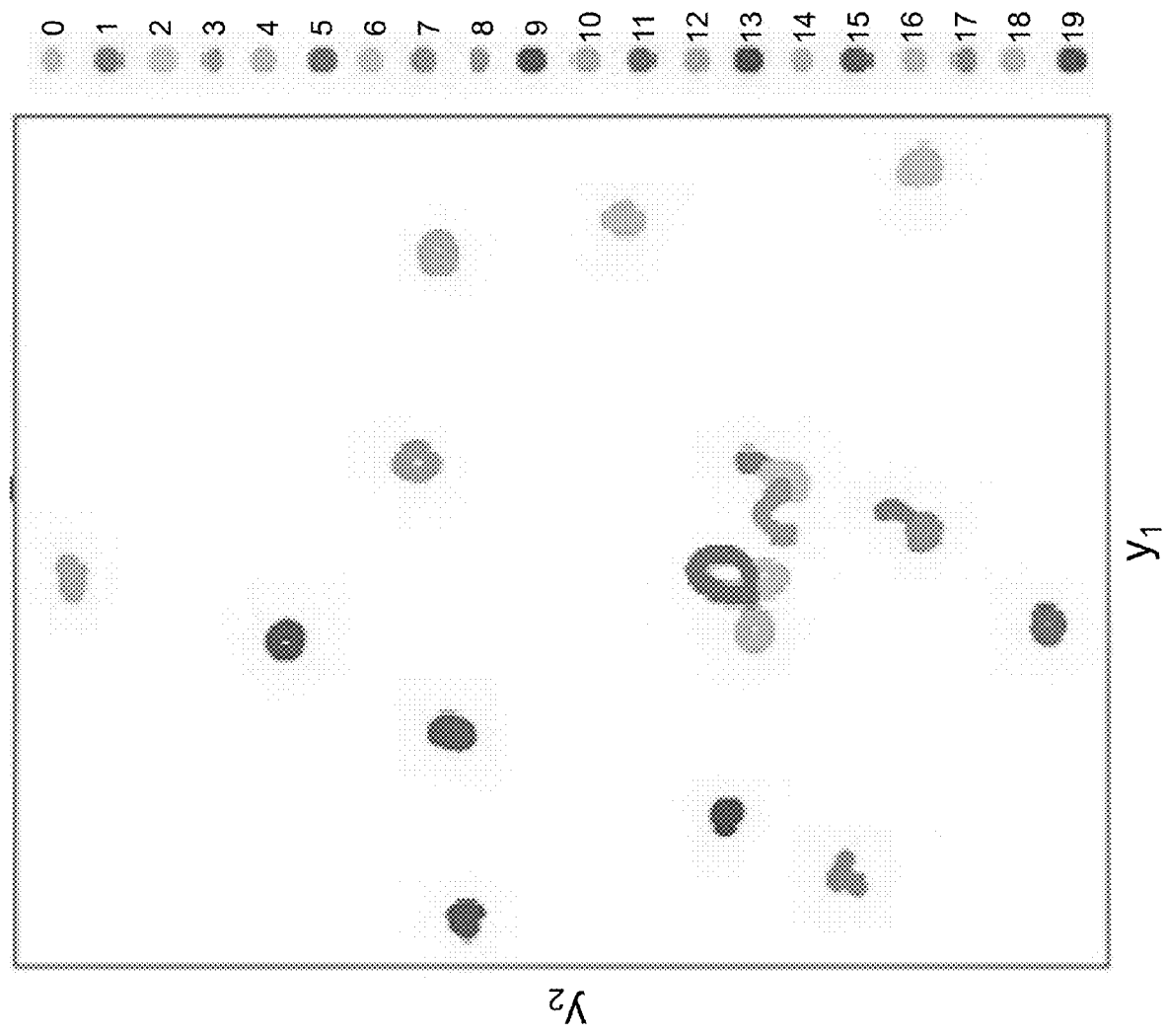
Figure 13D:
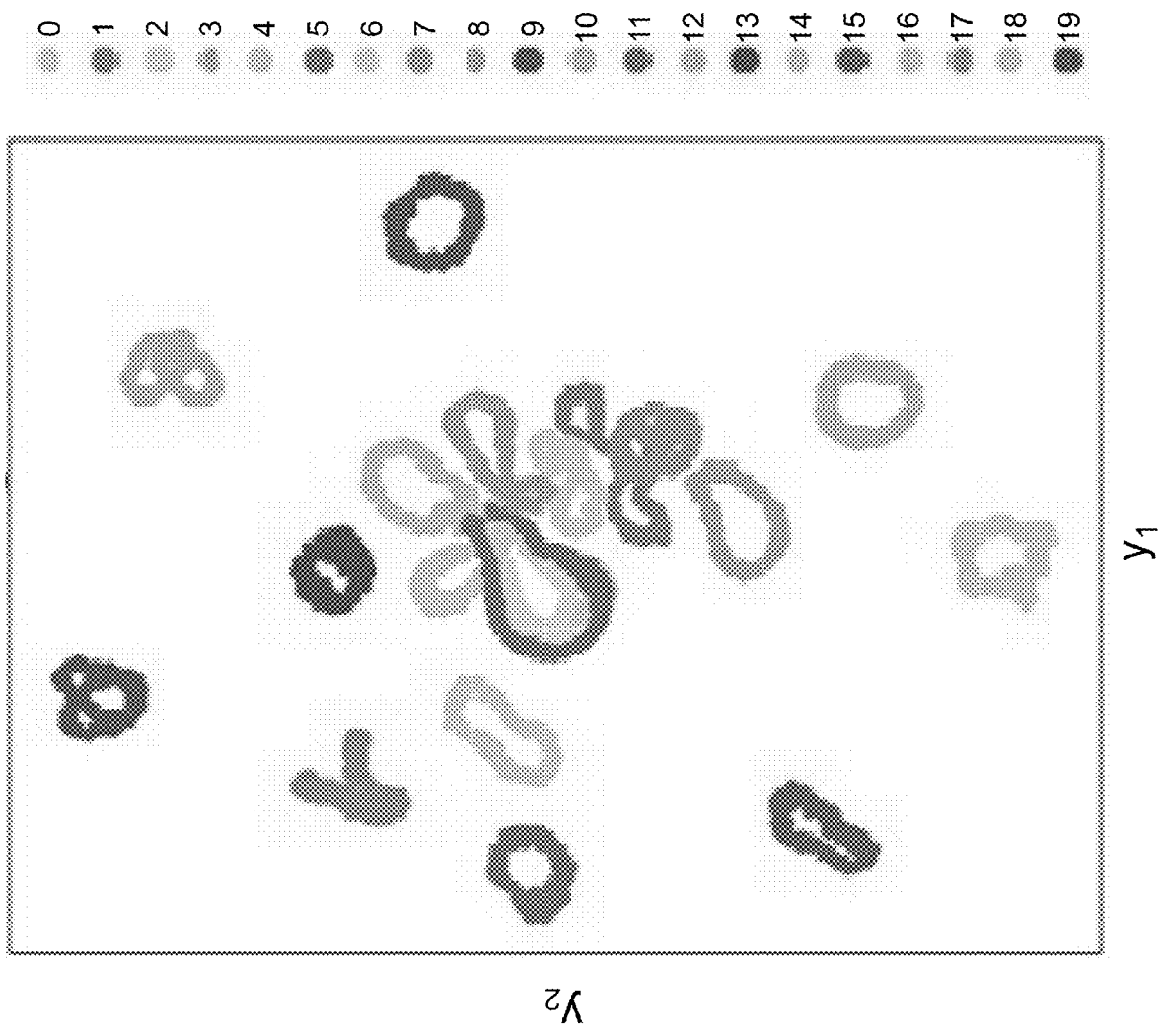

To further investigate the engine degradation process, the impact of different flight conditions was removed by subtracting the average reading measurement for each sensor at each flight condition and re-executing transformation application 124 with b=1, 2, 5, 10. Referring to FIGS. 10E through 10H, clustering results are shown using transformation application 124 with b=1, 2, 5, 10, respectively, with the modified fourth dataset in accordance with an illustrative embodiment. The cluster results clearly show that the sensor readings in the early stage of the study mainly concentrate on one side of the graph and the readings close to the fault points mainly concentrate on the other side of the graph with the tail. Referring to FIG. 10E, with b=1, the readings recorded at a similar stage of an engine's life cycle tended to concentrate together.

Referring to FIGS. 11A through 11D, comparative clustering results are shown using the UMAP method with min_dist=0.001, 0.01, 0.1, 1, respectively, with the fourth dataset in accordance with an illustrative embodiment.

The performance of transformation application 122 was compared to the UMAP method on an image classification task using a fifth dataset known as the COIL-20 dataset described in S. A. Nene et al., Columbia Object Image Library (1996). The fifth dataset included 1,440 gray-scale images of 20 objects for 72 rotations spanning 360 degrees. Because the images were gray-scale images the feature dimension was 784 based on the 28×28 pixels size of each image. The legend indicates the object.

Referring to FIGS. 12A through 12D, comparative clustering results are shown using transformation application 124 with b=1, 2, 5, 10, respectively, with the fifth dataset in accordance with an illustrative embodiment. The results show good separation between all 20 clusters for all values of b. With increasing values of b, a between-class distance for different objects becomes smaller and smaller, which can cause problems for data clustering. However, a circular structure of each object becomes more discernible with a higher value of b. Object 1 was classified into three subclusters 1200 (light blue color). Some of the object 1 images were randomly sampled from each of the three subclusters. The subclusters were formed mainly based on a direction of the arrow (downward, upward, and horizontally).

Referring to FIGS. 13A through 13D, comparative clustering results are shown using the UMAP method with min_dist=0.001, 0.01, 0.1, 1, respectively, with the fifth dataset in accordance with an illustrative embodiment. The legend indicates the object.

In general, the UMAP method generated good cluster visualizations for each dataset with the majority of the clusters well separated. However, the UMAP method failed to separate some clusters that were very similar to each other and failed to reveal the subtle subclusters discussed above with any value of min_dist. As a result, adjusting min_dist is insufficient to obtain a finer cluster structure.

There are applications for transformation application 122 in many areas such as process control and equipment health monitoring, image processing and classification, data segmentation, data analysis, voice processing and recognition, etc. The presented results demonstrate improved identification of meaningful subclusters that were similar but had distinguishable characteristics. The explosion of digital data is generating many opportunities for big data analytics, which in turn provides many opportunities for training cluster models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) select an observation vector from a plurality of observation vectors, wherein each observation vector of the plurality of observation vectors includes a value for each variable of a plurality of variables, wherein the plurality of variables define a high-dimensional space;
   (B) compute a distance between the selected observation vector and each observation vector of the plurality of observation vectors;
   (C) select a plurality of nearest neighbors to the selected observation vector using the computed distances, wherein a number of the plurality of nearest neighbors is a predefined number, wherein each nearest neighbor of the plurality of nearest neighbors is one of the plurality of observation vectors that are closest to the selected observation vector;
   (D) apply a first sigmoid function to compute a distance similarity value between the selected observation vector and each of the selected plurality of nearest neighbors based on the value of each variable of the plurality of variables of the selected observation vector and on the value of each variable of the plurality of variables of each of the plurality of nearest neighbors;
   repeat (A) through (D) with each observation vector of the plurality of observation vectors selected as the observation vector in (A), wherein each of the computed distance similarity values computed in (D) are added to a first matrix;
   compute an initial matrix from the plurality of observation vectors, wherein the initial matrix represents a transformation of each observation vector of the plurality of observation vectors into a low-dimensional space defined to include a predefined number of dimensions, wherein the predefined number of dimensions is less than a number of the plurality of variables;
   execute an optimization method with the computed initial matrix, the first matrix, and a gradient of a second sigmoid function that computes a second distance similarity value between the selected observation vector and each of the plurality of nearest neighbors in the low-dimensional space, wherein the optimization method determines an optimized matrix that represents a transformation of each observation vector of the plurality of observation vectors into the low-dimensional space; and
   output the optimized matrix.

2. The non-transitory computer-readable medium of claim 1, wherein the computer-readable instructions further cause the computing device to present a visualization of the optimized matrix in a display.

3. The non-transitory computer-readable medium of claim 1, wherein the computer-readable instructions further cause the computing device to train a clustering model with the optimized matrix to define a plurality of clusters in the low-dimensional space, wherein each observation vector of the plurality of observation vectors is assigned to a single cluster, and to present a visualization of the defined plurality of clusters in a display.

4. The non-transitory computer-readable medium of claim 1, wherein the predefined number of dimensions is two or three.

5. The non-transitory computer-readable medium of claim 1, wherein the first sigmoid function is $$\delta_j = \frac{1}{1 + \frac{\max(0, dis_j - \rho)}{\sigma}}, j = 1, \ldots, k,$$

where $\delta_j$ is the distance similarity value between a $j^{th}$ nearest neighbor and the selected observation vector, $dis_j$ is the distance computed between the $j^{th}$ nearest neighbor and the selected observation vector, $\sigma$ is a normalizing factor value, $\rho$ is a distance to a closest nearest neighbor of the plurality of nearest neighbors, and k is the number of the plurality of nearest neighbors.

6. The non-transitory computer-readable medium of claim 5, wherein the distance between the $j^{th}$ nearest neighbor and the selected observation vector is computed using a Euclidean distance function.

7. The non-transitory computer-readable medium of claim 5, wherein a binary search is used to compute a value for a for the selected observation vector.

8. The non-transitory computer-readable medium of claim 7, wherein the binary search is based on solving $$\sum_{j=1}^{k} \frac{1}{1 + \frac{\max(0, dis_j - \rho)}{\sigma}} = \log_2 k.$$

9. The non-transitory computer-readable medium of claim 5, wherein the first matrix is computed using $P_{ij}=P_{j|i}+P_{i|j}-P_{i|j}\odot P_{j|i}$, where $P_{j|i}=\delta_j$ when $x_j$ is one of the plurality of nearest neighbors of the selected observation vector indicated as $x_i$, and is zero otherwise, $P_{i|j}=\delta_i$ when $x_i$ is one of the plurality of nearest neighbors of $x_j$, and is zero otherwise, and $\odot$ indicates a component wise multiplication.

10. The non-transitory computer-readable medium of claim 1, wherein the second sigmoid function is $$Q(i,j) = \frac{1}{\left[1 + \left(2^{\frac{1}{b}} - 1\right)\|y_i - y_j\|_2^\alpha\right]^b},$$

where $\alpha$ is a first predefined hyperparameter value, b is a second predefined hyperparameter value, $y_i$ is an $i^{th}$ observation vector transformed into the low-dimensional space, and $y_j$ is a $j^{th}$ observation vector transformed into the low-dimensional space.

11. The non-transitory computer-readable medium of claim 10, wherein $\alpha=1$.

12. The non-transitory computer-readable medium of claim 10, wherein the gradient of the second sigmoid function is computed using $\partial Q(i,j)/\partial y_i = -ab(1+(a^{1/b}-1)\|y_i-y_j\|_2^\alpha)^{-b-1}(2^{1/b}-1)\|y_i-y_j\|_2^{\alpha-2}(y_i-y_j))$.

13. The non-transitory computer-readable medium of claim 10, wherein a loss function optimized using the optimization method is $\text{Loss}=-\Sigma_{(x_i,x_j)\in E}P_{ij}\log Q(i,j)+\Sigma_{(x_i,x_j)\in E}\log(1-Q(i,j))$, where E is a collection of observation vectors $(x_i, x_j)$ for which either $x_i$ is one of the plurality of nearest neighbors of $x_j$ or $x_j$ is one of the plurality of nearest neighbors of $x_j$, $x_i$ is an $i^{th}$ observation vector of the plurality of observation vectors, and $x_j$ is a $j^{th}$ observation vector of the plurality of observation vectors, and $P_{ij}$ is the first matrix.

14. The non-transitory computer-readable medium of claim 13, wherein the first matrix is computed using $P_{ij}=P_{j|i}+P_{i|j}-P_{i|j}\odot P_{j|i}$, where $P_{j|i}=\delta_j$ when $x_j$ is one of the plurality of nearest neighbors of the selected observation vector indicated as $x_i$, and is zero otherwise, $P_{i|j}=\delta_i$ when $x_i$ is one of the plurality of nearest neighbors of $x_j$, and is zero otherwise, $\odot$ indicates a component wise multiplication, $\delta_j$ is the distance similarity value between a $j^{th}$ nearest neighbor and the selected observation vector, and $\delta_i$ is the distance similarity value between the selected observation vector and the $j^{th}$ nearest neighbor.

15. The non-transitory computer-readable medium of claim 14, wherein the first sigmoid function is $$\delta_j = \frac{1}{1 + \frac{\max(0, dis_j - \rho)}{\sigma}}, j = 1, \ldots, k,$$

where $dis_j$ is the distance computed between the $j^{th}$ nearest neighbor and the selected observation vector, $\sigma$ is a normalizing factor value, $\rho$ is a distance to a closest nearest neighbor of the plurality of nearest neighbors, and k is a number of the plurality of nearest neighbors.

16. The non-transitory computer-readable medium of claim 15, wherein the distance between the $j^{th}$ nearest neighbor and the selected observation vector is computed using a Euclidean distance function.

17. The non-transitory computer-readable medium of claim 1, wherein computing the initial matrix from the plurality of observation vectors comprises:
computing a weighted adjacency matrix from the plurality of observation vectors;
transforming the computed weighted adjacency matrix;
computing a degree matrix from the transformed computed weighted adjacency matrix;
computing a Laplacian matrix from the computed degree matrix;
decomposing the computed Laplacian matrix to define a plurality of eigenvectors; and
selecting a second plurality of eigenvectors from the defined plurality of eigenvectors, wherein a number of the second plurality of eigenvectors is the predefined number of dimensions,
wherein the selected second plurality of eigenvectors define the initial matrix.

18. The non-transitory computer-readable medium of claim 17, wherein the weighted adjacency matrix is computed using $$A = \begin{bmatrix} w_{11} & \cdots & w_{1N} \\ \vdots & \ddots & \vdots \\ w_{N1} & \cdots & w_{NN} \end{bmatrix},$$

where A is the weighted adjacency matrix, N is a number of the plurality of observation vectors, $$w_{ij} = \frac{1}{1 + \frac{\max(0, dis_j - \rho)}{\sigma}}, i = 1, 2, \ldots, N, j = 1, 2, \ldots, N,$$

when a $j^{th}$ observation vector $x_j$ is one of the plurality of nearest neighbors of an $i^{th}$ observation vector $x_i$, otherwise, $w_{ij}=0$; $dis_j$ is a distance computed between the $j^{th}$ observation vector $x_j$ and the $i^{th}$ observation vector $x_i$, $\sigma$ is a normalizing factor value, $\rho$ is a distance to a closest nearest neighbor of the plurality of nearest neighbors of the observation vector $x_i$.

19. The non-transitory computer-readable medium of claim 17, wherein the weighted adjacency matrix is transformed using $B=A+A^T-A\circ A^T$, where B is the transformed computed weighted adjacency matrix, A is the weighted adjacency matrix, T indicates a transpose, and $\circ$ indicates a Hadamard product.

20. The non-transitory computer-readable medium of claim 17, wherein the degree matrix is computed using $$D = \begin{bmatrix} d_1 & & \\ & \ddots & \\ & & d_N \end{bmatrix},$$

where $d_j=\Sigma_{i=1}^{N}w_{ij}$, j=1, 2, ..., N, if i=j and $d_j\neq 0$ if i≠j, and $w_{ij}$ is an $(i,j)^{th}$ entry of the transformed computed weighted adjacency matrix.

21. The non-transitory computer-readable medium of claim 17, wherein the Laplacian matrix is computed using $$L = D^{-\frac{1}{2}}(D-B)D^{-\frac{1}{2}},$$

where L is the Laplacian matrix, D is the degree matrix, and B is the transformed computed weighted adjacency matrix.

22. The non-transitory computer-readable medium of claim 17, wherein the selected second plurality of eigenvectors have smallest eigenvalues of the plurality of eigenvectors.

23. The non-transitory computer-readable medium of claim 1, wherein the optimization method is based on a stochastic gradient descent algorithm.

24. A computing device comprising:
a processor; and
a computer-readable medium operably coupled to the processor, the computer-readable medium having computer-readable instructions stored thereon that, when executed by the processor, cause the computing device to
(A) select an observation vector from a plurality of observation vectors, wherein each observation vector of the plurality of observation vectors includes a value for each variable of a plurality of variables, wherein the plurality of variables define a high-dimensional space;
(B) compute a distance between the selected observation vector and each observation vector of the plurality of observation vectors;
(C) select a plurality of nearest neighbors to the selected observation vector using the computed distances, wherein a number of the plurality of nearest neighbors is a predefined number, wherein each nearest neighbor of the plurality of nearest neighbors is one of the plurality of observation vectors that are closest to the selected observation vector;
(D) apply a first sigmoid function to compute a distance similarity value between the selected observation vector and each of the selected plurality of nearest neighbors based on the value of each variable of the plurality of variables of the selected observation vector and on the value of each variable of the plurality of variables of each of the plurality of nearest neighbors;
repeat (A) through (D) with each observation vector of the plurality of observation vectors selected as the observation vector in (A), wherein each of the computed distance similarity values computed in (D) are added to a first matrix;
compute an initial matrix from the plurality of observation vectors, wherein the initial matrix represents a transformation of each observation vector of the plurality of observation vectors into a low-dimensional space defined to include a predefined number of dimensions, wherein the predefined number of dimensions is less than a number of the plurality of variables;
execute an optimization method with the computed initial matrix, the first matrix, and a gradient of a second sigmoid function that computes a second distance similarity value between the selected observation vector and each of the plurality of nearest neighbors in the low-dimensional space, wherein the optimization method determines an optimized matrix that represents a transformation of each observation vector of the plurality of observation vectors into the low-dimensional space; and
output the optimized matrix.

25. A method of transforming high-dimensional data into low-dimensional data, the method comprising:
(A) selecting, by a computing device, an observation vector from a plurality of observation vectors, wherein each observation vector of the plurality of observation vectors includes a value for each variable of a plurality of variables, wherein the plurality of variables define a high-dimensional space;
(B) computing, by the computing device, a distance between the selected observation vector and each observation vector of the plurality of observation vectors;
(C) selecting, by the computing device, a plurality of nearest neighbors to the selected observation vector using the computed distances, wherein a number of the plurality of nearest neighbors is a predefined number, wherein each nearest neighbor of the plurality of nearest neighbors is one of the plurality of observation vectors that are closest to the selected observation vector;
(D) applying, by the computing device, a first sigmoid function to compute a distance similarity value between the selected observation vector and each of the selected plurality of nearest neighbors based on the value of each variable of the plurality of variables of the selected observation vector and on the value of each variable of the plurality of variables of each of the plurality of nearest neighbors;
repeating, by the computing device, (A) through (D) with each observation vector of the plurality of observation vectors selected as the observation vector in (A), wherein each of the computed distance similarity values computed in (D) are added to a first matrix;
computing, by the computing device, an initial matrix from the plurality of observation vectors, wherein the initial matrix represents a transformation of each observation vector of the plurality of observation vectors into a low-dimensional space defined to include a predefined number of dimensions, wherein the predefined number of dimensions is less than a number of the plurality of variables;
executing, by the computing device, an optimization method with the computed initial matrix, the first matrix, and a gradient of a second sigmoid function that computes a second distance similarity value between the selected observation vector and each of the plurality of nearest neighbors in the low-dimensional space, wherein the optimization method determines an optimized matrix that represents a transformation of each observation vector of the plurality of observation vectors into the low-dimensional space; and
outputting, by the computing device, the optimized matrix.

26. The method of claim 25, wherein the first sigmoid function $$\delta_j = \frac{1}{1 + \frac{\max(0, dis_j - \rho)}{\sigma}}, j = 1, \ldots, k,$$

where $\delta_j$ is the distance similarity value between a $j^{th}$ nearest neighbor and the selected observation vector, $dis_j$ is the distance computed between the $j^{th}$ nearest neighbor and the selected observation vector, $\sigma$ is a normalizing factor value, $\rho$ is a distance to a closest nearest neighbor of the plurality of nearest neighbors, and k is the number of the plurality of nearest neighbors.

27. The method of claim 26, wherein the first matrix is computed using $P_{ij}=P_{j|i}+P_{i|j}-P_{i|j}\odot P_{j|i}$, where $P_{j|i}=\delta_j$ when $x_j$ is one of the plurality of nearest neighbors of the selected observation vector indicated as $x_i$, and is zero otherwise, $P_{i|j}=\delta_i$ when $x_i$ is one of the plurality of nearest neighbors of $x_j$, and is zero otherwise, and $\odot$ indicates a component wise multiplication.

28. The method of claim 25, wherein the second sigmoid function is $$Q(i,j) = \frac{1}{\left[1+\left(2^{\frac{1}{b}}-1\right)\|y_i-y_j\|_2^a\right]^b},$$

where $\alpha$ is a first predefined hyperparameter value, b is a second predefined hyperparameter value, $y_i$ is an $i^{th}$ observation vector transformed into the low-dimensional space.

29. The method of claim 28, wherein $\alpha=1$.

30. The method of claim 28, wherein the gradient of the second sigmoid function is computed using $\partial Q(i,j)/\partial y_i = -\alpha b (\alpha^{1/b}-1)\|y_i-y_j\|_2^\alpha)^{-b-1}(2^{1/b}-1)\|y_i-y_j\|_2^{\alpha-2}(y_i-y_j))$.

* * * * *